(12) United States Patent
Ono

(10) Patent No.: US 10,473,996 B2
(45) Date of Patent: Nov. 12, 2019

(54) LIQUID CRYSTAL DISPLAY DEVICE

(71) Applicant: Panasonic Liquid Crystal Display Co., Ltd., Himeji-shi, Hyogo (JP)

(72) Inventor: Kikuo Ono, Ibaraki (JP)

(73) Assignee: PANASONIC LIQUID CRYSTAL DISPLAY CO., LTD., Hyogo (JP)

(*) Notice: Subject to any disclaimer, the term of this patent is extended or adjusted under 35 U.S.C. 154(b) by 8 days.

(21) Appl. No.: 15/837,645

(22) Filed: Dec. 11, 2017

(65) Prior Publication Data

US 2018/0164622 A1 Jun. 14, 2018

(30) Foreign Application Priority Data

Dec. 13, 2016 (JP) ................ 2016-241722

(51) Int. Cl.
*G02F 1/139* (2006.01)
*G02F 1/1335* (2006.01)
(Continued)

(52) U.S. Cl.
CPC .......... *G02F 1/1395* (2013.01); *G02F 1/1368* (2013.01); *G02F 1/13306* (2013.01); *G02F 1/133512* (2013.01); *G02F 1/133528* (2013.01); *G02F 1/134309* (2013.01); *G02F 1/136286* (2013.01); *G09G 3/3607* (2013.01); *G02F 1/13471* (2013.01); *G02F 1/133514* (2013.01); *G02F 1/133784* (2013.01); *G02F 1/134363* (2013.01); *G02F 1/136227* (2013.01); *G02F 2001/13706* (2013.01);
(Continued)

(58) Field of Classification Search
CPC ............. G02F 1/1395; G02F 1/13306; G02F 1/133512; G02F 1/133528; G02F 1/134309; G02F 1/136286; G02F 1/1368; G09G 3/3607
See application file for complete search history.

(56) References Cited

U.S. PATENT DOCUMENTS 4,231,639 A 11/1980 Banda
4,443,065 A * 4/1984 Funada ............. G02F 1/133636
349/181

(Continued)

FOREIGN PATENT DOCUMENTS

JP 59-22924 5/1984
JP 63-53529 10/1988
(Continued)

*Primary Examiner* — Ariel A Balaoing
(74) *Attorney, Agent, or Firm* — Hamre, Schumann, Mueller & Larson, P.C.

(57) ABSTRACT

A liquid crystal display device comprises: a first liquid crystal cell being a lateral electric field driven type; a second liquid crystal cell being a lateral electric field driven type; a first polarizing plate and a second polarizing plate, which are disposed so as to sandwich the first liquid crystal cell; and a third polarizing plate and a fourth polarizing plate, which are disposed so as to sandwich the second liquid crystal cell. The liquid crystal display device is configured such that rotation of a liquid crystal molecule of the first liquid crystal cell and rotation of a liquid crystal molecule of the second liquid crystal cell cancel and compensate for a hue change of the first liquid crystal cell or the second liquid crystal cell when viewed from a predetermined direction.

20 Claims, 49 Drawing Sheets

(51) Int. Cl.

| | | |
|---|---|---|
| *G02F 1/1362* | (2006.01) | |
| *G02F 1/133* | (2006.01) | |
| *G02F 1/1343* | (2006.01) | |
| *G09G 3/36* | (2006.01) | |
| *G02F 1/1368* | (2006.01) | |
| *G02F 1/1337* | (2006.01) | |
| *G02F 1/137* | (2006.01) | |
| *G02F 1/1347* | (2006.01) | |

(52) U.S. Cl.
CPC .............. *G02F 2001/13712* (2013.01); *G02F 2001/133531* (2013.01); *G02F 2001/133738* (2013.01); *G02F 2001/134345* (2013.01); *G02F 2001/134372* (2013.01); *G02F 2201/122* (2013.01); *G02F 2201/123* (2013.01); *G02F 2201/40* (2013.01); *G02F 2203/64* (2013.01); *G09G 3/36* (2013.01); *G09G 2300/0426* (2013.01); *G09G 2300/0465* (2013.01); *G09G 2300/0478* (2013.01); *G09G 2310/08* (2013.01); *G09G 2320/0233* (2013.01); *G09G 2320/0242* (2013.01)

(56) References Cited

U.S. PATENT DOCUMENTS

| | | | |
|---|---|---|---|
| 5,745,207 A | 4/1998 | Asada et al. | |
| 6,456,351 B1 | 9/2002 | Kim et al. | |
| 2001/0022569 A1 | 9/2001 | Ohta et al. | |
| 2004/0223098 A1* | 11/2004 | Nose .................... | G02F 1/13476 349/113 |
| 2008/0024688 A1* | 1/2008 | Mizoguchi ........ | G02F 1/134363 349/33 |
| 2010/0296033 A1* | 11/2010 | Maeda ................... | G02B 5/201 349/106 |
| 2017/0081588 A1* | 3/2017 | Huh .................... | C09K 19/3003 |
| 2018/0284538 A1* | 10/2018 | Ohira ................ | G02F 1/133536 |

FOREIGN PATENT DOCUMENTS

| | | |
|---|---|---|
| JP | 09-105908 | 4/1997 |
| JP | 09-258269 | 10/1997 |
| JP | 10-148826 | 6/1998 |
| JP | 2000-029072 | 1/2000 |
| JP | 3204912 | 6/2001 |
| JP | 3427611 | 5/2003 |
| JP | 3826214 | 7/2006 |

\* cited by examiner

LIQUID CRYSTAL DISPLAY DEVICE

CROSS-REFERENCE TO RELATED APPLICATION

The present application claims priority from Japanese Patent Application No. 2016-241722 filed on Dec. 13, 2016. The entire disclosure of the above-identified application, including the specification, drawings and claims is incorporated herein by reference in its entirety.

TECHNICAL FIELD

A present invention relates to a liquid crystal display device.

BACKGROUND

Conventionally there is known a transverse electric field system liquid crystal display device. Examples of the transverse electric field system liquid crystal display device include an in-plane switching (IPS) system and a fringe field switching (FFS) system.

In the IPS system liquid crystal display device, each pixel has a structure in which a comb-shape pixel electrode or a pixel electrode in which a slit is formed and a comb-shape common electrode or a common electrode in which a slit is formed are alternately disposed. On the other hand, in the FFS system liquid crystal display device, each pixel has a structure in which a comb-shape pixel electrode or a pixel electrode in which a slit is formed is disposed on a planar common electrode formed over the pixel.

FIG. 38A is a sectional view illustrating an example of a pixel configuration of a conventional transverse electric field system liquid crystal display device. FIG. 38B is a plan view illustrating the pixel configuration of the conventional transverse electric field system liquid crystal display device in FIG. 38A.

As illustrated in FIG. 38A, the conventional transverse electric field system liquid crystal display device includes a pair of first substrate SUB1 and second substrate SUB2, which are made of a glass substrate, liquid crystal layer LC sealed between first substrate SUB1 and second substrate SUB2, first polarizing plate POL1 disposed outside first substrate SUB1, second polarizing plate POL2 disposed outside second substrate SUB2, and backlight BL. First polarizing plate POL1 and second polarizing plate POL2 are disposed such that a crossed Nicol positional relationship holds. That is, polarization axis POLA1 of first polarizing plate POL1 and polarization axis POLA2 of second polarizing plate POL2 are orthogonal to each other.

Alignment film ORI is formed on an inside surface of first substrate SUB1. Common electrode CT, upper insulator UPAS, pixel electrode PX, and alignment film ORI are formed on an inside surface of second substrate SUB2 in this order. For example, liquid crystal layer LC is formed by positive liquid crystal molecule LCBP.

In the transverse electric field system liquid crystal display device having the above structure, an electric field (transverse electric field EL) substantially parallel to the pair of first substrate SUB1 and second substrate SUB2 is generated between pixel electrode PX and common electrode CT by applying voltage to pixel electrode PX and common electrode CT. Therefore, as illustrated in FIG. 38B, liquid crystal molecule LCBP of liquid crystal layer LC rotates according to initial alignment angle THIN. Specifically, when transverse electric field EL is generated, liquid crystal molecule LCBP rotates from a state of liquid crystal molecule LCBPOFF that is of an initial alignment state to a position of angle THON, and becomes a state of liquid crystal molecule LCBPON. In FIG. 38B, liquid crystal molecule LCBP rotates to right by transverse electric field EL.

Because liquid crystal molecule LCBP is of a positive type, initial alignment angle THIN of liquid crystal molecule LCBPOFF is an angle formed between a 90°-270° line and a long axis direction (initial alignment axis direction) of liquid crystal molecule LCBPOFF existing near a boundary of alignment film ROI. The long axis direction of liquid crystal molecule LCBPOFF is substantially matched with the direction of polarization axis (absorption axis) POLA2 of second polarizing plate POL2. For example, initial alignment angle THIN has a range of 0°<THIN<20°.

Angle THON of liquid crystal molecule LCBPON is an angle formed between the 90°-270° line and the long axis direction of liquid crystal molecule LCBPON during white display when the transverse electric field is provided to liquid crystal molecule LCBP.

Thus, in the transverse electric field system liquid crystal display device, liquid crystal molecule LCBP is rotated in a substrate surface by providing the electric field substantially parallel to first substrate SUB1 and second substrate SUB2 to liquid crystal molecule LCBP. For this reason, in the transverse electric field system, apparent retardation R of liquid crystal layer LC does not change too much even if a visual angle direction changes, but an extremely wide viewing angle is obtained compared with a longitudinal electric field system. Assuming that d is a thickness of liquid crystal layer LC and that $\Delta d$ is refractive index anisotropy (refractive index difference) of liquid crystal molecule LCBP, retardation R is given by $R=\Delta n \cdot d$.

SUMMARY

However, in the transverse electric field system liquid crystal display device, coloring (coloration) is generated in a specific direction. That is, a direction in which a hue changes (color shift) exists. The direction in which the hue changes is correlated with an orientation of liquid crystal molecule LCBPON in a voltage applied state (white display). This point will be described in detail below with reference to FIG. 39. FIG. 39 is a view illustrating a hue change in the transverse electric field system liquid crystal display device.

In the liquid crystal display device, transmittance T is given by $T=T_0 \sin^2(2\Phi) \cdot \sin^2(\pi \cdot \Delta n \cdot d/\lambda)$. Where $T_0$ is transmittance to reference light, $\Phi$ is an angle formed between an optical axis of liquid crystal molecule LCBP and a polarization axis of a polarizing plate, $\Delta n$ is refractive index anisotropy (long-axis refractive index of liquid crystal molecule LCBP–short-axis refractive index of liquid crystal molecule LCBP), d is a thickness of liquid crystal layer LC, and $\lambda$ is a wavelength of incident light.

Maximum transmittance T is obtained for $\Phi$ of $\pi/4$ (45°) and $\Delta n \cdot d/\lambda = \pi/2$. At this point, refractive index anisotropy $\Delta n$ of liquid crystal molecule LCBPON in the voltage applied state changes depending on a viewing direction, and $\Delta n \cdot d$ also changes. Therefore, wavelength $\lambda$ of the incident light changes so as to satisfy $\pi/2$.

Specifically, as illustrated in FIG. 39, in a viewing direction toward a short axis side of liquid crystal molecule LCBPON (when viewed along the long axis direction), wavelength $\lambda$ of the incident light reaching maximum transmittance T becomes relatively shortened with decreasing $\Delta n$.

Therefore, an observer sees blue that is a relatively short wavelength in white light. That is, when viewed from the long axis direction of liquid crystal molecule LCBP, wavelength λ of the incident light shifts to blue, and blue coloring (blue coloration) is generated (see FIG. 38A).

On the other hand, in a viewing direction toward a long axis side of liquid crystal molecule LCBPON (when viewed along the short axis direction), wavelength λ of the incident light becomes relatively lengthened with increasing Δn. Therefore, the observer sees yellow that is a relatively long wavelength in the white light. That is, when viewed from the short axis direction of liquid crystal molecule LCBP, wavelength λ of the incident light shifts to yellow, and yellow coloring (yellow coloration) is generated (see FIG. 38A).

Thus, in the transverse electric field system liquid crystal display device having the single-domain pixel structure, the hue change is generated at an angle toward which the long axis of liquid crystal molecule LCBP is oriented, and a color viewing angle characteristic is degraded.

A method called a multi-domain system, a double-domain system, or a dual-domain system is known as a method for improving the degradation of the color viewing angle characteristic (for example, see Unexamined Japanese Patent Publication Nos. 9-105908, 9-258269, 10-148826, and 2000-029072). In a pixel (dot) constituting a minimum unit of display control, by adjusting patterns of pixel electrode PX and common electrode CT, polarization axis POLA1 of first polarizing plate POL1 and polarization axis POLA2 of second polarizing plate POL2, and initial alignment angle THIN, the observer simultaneously views the blue coloring viewed from the long axis direction of liquid crystal molecule LCBPON in the voltage applied state and the yellow coloring viewed from the short axis direction of liquid crystal molecule LCBPON in the voltage applied state when viewing the liquid crystal display device in a predetermined inclination direction.

Specifically, liquid crystal molecule LCBP in which a rotational direction is clockwise and liquid crystal molecule LCBP in which the rotational direction is counterclockwise are formed in one pixel that is driven by a thin film transistor (TFT). That is, liquid crystal molecules LCBP rotating to the right and the left in the electric field direction from pixel electrode PX to common electrode CT exist. Therefore, the blue coloring and the yellow coloring are canceled, and the color viewing angle characteristic is improved.

FIG. 40 is a view illustrating a configuration of the transverse electric field system liquid crystal display device in which the color viewing angle characteristic is improved by the multi-domain system.

As illustrated in FIG. 40, pixel electrode PX and common electrode CT are bent into a doglegged shape in one pixel. As a result, transverse electric fields EOL and EOR are generated in two directions between pixel electrode PX and common electrode CT.

Therefore, liquid crystal molecule LCBP to which transverse electric field EOL is provided rotates to the left from the state of liquid crystal molecule LCBPOFF to a position of angle THONL according to initial alignment angle THIN, and becomes the state of liquid crystal molecule LCBPON.

On the other hand, liquid crystal molecule LCBP to which transverse electric field EOR is provided rotates to the right from the state of liquid crystal molecule LCBPOFF to a position of angle THONR according to initial alignment angle THIN, and becomes the state of liquid crystal molecule LCBPON.

Resultantly, the blue coloring and the yellow coloring are canceled when viewed from a specific direction, so that the color viewing angle characteristic can be improved.

However, in the configuration of pixel electrode PX illustrated in FIG. 40, in a boundary region WLT between a region where liquid crystal molecule LCBP rotating to the left exists (a region where transverse electric field EOL is generated) and a region where liquid crystal molecule LCBP turning to the right exists (a region where transverse electric field EOR is generated), the long axis direction of liquid crystal molecule LCBP is not aligned in a predetermined direction with respect to polarization axes of first polarizing plate POL1 and second polarizing plate POL2 during the generation of transverse electric fields EOL and EOR. Therefore, the transmittance is degraded. Resultantly, the transmittance of the whole liquid crystal display device is degraded, namely, brightness of the liquid crystal display device is degraded. Thus, a side effect that the transmittance is degraded in the one-pixel multi-domain system in which two transverse electric fields having different electric fields are generated in one pixel to improve the color viewing angle characteristic.

Therefore, as illustrated in FIG. 41, there is proposed a method in which the color viewing angle characteristic is improved by inverting the rotational direction of liquid crystal molecule LCBP in each row. That is, the method is an each-row multi-domain system, in which liquid crystal molecule LCBP in a certain row is rotated to the left and liquid crystal molecule LCBP in a next row is rotated to the right when the transverse electric field is generated (during the white display). In FIG. 41, gate wiring GL is linearly formed along a row direction, and source wiring SL is formed in substantially parallel to pixel electrode PX along a column direction so as to be bent.

In the each-row multi-domain system, in the case that the white display is performed in a whole image display region or that identical data is displayed over a plurality of rows, the yellow coloring or the blue coloring is not generated when a screen is viewed from a predetermined inclination direction. This is because the rotational directions of liquid crystal molecule LCBP in the upper and lower rows are inverted to be able to compensate for the color change. For example, as illustrated in FIG. 42, in the case that the white display is performed in the whole image display region DISP (solid white display), the coloring can be canceled in the inclination direction by alternately rotating the liquid crystal molecule to the left and the right. Additionally, when the each-row multi-domain system is viewed in one dot (pixel), because liquid crystal molecule LCBP is driven by a single-domain system to rotate only in one direction, the region where the transmittance is degraded is not generated unlike the one-pixel multi-domain system. Thus, in the each-row multi-domain system, in the case that the white display is performed in the whole image display region or that the identical data is displayed over the plurality of rows, while the color viewing angle characteristic can be improved, the degradation of the transmittance is suppressed to configure the bright liquid crystal display device.

However, even in the each-row multi-domain system, the color viewing angle characteristic is degraded for a specific image pattern display. For example, in the case that a white line and a black line are alternately displayed in each line as illustrated in FIG. 43, liquid crystal molecule LCBP does not rotate in the black display, but light is not transmitted. Therefore, the blue coloring or the yellow coloring is generated when liquid crystal molecule LCBP is viewed from a predetermined inclination direction, and the color viewing angle characteristic is degraded.

An object of the present disclosure is to provide a liquid crystal display device that can improve the color viewing angle characteristic irrespective of the image display pattern without degrading the transmittance.

To solve the above problem, a liquid crystal display device according to a present disclosure comprises: a first liquid crystal cell including a first liquid crystal layer provided between a first substrate and a second substrate, a first pixel electrode, and a first common electrode, the first pixel electrode and the first common electrode being provided in each of a plurality of display unit regions; a second liquid crystal cell including a second liquid crystal layer provided between a third substrate and a fourth substrate, a second pixel electrode, and a second common electrode, the second pixel electrode and the second common electrode being provided in each of a plurality of display unit regions; a first polarizing plate and a second polarizing plate, which are disposed so as to sandwich the first liquid crystal cell; and a third polarizing plate and a fourth polarizing plate, which are disposed so as to sandwich the second liquid crystal cell. In the first liquid crystal cell, alignment axes of the first substrate and the second substrate are substantially parallel to a liquid crystal molecule of the first liquid crystal layer, and the liquid crystal molecule of the first liquid crystal layer rotates by a transverse electric field generated between the first pixel electrode and the first common electrode. In the second liquid crystal cell, alignment axes of the third substrate and the fourth substrate are substantially parallel to a liquid crystal molecule of the second liquid crystal layer, and the liquid crystal molecule of the second liquid crystal layer rotates by a transverse electric field generated between the second pixel electrode and the second common electrode. The first liquid crystal cell and the second liquid crystal cell are laminated such that the second substrate and the third substrate become inside. The second polarizing plate and the third polarizing plate are disposed between the first liquid crystal cell and the second liquid crystal cell, and polarization axes of the second polarizing plate and the third polarizing plate are substantially parallel to each other. Polarization axes of the first polarizing plate and the fourth polarizing plate are substantially orthogonal to the polarization axis of the second polarizing plate, and the liquid crystal display device is configured such that rotation of the liquid crystal molecule of the first liquid crystal layer and rotation of the liquid crystal molecule of the second liquid crystal layer cancel and compensate for a hue change of the first liquid crystal cell or the second liquid crystal cell when viewed from a predetermined direction.

DETAILED DESCRIPTION

The following describes an exemplary embodiment of the present disclosure. The embodiment described below is merely one specific example of the present disclosure. The numerical values, shapes, materials, elements, and arrangement and connection of the elements, etc. indicated in the following embodiment are given merely by way of illustration and are not intended to limit the present disclosure. Therefore, among elements in the following embodiment, those not recited in any one of the independent claims defining the broadest inventive concept of the present disclosure are described as optional elements.

Note that the figures are schematic illustrations and are not necessarily precise depictions. Accordingly, the figures are not necessarily to scale. Moreover, in the figures, elements that are essentially the same share like reference signs. Accordingly, duplicate description is omitted or simplified.

First Exemplary Embodiment

[Liquid Crystal Display Device]

A schematic configuration of whole liquid crystal display device LCD according to a first exemplary embodiment will be described with reference to FIGS. 1 and 2.

Figure 1:
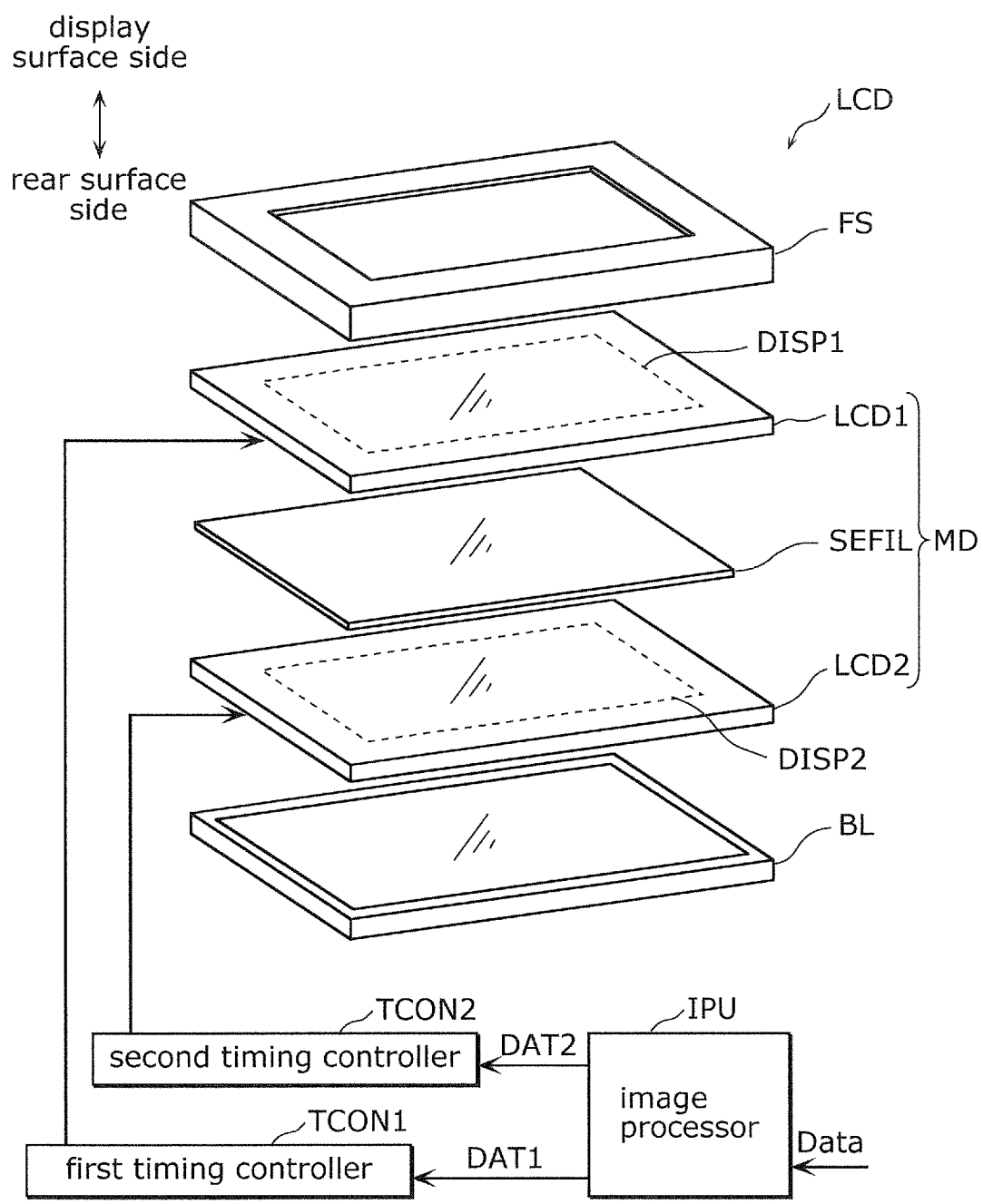
FIG. 1 is an exploded perspective view illustrating a liquid crystal display device according to a first exemplary embodiment.

FIG. 1 is an exploded perspective view illustrating liquid crystal display device LCD according to the first exemplary embodiment. FIG. 2 is a view illustrating configurations of drivers of first liquid crystal display panel LCD1 and second liquid crystal display panel LCD2 in liquid crystal display device LCD according to the first exemplary embodiment.

As illustrated in FIG. 1, liquid crystal display device LCD includes first liquid crystal display panel LCD1 disposed at a position (a front side) closer to an observer, second liquid crystal display panel LCD2 disposed at a position (a rear side) farther away from the observer than first liquid crystal display panel LCD1 is, adhesive layer SEFIL by which first liquid crystal display panel LCD1 and second liquid crystal display panel LCD2 adhere to each other, backlight BL disposed on a rear surface side (a rear side) of second liquid crystal display panel LCD2, and front chassis FS that covers first liquid crystal display panel LCD1 and second liquid crystal display panel LCD2 from an observer side.

First liquid crystal display panel LCD1 and second liquid crystal display panel LCD2 adhering to each other by adhesive layer SEFIL are liquid crystal module MD, and are fixed to a middle frame (not illustrated) and a rear frame (not illustrated) together with backlight BL.

First liquid crystal display panel LCD1 is a main panel that displays an image visually recognized by a user. In the first exemplary embodiment, first liquid crystal display panel LCD1 displays a color image. On the other hand, second liquid crystal display panel LCD2 is a sub-panel disposed on the rear surface side of first liquid crystal display panel LCD1. In the first exemplary embodiment, second liquid crystal display panel LCD2 displays a monochrome image (black-and-white image), which has an image pattern corresponding to a color image displayed on first liquid crystal display panel LCD1, in synchronization with the color image.

Both liquid crystal driving systems of first liquid crystal display panel LCD1 and second liquid crystal display panel LCD2 are a transverse electric field system such as an IPS system and an FFS system. First liquid crystal display panel LCD1 and second liquid crystal display panel LCD2 are a normally black type in which white is displayed in a voltage applied state while black is displayed in a voltage non-applied state.

Figure 2:
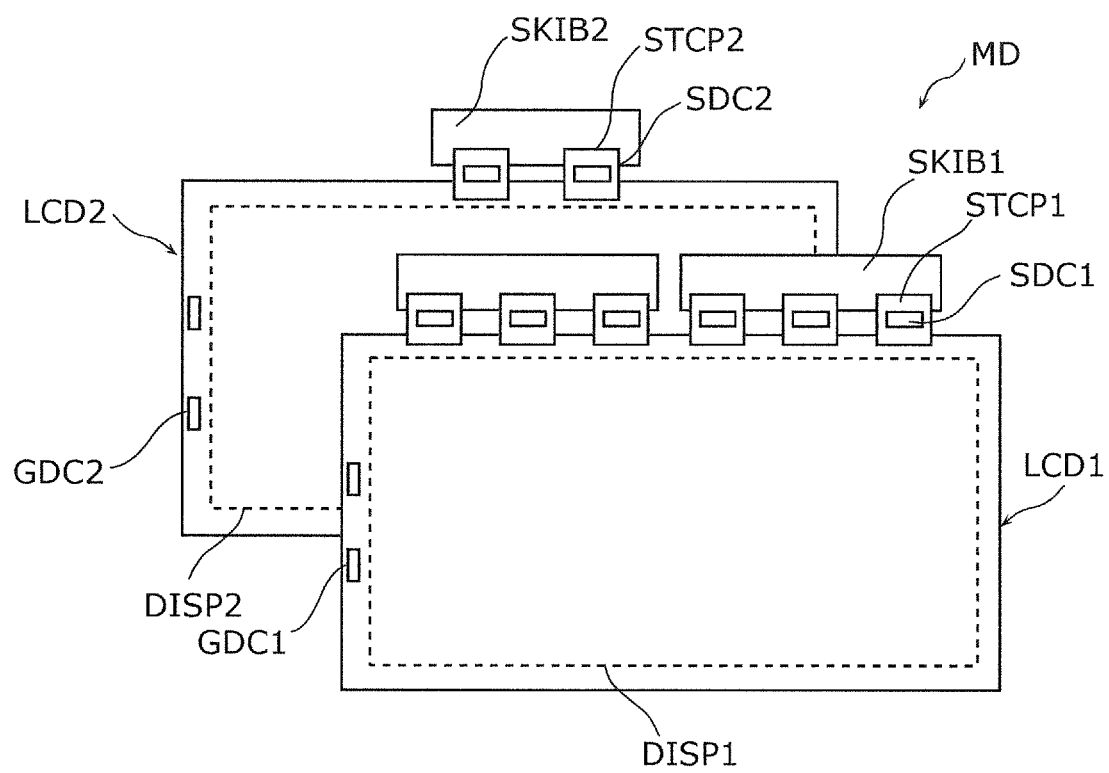
FIG. 2 is a view illustrating configurations of drivers of a first liquid crystal display panel and a second liquid crystal display panel in the liquid crystal display device according to the first exemplary embodiment.

As illustrated in FIG. 2, first source driver SDC1 and first gate driver GDC1 are provided in first liquid crystal display panel LCD1 in order to display the color image on first image display region DISP1 according to an input video signal.

Specifically, first liquid crystal display panel LCD1 is connected to six flexible wiring boards STCP1 on each of which first source driver SDC1 formed by an IC package is mounted. Each STCP1 is connected to printed board SKIB1. Two first gate drivers GDC1 formed by IC packages are mounted on first liquid crystal display panel LCD1.

On the other hand, second source driver SDC2 and second gate driver GDC2 are provided in second liquid crystal display panel LCD2 in order to display the monochrome image on second image display region DISP2 according to the input video signal.

Specifically, second liquid crystal display panel LCD2 is connected to two flexible wiring boards STCP2 on each of which second source driver SDC2 formed by an IC package is mounted, and each STCP2 is connected to printed board SKIB2. Two second gate drivers GDC2 formed by IC packages are mounted on second liquid crystal display panel LCD2.

As illustrated in FIG. 1, backlight BL is a surface light source that emits light toward first liquid crystal display panel LCD1 and second liquid crystal display panel LCD2. For example, backlight BL is a light emitting diode (LED) backlight in which an LED is used as a light source. However, backlight BL is not limited to the LED backlight. In the first exemplary embodiment, backlight BL is of a direct under type. However, backlight BL may be of an edge type. Backlight BL may include an optical member such as a diffuser (a diffusion sheet) that diffuses light emitted from the light source.

Front chassis FS is a front frame disposed on the observer side (the front side). For example, front chassis FS is a rectangular frame body. Preferably front chassis FS may be made of a metallic material, such as a steel sheet or an aluminum sheet, which has high rigidity, but may be made of a resin material.

Liquid crystal display device LCD includes first timing controller TCON1 that controls first source driver SDC1 and first gate driver GDC1 of first liquid crystal display panel LCD1, second timing controller TCON2 that controls second source driver SDC2 and second gate driver GDC2 of second liquid crystal display panel LCD2, and image processor IPU that outputs image data to first timing controller TCON1 and second timing controller TCON2.

Image processor IPU receives input video signal Data transmitted from an external system (not illustrated), performs predetermined image processing on input video signal Data, outputs first image data DAT1 to first timing controller TCON1, and outputs second image data DAT2 to second timing controller TCON2. Image processor IPU also outputs a control signal (not illustrated) such as a synchronizing signal to first timing controller TCON1 and second timing controller TCON2. First image data DAT1 is image data for displaying the color image, and second image data DAT2 is image data for displaying the monochrome image.

In liquid crystal display device LCD according to the first exemplary embodiment, the image is displayed while two display panels of first liquid crystal display panel LCD1 and second liquid crystal display panel LCD2 overlap each other, so that black can be faithfully reproduced. Therefore, the image having high contrast ratio can be displayed. For example, liquid crystal display device LCD is a high dynamic range (HDR) compatible television, and a local dimming compatible direct under type LED backlight may be used as backlight BL. In this case, the color image having high contrast ratio and higher image quality can be displayed.

In the first exemplary embodiment, first liquid crystal display panel LCD1 displays the color image in first image display region DISP1, and second liquid crystal display panel LCD2 displays the black-and-white image in second image display region DISP2. However, the present disclosure is not limited to the first exemplary embodiment. For example, first liquid crystal display panel LCD1 may display the black-and-white image in first image display region DISP1, and second liquid crystal display panel LCD2 may display the color image in second image display region DISP2.

[First Liquid Crystal Display Panel and Second Liquid Crystal Display Panel]

Detailed configurations of first liquid crystal display panel LCD1 and second liquid crystal display panel LCD2 in liquid crystal display device LCD will be described below with reference to FIGS. 3 to 6B.

Figure 3:
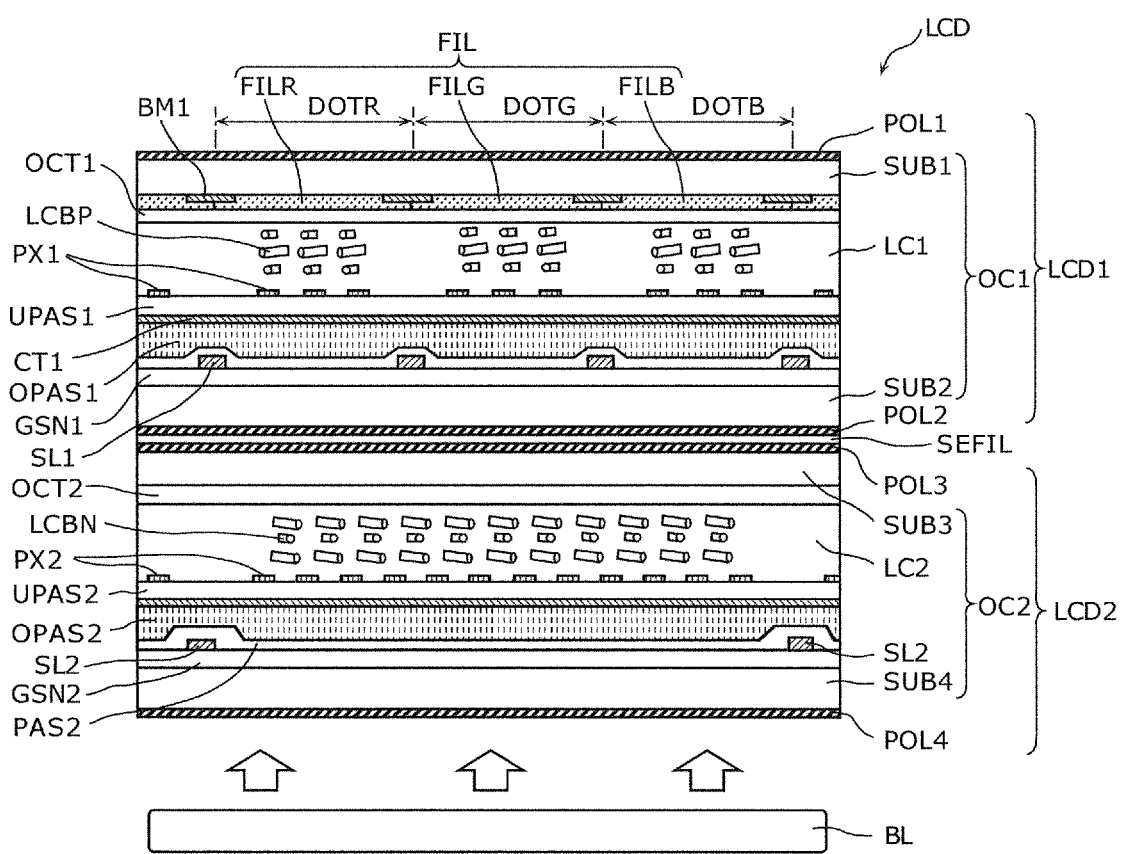
FIG. 3 is a sectional view illustrating the liquid crystal display device according to the first exemplary embodiment.
Figure 4:
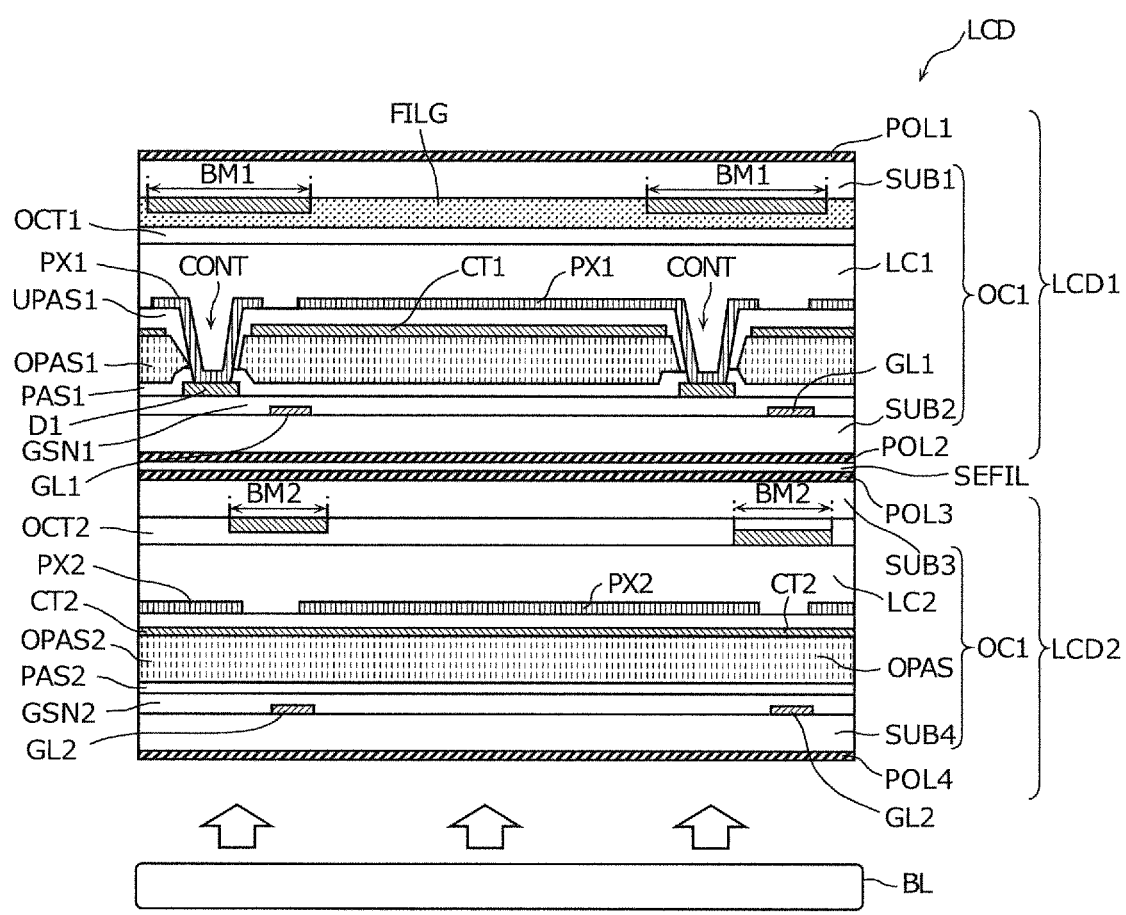
FIG. 4 is a sectional view illustrating the liquid crystal display device according to the first exemplary embodiment.
Figure 7:
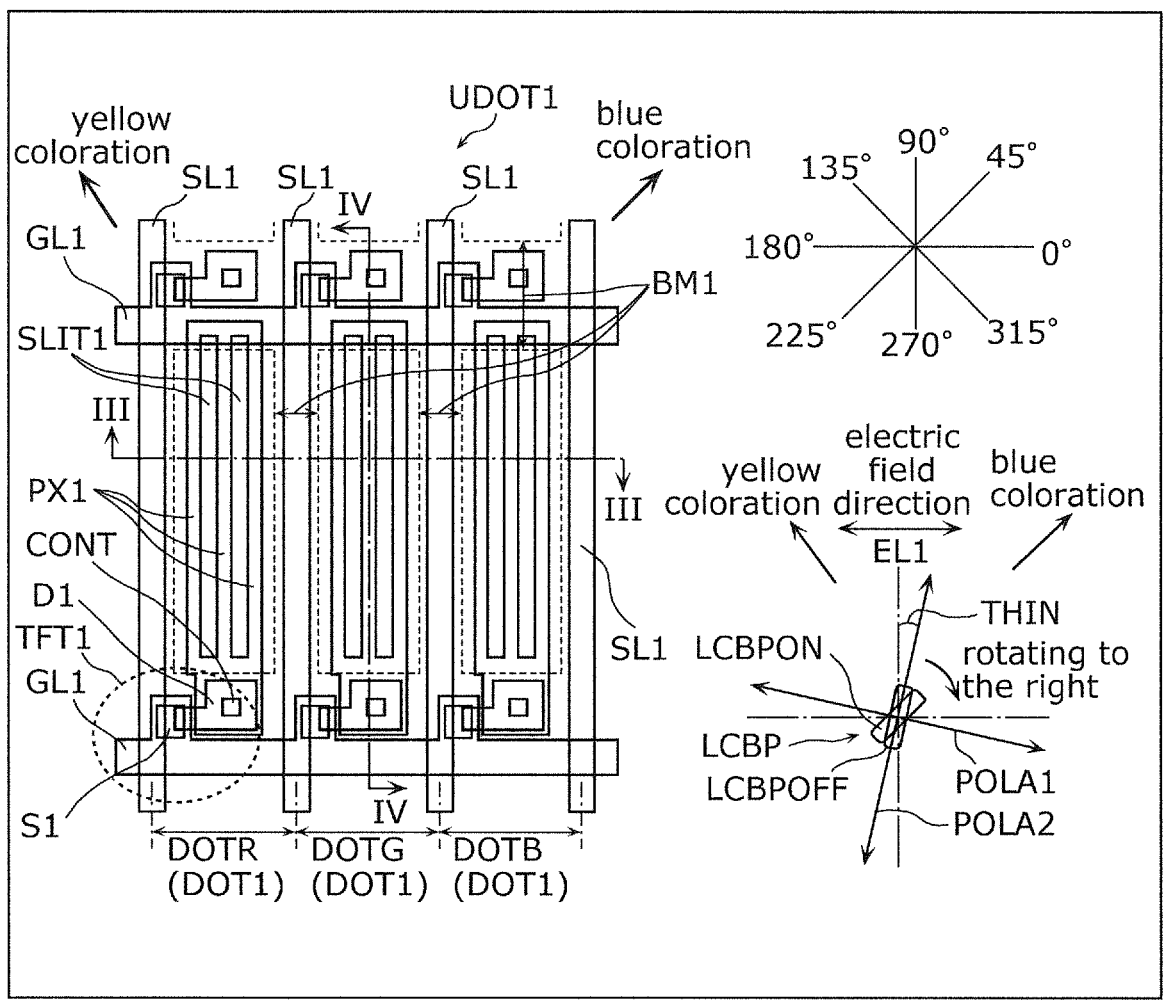
FIG. 7 is a view illustrating a pixel layout of the first liquid crystal display panel according to the first exemplary embodiment, and illustrating rotation of a liquid crystal molecule in the first liquid crystal layer of the first liquid crystal cell.
Figure 8:
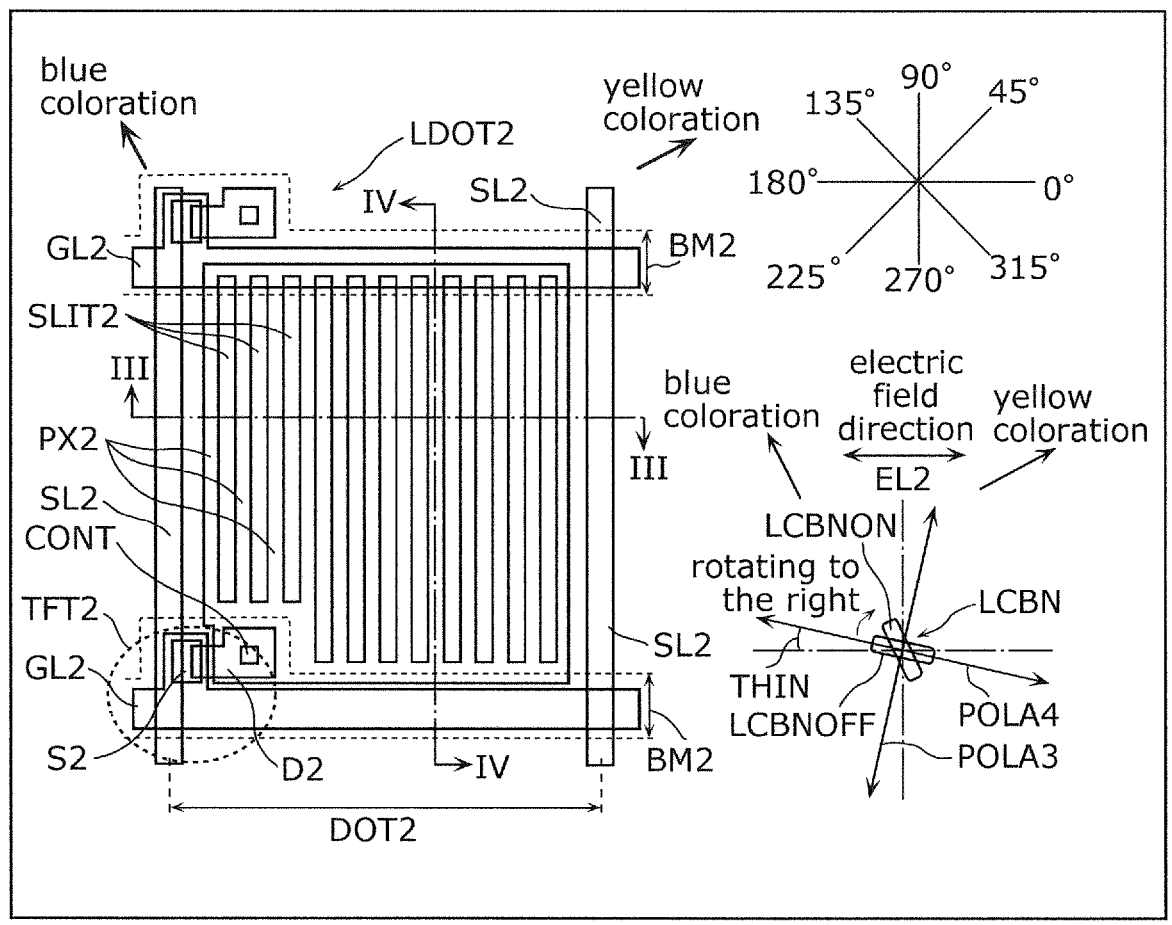
FIG. 8 is a view illustrating a pixel layout of the second liquid crystal display panel according to the first exemplary embodiment, and illustrating rotation of a liquid crystal molecule in the second liquid crystal layer of the second liquid crystal cell.

FIGS. 3 and 4 are a sectional view illustrating liquid crystal display device LCD according to the first exemplary embodiment. FIG. 3 is a sectional view taken along line in FIGS. 7 and 8, and FIG. 4 is a sectional view taken along line IV-IV in FIGS. 7 and 8.

Figure 5A:
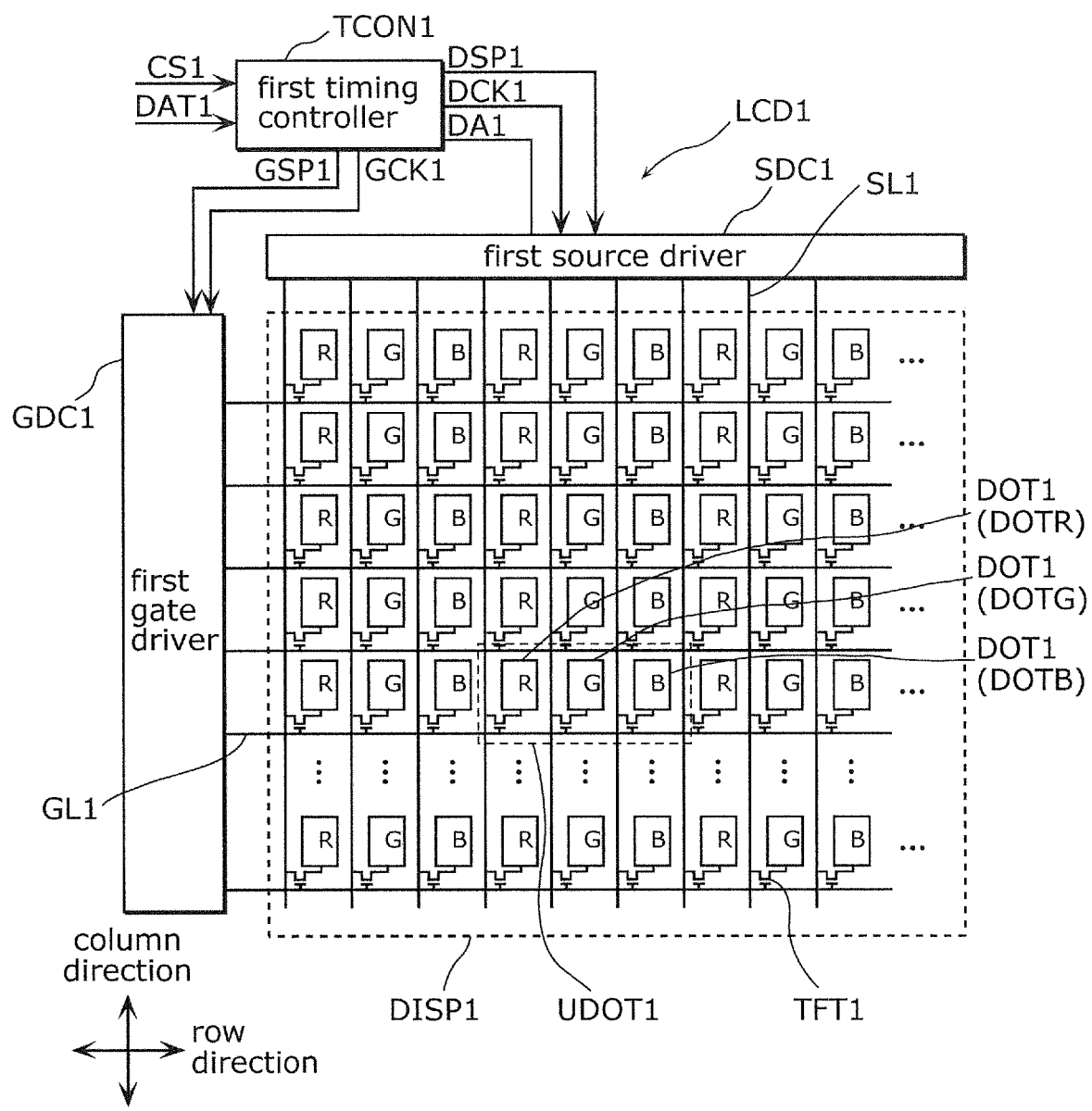
FIG. 5A is a view illustrating a schematic configuration of the first liquid crystal display panel in the liquid crystal display device according to the first exemplary embodiment.
Figure 5B:
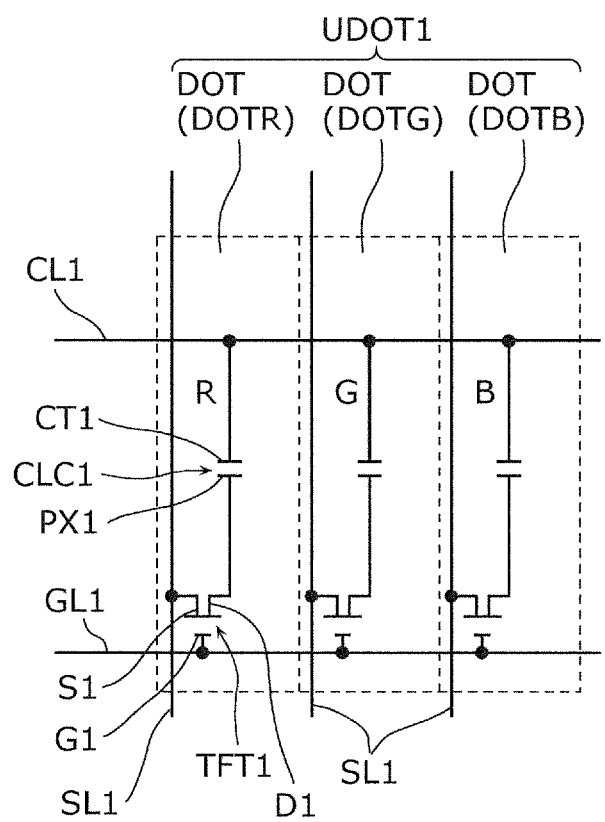
FIG. 5B is a view illustrating a circuit configuration of one pixel of the first liquid crystal display panel in FIG. 5A.
Figure 6A:
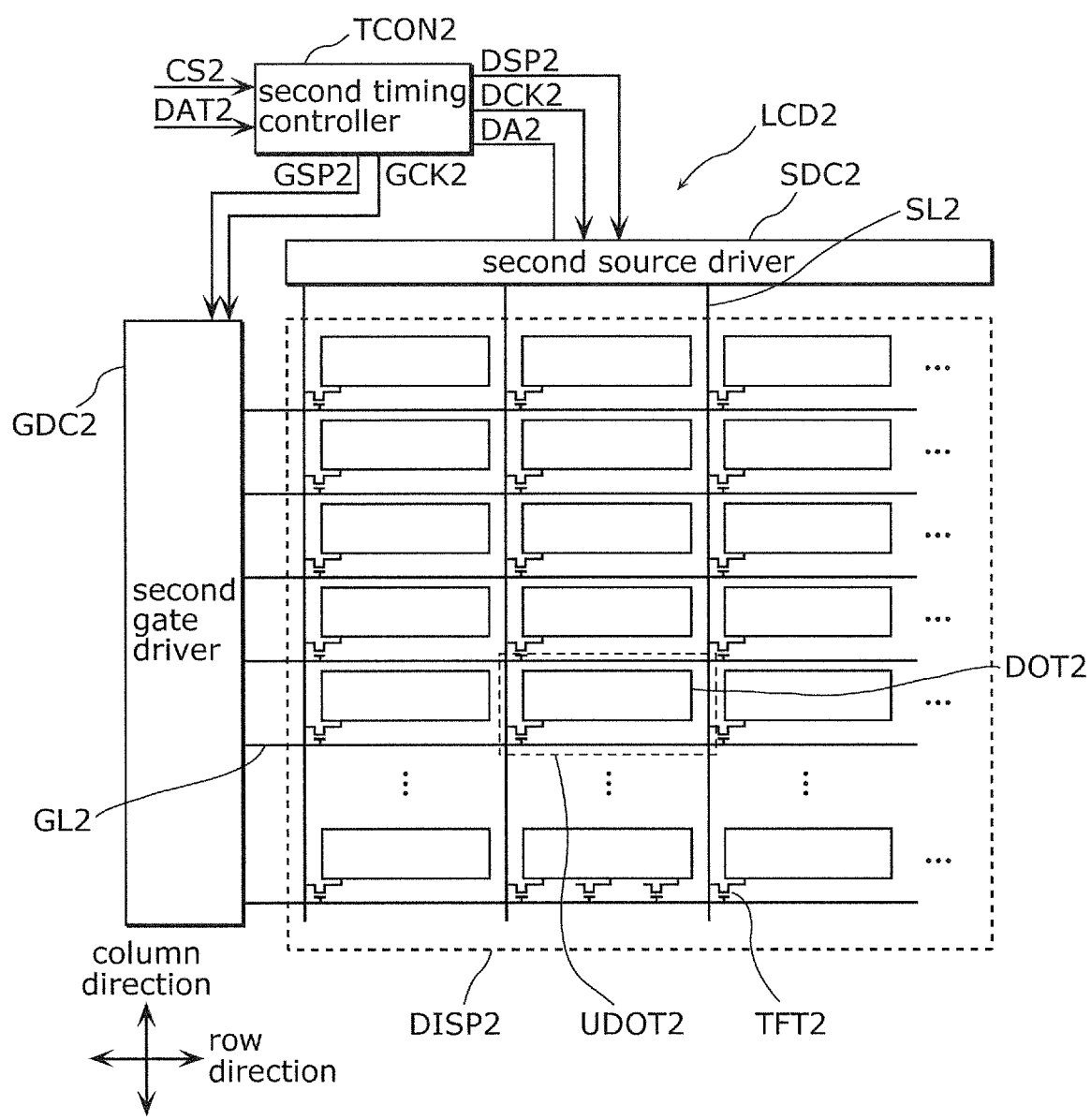
FIG. 6A is a view illustrating a schematic configuration of a second liquid crystal display panel in the liquid crystal display device according to the first exemplary embodiment.
Figure 6B:
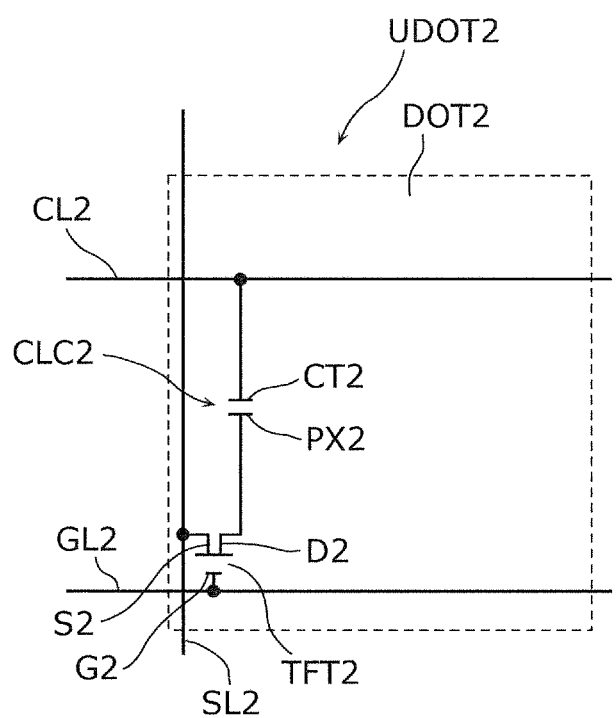
FIG. 6B is a view illustrating a circuit configuration of one pixel of the second liquid crystal display panel in FIG. 6A.

FIG. 5A is a view illustrating a schematic configuration of first liquid crystal display panel LCD1 in liquid crystal display device LCD, and FIG. 5B is a view illustrating a circuit configuration of one pixel UDOT1 of first liquid crystal display panel LCD1 in FIG. 5A. FIG. 6A is a view illustrating a schematic configuration of second liquid crystal display panel LCD2 in liquid crystal display device LCD, and FIG. 6B is a view illustrating a circuit configuration of one pixel LDOT2 of second liquid crystal display panel LCD2 in FIG. 6A.

As illustrated in FIGS. 3 and 4, first liquid crystal display panel LCD1 includes first liquid crystal cell OC1, first polarizing plate POL1, and second polarizing plate POL2. First liquid crystal cell OC1 includes first liquid crystal layer LC1 provided between first substrate SUB1 and second substrate SUB2.

Second liquid crystal display panel LCD2 includes second liquid crystal cell OC2, third polarizing plate POL3, and fourth polarizing plate POL4. Second liquid crystal cell OC2 includes second liquid crystal layer LC2 provided between third substrate SUB3 and fourth substrate SUB4.

In liquid crystal display device LCD, first liquid crystal cell OC1 is disposed at a position (a front side) closer to an observer, and second liquid crystal cell OC2 is disposed at a position (a rear side) farther away from the observer than first liquid crystal cell OC1 is. First liquid crystal cell OC1 and second liquid crystal cell OC2 are laminated such that second substrate SUB2 and third substrate SUB3 are located inside (that is, such that first substrate SUB1 and fourth substrate SUB4 are located outside).

As illustrated in FIG. 5A, first image display region DISP1 of first liquid crystal display panel LCD1 is formed by a plurality of pixels UDOT1. One pixel UDOT1 is formed by a plurality of first dots DOT1. The plurality of first dots DOT1 is arrayed into a matrix shape, and each of the plurality of first dots DOT1 is a sub-pixel constituting a display unit region. As illustrated in FIG. 5B, in the first exemplary embodiment, one pixel UDOT1 (a first pixel) is formed by three first dots DOT1, namely, red dot (red sub-pixel) DOTR, green dot (green sub-pixel) DOTG, and blue dot (blue sub-pixel) DOTB, which are arrayed in a row direction.

As illustrated in FIG. 6A, second image display region DISP2 of second liquid crystal display panel LCD2 is formed by a plurality of pixels LDOT2 (second pixels). As illustrated in FIG. 6B, in the first exemplary embodiment, one pixel LDOT2 is formed by one second dot DOT2. As illustrated in FIG. 6A, a plurality of second dots DOT2 (pixels LDOT2) are arrayed into a matrix shape, and each of the plurality of second dots DOT2 constitutes a display unit region.

In planar view of liquid crystal display device LCD, one pixel UDOT1 in first image display region DISP1 of first liquid crystal display panel LCD1 and one pixel LDOT2 in second image display region DISP2 of second liquid crystal display panel LCD2 correspond to and overlap each other. That is, one second dot DOT2 (pixel LDOT2) of second image display region DISP2 corresponds to three first dots DOT1 (red dot DOTR, green dot DOTG, and blue dot DOTB) of first image display region DISP1.

[First Liquid Crystal Cell]

As illustrated in FIGS. 3 and 4, first liquid crystal cell OC1 includes first substrate SUB1, second substrate SUB2 opposing first substrate SUB1, and first liquid crystal layer LC1 disposed between first substrate SUB1 and second substrate SUB2.

First liquid crystal layer LC1 is sealed between first substrate SUB1 and second substrate SUB2. In the first exemplary embodiment, positive liquid crystal molecule LCBP having positive dielectric anisotropy is used as a liquid crystal material for first liquid crystal layer LC1. Because first liquid crystal cell OC1 is driven by the transverse electric field system, an electric field that is substantially parallel to first substrate SUB1 and second substrate SUB2 (a transverse electric field) is provided to liquid crystal molecule LCBP. Therefore, liquid crystal molecule LCBP rotates in a substantially horizontal plane relative to a substrate surface.

In the first exemplary embodiment, first substrate SUB1 is located on the observer side, and second substrate SUB2 is located on the side of backlight BL.

First substrate SUB1 is a counter substrate (a first counter substrate) opposing second substrate SUB2. In the first exemplary embodiment, first substrate SUB1 is a CF substrate in which color filter FIL is formed on a transparent substrate such as a glass substrate.

Specifically, a light transmission unit that transmits light and first black matrix BM1 (a light shielding unit) that obstructs the light transmission are formed in first substrate SUB1. The light transmission unit is surrounded by first black matrix BM1. For example, the light transmission unit is formed into a rectangular shape. That is, a plurality of matrix-shape openings constituting the plurality of first dots DOT1 is formed in first black matrix BM1.

Color filter FIL is formed in the light transmission unit of first substrate SUB1 according to each first dot DOT1. Specifically, color filter FIL includes red color filter FILR (a red layer) that transmits red light, green color filter FILG (a green layer) that transmits green light, and blue color filter FILB (a blue layer) that transmits blue light. Red color filter FILR, green color filter FILG, and blue color filter FILB are repetitively arrayed in this order in the row direction. Color filters FIL having an identical color are arrayed in a column direction. First black matrix BM1 is formed in a boundary of color filters FIL adjacent to each other in the row direction and the column direction. Each of the plurality of first dots DOT1 is provided so as to correspond to each color filter FIL, and the plurality of first dots DOT1 is formed by red dot DOTR corresponding to red color filter FILR, green dot DOTG corresponding to green color filter FILG, and blue dot DOTB corresponding to blue color filter FILB as illustrated in FIG. 3. As illustrated in FIGS. 5A and 5B, in first liquid crystal cell OC1, red dot DOTR, green dot DOTG, and blue dot DOTB are repetitively arrayed in this order in the row direction, and first dots DOT1 of the identical color are arrayed in the column direction.

In first substrate SUB1, first overcoat layer OCT1 is formed so as to cover color filter FIL. Although not illustrated, an alignment film is formed on a surface of first overcoat layer OCT1.

Second substrate SUB2 is a thin film transistor (TFT) substrate (a first TFT substrate) in which a TFT layer is formed on a transparent substrate such as a glass substrate.

In second substrate SUB2, as illustrated in FIG. 5A, a plurality of first source wirings (data lines) SL1 extending in a first direction (for example, the column direction), and a plurality of first gate wirings GL1 extending in a second direction (for example, the row direction) intersecting the first direction are formed, and first thin film transistor TFT1 is formed near an intersection between each of the plurality of first source wirings SL1 and each of the plurality of first gate wirings GL1. In plan view of first liquid crystal cell OC1, a region surrounded by two first source wirings SL1 adjacent to each other and two first gate wirings GL1 adjacent to each other is defined as one first dot DOT1, and the plurality of first dots DOT1 is disposed into a matrix shape (the row direction and the column direction). In the first exemplary embodiment, the plurality of first source wirings SL1 is disposed at equal intervals in the row direction, and the plurality of first gate wirings GL1 is disposed at equal intervals in the column direction. First source wiring SL1 and first gate wiring GL1, which are formed into a lattice shape, extend so as to overlap first black matrix BM1 in planar view. That is, first source wiring SL1 and first gate wiring GL1 are formed so as to overlap the boundary of adjacent color filters FIL in planar view.

In second substrate SUB2, as illustrated in FIGS. 3 and 5B, first pixel electrode PX1 and first common electrode CT1 are formed in each first dot DOT1. As illustrated in FIG. 5B, first common wiring CL1 connected to first common electrode CT1 of each first dot DOT1 is formed in second substrate SUB2 over the plurality of first dots DOT1. In each first dot DOT1, liquid crystal capacitance (pixel capacitance) CLC1 is generated by first pixel electrode PX1 and first common electrode CT1. First thin film transistor TFT1 includes first source electrode S1 electrically connected to first source wiring SL1, first drain electrode D1 electrically connected to first pixel electrode PX1 through contact hole CONT, and first gate electrode G1 electrically connected to first gate wiring GL1.

As illustrated in FIGS. 3 and 4, gate insulator GSN1 is formed so as to cover first gate wiring GL1, first source wiring SL1 is formed on gate insulator GSN1, and protective film PAS1 and organic film OPAS1 are formed so as to cover first source wiring SL1. First common electrode CT1 is formed on organic film OPAS1, and protective film UPAS1 is formed so as to cover first common electrode CT1. First pixel electrode PX1 is formed on protective film UPAS1, and an alignment film (not illustrated) is formed so as to cover first pixel electrode PX1.

As illustrated in FIG. 5A, based on first image data DAT1 and first control signal CS1 (such as a clock signal, a vertical synchronizing signal, and a horizontal synchronizing signal), which are output from image processor IPU, first timing controller TCON1 generates first image data DA1 and various timing signals (data start pulse DSP1, data clock DCK1, gate start pulse GSP1, and gate clock GCK1) that control drive of first source driver SDC1 and first gate driver GDC1. First timing controller TCON1 outputs first image data DA1, data start pulse DSP1, and data clock DCK1 to first source driver SDC1, and outputs gate start pulse GSP1 and gate clock GCK1 to first gate driver GDC1.

First source driver SDC1 outputs a data voltage (A data signal) corresponding to first image data DA1 to first source wiring SL1 based on data start pulse DSP1 and data clock DCK1. First gate driver GDC1 outputs a gate voltage (a gate signal) to first gate wiring GL1 based on gate start pulse GSP1 and gate clock GCK1.

First source driver SDC1 supplies the data voltage to each first source wiring SL1, and first gate driver GDC1 supplies the gate voltage to each first gate wiring GL1. Common voltage Vcom is supplied from a common driver (not illustrated) to first common electrode CT1. When the gate voltage (gate-on voltage) is supplied to first gate wiring GL1, first thin film transistor TFT1 connected to first gate wiring GL1 is turned on, and the data voltage is supplied to first pixel electrode PX1 through first source wiring SL1 connected to first thin film transistor TFT1. An electric field is generated by a difference between the data voltage supplied to first pixel electrode PX1 and common voltage Vcom supplied to first common electrode CT1. The electric field drives liquid crystal molecule LCBP, and therefore transmittance of light of backlight BL transmitted through second liquid crystal display panel LCD2 is controlled to display the image. In first liquid crystal cell OC1, the color image is displayed by supplying a desired data voltage to first source wiring SL1 connected to first pixel electrode PX1 of each first dot DOT1 (red dot DOTR, green dot DOTG, and blue dot DOTB).

[Second Liquid Crystal Cell]

As illustrated in FIGS. 3 and 4, second liquid crystal cell OC2 includes third substrate SUB3, fourth substrate SUB4 opposing third substrate SUB3, and second liquid crystal layer LC2 disposed between third substrate SUB3 and fourth substrate SUB4.

Second liquid crystal layer LC2 is sealed between third substrate SUB3 and fourth substrate SUB4. In the first exemplary embodiment, unlike liquid crystal molecule LCBP of first liquid crystal layer LC1 of first liquid crystal cell OC1, negative liquid crystal molecule LCBN having negative dielectric anisotropy is used as a liquid crystal material for second liquid crystal layer LC2. Because second liquid crystal cell OC2 is also driven by the transverse electric field system, the electric field (the transverse electric field) in substantially parallel to third substrate SUB3 and fourth substrate SUB4 is provided to liquid crystal molecule LCBN. Therefore, liquid crystal molecule LCBN rotates in the substantially horizontal plane relative to the substrate surface.

In the first exemplary embodiment, third substrate SUB3 is located on the observer side, and fourth substrate SUB4 is located on the side of backlight BL.

Third substrate SUB3 is a counter substrate (a second counter substrate) opposing fourth substrate SUB4. Third substrate SUB3 is formed by a transparent substrate such as a glass substrate, and a light transmission unit that transmits light and second black matrix BM2 (the light shielding unit) that obstructs the light transmission are formed in third substrate SUB3. The light transmission unit is surrounded by second black matrix BM2. For example, the light transmission unit is formed into a rectangular shape. That is, a plurality of matrix-shape openings constituting the plurality of second dots DOT2 is formed in second black matrix BM2. Second black matrix BM2 (the light shielding unit) that obstructs the light transmission is formed.

In third substrate SUB3, second overcoat layer OCT2 is formed so as to cover second black matrix BM2. Although not illustrated, an alignment film is formed on a surface of second overcoat layer OCT2.

Unlike first substrate SUB1, the color filter is not formed in the light transmission unit of third substrate SUB3. Accordingly, the opening of second black matrix BM2 is filled with second overcoat layer OCT2. Accordingly, the opening of second black matrix BM2 is filled with second overcoat layer OCT2.

Fourth substrate SUB4 is a TFT substrate (a second TFT substrate) in which a TFT layer is formed on a transparent substrate such as a glass substrate. In fourth substrate SUB4, as illustrated in FIG. 6A, a plurality of second source wirings (data lines) SL2 extending in the first direction (for example, the column direction), and a plurality of second gate wirings GL2 extending in the second direction (for example, the row direction) intersecting the first direction are formed, and second thin film transistor TFT2 is formed near an intersection between each of the plurality of plurality of second source wirings SL2 and each of the plurality of second gate wirings GL2. In plan view of second liquid crystal cell OC2, a region surrounded by two second source wirings SL2 adjacent to each other and two second gate wirings GL2 adjacent to each other is defined as one second dot DOT2, and the plurality of second dots DOT2 is disposed into a matrix shape (the row direction and the column direction). In the first exemplary embodiment, the plurality of second source wirings SL2 is disposed at equal intervals in the row direction, and the plurality of second gate wirings GL2 is disposed at equal intervals in the column direction. Second source wiring SL2 and second gate wiring GL2, which are formed into a lattice shape, extend so as to overlap second black matrix BM2 in planar view.

In fourth substrate SUB4, as illustrated in FIGS. 3 and 6B, second pixel electrode PX2 and second common electrode CT2 are formed in each second dot DOT2. As illustrated in FIG. 6B, second common wiring CL2 connected to second common electrode CT2 of each second dot DOT2 is formed in fourth substrate SUB4 so as to straddle the plurality of second dots DOT2. In each second dot DOT2, liquid crystal capacitance (pixel capacitance) CLC2 is generated by second pixel electrode PX2 and second common electrode CT2. Second thin film transistor TFT2 includes second source electrode S2 electrically connected to second source wiring SL2, second drain electrode D2 electrically connected to second pixel electrode PX2 through contact hole CONT, and second gate electrode G2 electrically connected to second gate wiring GL2.

As illustrated in FIGS. 3 and 4, gate insulator GSN2 is formed so as to cover second gate wiring GL2, second source wiring SL2 is formed on gate insulator GSN2, and protective film PAS2 and organic film OPAS2 are formed so as to cover second source wiring SL2. Second common electrode CT2 is formed on organic film OPAS2, and protective film UPAS2 is formed so as to cover second common electrode CT2. Second pixel electrode PX2 is formed on protective film UPAS2, and an alignment film (not illustrated) is formed so as to cover second pixel electrode PX2.

As illustrated in FIG. 6A, based on second image data DAT2 and second control signal CS2 (such as a clock signal, a vertical synchronizing signal, and a horizontal synchronizing signal), which are output from image processor IPU, second timing controller TCON2 generates second image data DA2 and various timing signals (data start pulse DSP2, data clock DCK2, gate start pulse GSP2, and gate clock GCK2) that control drive of second source driver SDC2 and second gate driver GDC2 (see FIG. 4). Second timing controller TCON2 outputs second image data DA2, data start pulse DSP2, and data clock DCK2 to second source driver SDC2, and outputs gate start pulse GSP2 and gate clock GCK2 to second gate driver GDC2.

Second source driver SDC2 outputs a data voltage (a data signal) corresponding to second image data DA2 to second source wiring SL2 based on data start pulse DSP2 and data clock DCK2. Second gate driver GDC2 outputs a gate voltage (a gate signal) to second gate wiring GL2 based on gate start pulse GSP2 and gate clock GCK2.

Second source driver SDC2 supplies the data voltage to each second source wiring SL2, and second gate driver GDC2 supplies the gate voltage to each second gate wiring GL2. Common voltage Vcom is supplied from the common driver (not illustrated) to second common electrode CT2. When the gate voltage (the gate-on voltage) is supplied to second gate wiring GL2, second thin film transistor TFT2 connected to second gate wiring GL2 is turned on, and the data voltage is supplied to second pixel electrode PX2 through second source wiring SL2 connected to second thin film transistor TFT2. An electric field is generated by a difference between the data voltage supplied to second pixel electrode PX2 and common voltage Vcom supplied to second common electrode CT2. The electric field drives liquid crystal molecule LCBP, and therefore the transmittance of the light of backlight BL is controlled to display the image. In second liquid crystal cell OC2, the black-and-white image is displayed by supplying a desired data voltage to second source wiring SL2 connected to second pixel electrode PX2 of each second dot DOT2.

[First to Fourth Polarizing Plates]

First polarizing plate POL1 and second polarizing plate POL2 are disposed so as to sandwich first liquid crystal cell OC1. In the first exemplary embodiment, first polarizing plate POL1 is disposed on the observer side of first liquid crystal cell OC1, and second polarizing plate POL2 is disposed on the side of backlight BL of first liquid crystal cell OC1. First polarizing plate POL1 and second polarizing plate POL2 are disposed such that a crossed Nicol positional relationship holds. That is, an absorption axis (a polarization axis) of first polarizing plate POL1 and an absorption axis (a polarization axis) of second polarizing plate POL2 are substantially orthogonal to each other.

Third polarizing plate POL3 and fourth polarizing plate POL4 are disposed so as to sandwich second liquid crystal cell OC2. In the first exemplary embodiment, third polarizing plate POL3 is disposed on the observer side of second liquid crystal cell OC2, and fourth polarizing plate POL4 is disposed on the side of backlight BL of second liquid crystal cell OC2. Third polarizing plate POL3 and fourth polarizing plate POL4 are disposed such that the crossed Nicol positional relationship holds. That is, an absorption axis of third polarizing plate POL3 and an absorption axis of fourth polarizing plate POL4 are substantially orthogonal to each other.

In the first exemplary embodiment, the polarization axes of second polarizing plate POL2 and third polarizing plate POL3 are substantially parallel to each other. That is, directions of the polarization axes of second polarizing plate POL2 and third polarizing plate POL3 are substantially matched with each other. Specifically, the absorption axis of second polarizing plate POL2 and the absorption axis of third polarizing plate POL3 are substantially parallel to each other, in other words, the direction of the absorption axis of second polarizing plate POL2 and the direction of the absorption axis of third polarizing plate POL3 are substantially matched with each other.

Polarization axes of first polarizing plate POL1 and fourth polarizing plate POL4 are substantially parallel to each other. That is, the directions of the polarization axes of first polarizing plate POL1 and fourth polarizing plate POL4 are substantially matched with each other. Specifically, the absorption axis of first polarizing plate POL1 and the absorption axis of fourth polarizing plate POL4 are substantially parallel to each other, in other words, the direction of the absorption axis of first polarizing plate POL1 and the direction of the absorption axis of fourth polarizing plate POL4 are substantially matched with each other.

Accordingly, in the first exemplary embodiment, the polarization axes (the absorption axes) of first polarizing plate POL1 and fourth polarizing plate POL4 are substantially orthogonal to the polarization axes (the absorption axes) of second polarizing plate POL2 and third polarizing plate POL3.

Second polarizing plate POL2 and third polarizing plate POL3 are disposed between first liquid crystal cell OM and second liquid crystal cell OC2, and adhesive layer SEFIL is disposed between second polarizing plate POL2 and third polarizing plate POL3.

[Operation of Liquid Crystal Display Device]

A layout of a dot (a pixel) of liquid crystal display device LCD according to the first exemplary embodiment and movement of a liquid crystal molecule in each dot in will be described below with reference to FIGS. 7 and 8.

FIG. 7 is a view illustrating a layout of pixel UDOT1 in first liquid crystal display panel LCD1 according to the first exemplary embodiment, and illustrating rotation of liquid crystal molecule LCBP in first liquid crystal layer LC1 of first liquid crystal cell OC1 according to the first exemplary embodiment. FIG. 8 is a view illustrating a layout of pixel LDOT2 in second liquid crystal display panel LCD2 according to the first exemplary embodiment, and illustrating rotation of liquid crystal molecule LCBN in second liquid crystal layer LC2 of second liquid crystal cell OC2 according to the first exemplary embodiment.

As illustrated in FIG. 7, in first liquid crystal display panel LCD1 (first liquid crystal cell OC1), first source wiring SL1 extends in the column direction, and first pixel electrode PX1 extends in substantially parallel (in the first exemplary embodiment, the column direction) to first source wiring SL1. That is, first pixel electrode PX1 has a longitudinal direction extending along first source wiring SL1. Specifically, a plurality of slits SLIT1 extending in substantially parallel to first source wiring SL1 is formed in first pixel electrode PX1.

First gate wiring GL1 extends in the row direction, and first pixel electrode PX1 extends in a direction substantially orthogonal to first gate wiring GL1. That is, the plurality of slits SLIT1 of first pixel electrode PX1 extend so as to be substantially orthogonal to first gate wiring GL1.

As illustrated in FIG. 7, in first liquid crystal display panel LCD1 (first liquid crystal cell OC1), liquid crystal molecule LCBP of first liquid crystal layer LC1 is of the positive type. In first liquid crystal cell OC1, an alignment axis of first substrate SUB1 and an alignment axis of second substrate SUB2 against liquid crystal molecule LCBP of first liquid crystal layer LC1 are substantially parallel to each other. That is, an alignment direction of the alignment film of first substrate SUB1 and an alignment direction of the alignment film of second substrate SUB2 are substantially identical to each other. For example, the alignment direction of the alignment film becomes a rubbing direction when the alignment film is subjected to a rubbing process.

In first liquid crystal layer LC1 according to the first exemplary embodiment, when the voltage is not applied to first pixel electrode PX1 and first common electrode CT1 (for the black display), initial alignment angle THIN of liquid crystal molecule LCBPOFF in an initial alignment state in first liquid crystal layer LC1 is set so as to rotate to the right (clockwise) based on a 90°-270° line.

Initial alignment angle THIN of liquid crystal molecule LCBPOFF is an angle formed between the 90°-270° line and a long axis direction (an initial alignment axis direction) of liquid crystal molecule LCBPOFF presenting near a boundary of the alignment film in each of first substrate SUB1 and second substrate SUB2. The long axis direction of liquid crystal molecule LCBPOFF is substantially matched with the direction of polarization axis (absorption axis) POLA2 of second polarizing plate POL2. That is, the long axis direction of liquid crystal molecule LCBPOFF is substantially orthogonal to the direction of polarization axis (absorption axis) POLA1 of first polarizing plate POL1. For example, initial alignment angle THIN of liquid crystal molecule LCBPOFF has a range of 0°<THIN<20°.

When the voltage is applied to first pixel electrode PX1 and first common electrode CT1, an electric field (transverse electric field EL1) substantially parallel to first substrate SUB1 and second substrate SUB2 is generated between first pixel electrode PX1 and first common electrode CT1. In the first exemplary embodiment, because first pixel electrode PX1 extends in the column direction substantially parallel to first source wiring SL1, transverse electric field EL1 is generated in the row direction (a direction of a 0°-180° line) as illustrated in FIG. 7.

When transverse electric field EL1 is generated, liquid crystal molecule LCBP of first liquid crystal layer LC1 rotates according to initial alignment angle THIN. Specifically, when transverse electric field EL1 is generated, liquid crystal molecule LCBP rotates to the right from a state of liquid crystal molecule LCBPOFF to a position of a predetermined angle (for example, 45°), and becomes a state (white display) of liquid crystal molecule LCBPON.

On the other hand, as illustrated in FIG. 8, in second liquid crystal display panel LCD2 (second liquid crystal cell OC2), second source wiring SL2 extends in the column direction, and second pixel electrode PX2 extends in substantially parallel to second source wiring SL2. That is, second pixel electrode PX2 has a longitudinal direction extending along second source wiring SL2. Specifically, a plurality of slits SLIT2 extending in substantially parallel to second source wiring SL2 is formed in second pixel electrode PX2.

Second gate wiring GL2 extends in the row direction, and second pixel electrode PX2 extends in a direction substantially orthogonal to second gate wiring GL2. That is, the plurality of slits SLIT2 of second pixel electrode PX2 extends so as to be substantially orthogonal to second gate wiring GL2.

As illustrated in FIG. 8, in second liquid crystal display panel LCD2 (second liquid crystal cell OC2), liquid crystal molecule LCBN of second liquid crystal layer LC2 is of the negative type unlike liquid crystal molecule LCBP of first liquid crystal layer LC1. In second liquid crystal cell OC2, an alignment axis of third substrate SUB3 and an alignment axis of fourth substrate SUB4 against liquid crystal molecule LCBN of second liquid crystal layer LC2 are substantially parallel to each other. That is, the alignment direction of the alignment film of third substrate SUB3 and the alignment direction of the alignment film of fourth substrate SUB4 are substantially identical to each other.

In second liquid crystal layer LC2 according to the first exemplary embodiment, when the voltage is not applied to second pixel electrode PX2 and second common electrode CT2 (for the black display), initial alignment angle THIN of liquid crystal molecule LCBNOFF in the initial alignment state in second liquid crystal layer LC2 is set so as to rotate to the right (clockwise) based on the 0°-180° line. That is, initial alignment angle THIN of the negative type liquid crystal molecule LCBN is set to the electric field direction.

Initial alignment angle THIN of liquid crystal molecule LCBNOFF is an angle formed between the 0°-180° line and the long axis direction (initial alignment axis direction) of liquid crystal molecule LCBNOFF existing near the boundary of the alignment film in each of third substrate SUB3 and fourth substrate SUB4. The long axis direction of liquid crystal molecule LCBNOFF is substantially matched with the direction of polarization axis (absorption axis) POLA4 of fourth polarizing plate POL4. That is, the long axis direction of liquid crystal molecule LCBNOFF is substantially orthogonal to the direction of polarization axis (absorption axis) POLA3 of third polarizing plate POL3. For example, initial alignment angle THIN of liquid crystal molecule LCBNOFF has a range of 0°<THIN<20°.

When the voltage is applied to second pixel electrode PX2 and second common electrode CT2, an electric field (transverse electric field EL2) substantially parallel to third substrate SUB3 and fourth substrate SUB4 is generated between second pixel electrode PX2 and second common electrode CT2. In the first exemplary embodiment, because second pixel electrode PX2 extends in the column direction substantially parallel to second source wiring SL2, transverse electric field EL2 is generated in the row direction (the direction of the 0°-180° line) as illustrated in FIG. 8.

When transverse electric field EL2 is generated, liquid crystal molecule LCBN of second liquid crystal layer LC2 rotates according to initial alignment angle THIN. Specifically, when transverse electric field EL2 is generated, liquid crystal molecule LCBN rotates to the right from the state of liquid crystal molecule LCBNOFF to a position of a predetermined angle (for example, 45°), and becomes the state (white display) of liquid crystal molecule LCBNON.

In liquid crystal display device LCD according to the first exemplary embodiment, the alignment axes of first substrate SUB1 and second substrate SUB2 in first liquid crystal display panel LCD1 are substantially orthogonal to the alignment axes of third substrate SUB3 and fourth substrate SUB4 in second liquid crystal display panel LCD2. Therefore, when transverse electric fields EL1 and EL2 are not generated in first liquid crystal cell OC1 and second liquid crystal cell OC2, the long axis direction (the alignment axis direction) of liquid crystal molecule LCBP of first liquid crystal layer LC1 is substantially orthogonal to the long axis direction (the alignment axis direction) of liquid crystal molecule LCBN of second liquid crystal layer LC2.

When the voltage is applied to first pixel electrode PX1 and first common electrode CT1 in first dot DOT1 of first liquid crystal cell OC1 while the voltage is applied to second pixel electrode PX2 and second common electrode CT2 in second dot DOT2 of second liquid crystal cell OC2, transverse electric field EL1 is generated only in one direction in first dot DOT1 while transverse electric field EL2 is generated only in one direction in second dot DOT2. At this point, in the first exemplary embodiment, the direction of transverse electric field EL1 generated in first dot DOT1 is substantially identical to the direction of transverse electric field EL2 generated in second dot DOT2.

When transverse electric fields EL1 and EL2 are generated, liquid crystal molecule LCBP of first dot DOT1 of first liquid crystal layer LC1 rotates while liquid crystal molecule LCBN of second dot DOT2 of second liquid crystal layer LC2 rotates. In the first exemplary embodiment, a rotational direction of liquid crystal molecule LCBP of first liquid crystal layer LC1 and a rotational direction of liquid crystal molecule LCBN of second liquid crystal cell OC2 are identical to each other, and both liquid crystal molecule LCBP and liquid crystal molecule LCBN rotate to the right.

Therefore, the long axis direction of liquid crystal molecule LCBPON rotating to the right by transverse electric field EL1 generated in first liquid crystal cell OC1 is substantially orthogonal to the long axis direction of liquid crystal molecule LCBNON rotating to the right by transverse electric field EL2 generated in second liquid crystal cell OC2. When transverse electric field EL1 is generated in first liquid crystal cell OC1 while transverse electric field EL2 is generated in second liquid crystal cell OC2, the long axis direction of liquid crystal molecule LCBPON of first liquid crystal layer LC1 is substantially matched with a short axis direction of liquid crystal molecule LCBNON of second liquid crystal layer LC2.

Accordingly, rotated liquid crystal molecule LCBP (liquid crystal molecule LCBPON) of first liquid crystal layer LC1 and rotated liquid crystal molecule LCBN (liquid crystal molecule LCBNON) of second liquid crystal layer LC2 can cancel and compensate for the hue change (the coloring) of first liquid crystal cell OC1 or second liquid crystal cell OC2.

Specifically, blue coloring in the case that liquid crystal molecule LCBPON rotating to the right in first liquid crystal cell OC1 is viewed from the long axis direction as illustrated in FIG. 7 can be canceled by yellow coloring in the case that liquid crystal molecule LCBNON rotating to the right in second liquid crystal cell OC2 is viewed from the short axis direction as illustrated in FIG. 8. The yellow coloring in the case that liquid crystal molecule LCBPON rotating to the right in first liquid crystal cell OC1 is viewed from the short axis direction can be canceled by the blue coloring in the case that liquid crystal molecule LCBNON rotating to the right in second liquid crystal cell OC2 is viewed from the long axis direction as illustrated in FIG. 8. Therefore, the coloring in a predetermined direction is canceled in the whole display screen of liquid crystal display device LCD, and the color viewing angle characteristic can be improved.

Liquid crystal display device LCD according to the first exemplary embodiment is configured such that the rotation of liquid crystal molecule LCBP of first liquid crystal layer LC1 and the rotation of liquid crystal molecule LCBN of second liquid crystal layer LC2 cancel and compensate for the hue change of first liquid crystal cell OC1 or second liquid crystal cell OC2.

Figure 43:
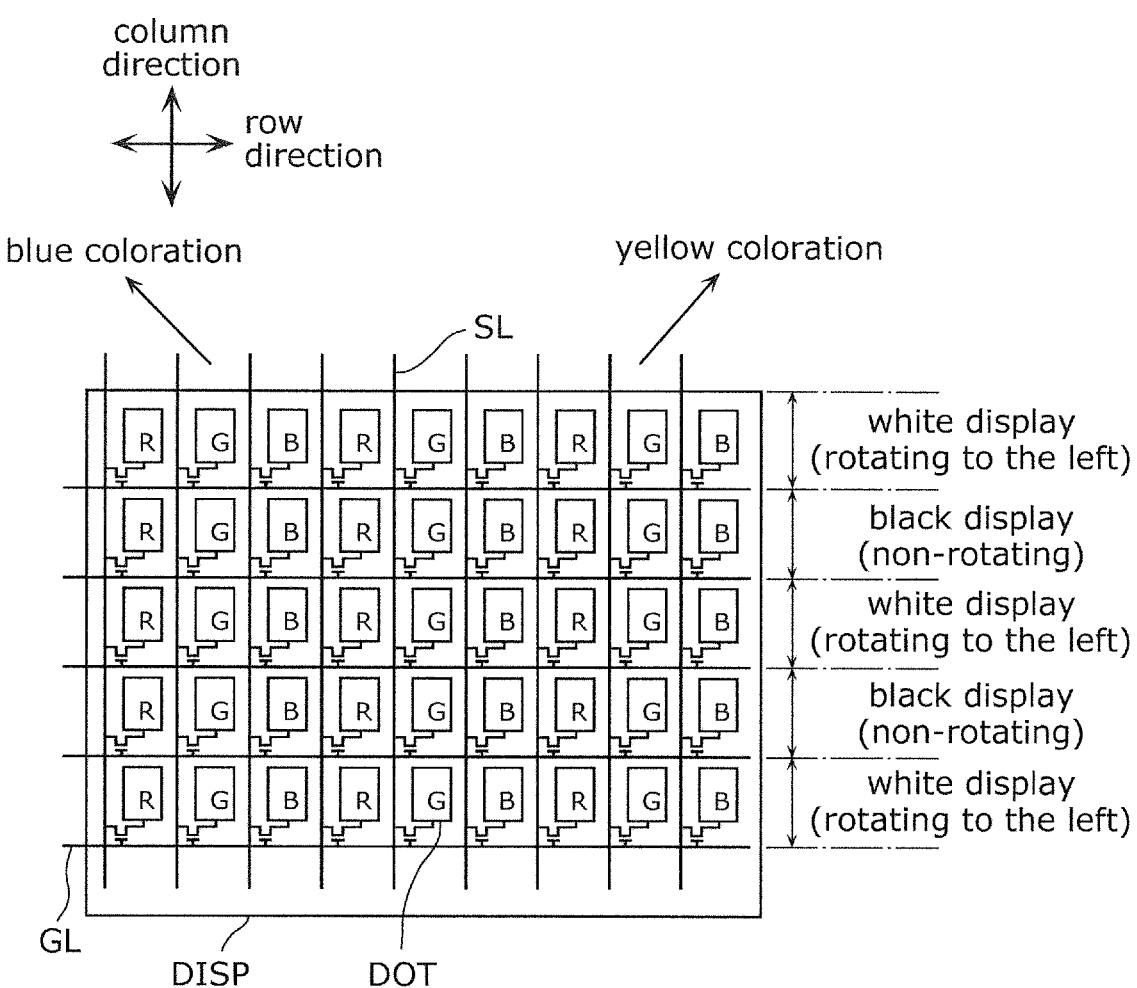
FIG. 43 is a view illustrating an example of image pattern display (alternate display of white line and black line) of the transverse electric field system liquid crystal display device by the each-row multi-domain system.

In liquid crystal display device LCD according to the first exemplary embodiment, both liquid crystal molecule LCBP of one first dot DOT1 of first liquid crystal cell OC1 and liquid crystal molecule LCBN of one second dot DOT2 of second liquid crystal cell OC2 are driven by a single-domain system. That is, in main transmission regions (the openings of first black matrix BM1 and second black matrix BM2) of first dot DOT1 and second dot DOT2, liquid crystal molecule LCBP of first dot DOT1 and liquid crystal molecule LCBN of second dot DOT2 rotate in one direction. Therefore, a region where the transmittance decreases is not generated unlike the one-pixel multi-domain system, and the transmittance is improved compared with the one-pixel multi-domain system, namely, an aperture ratio of the dot (the pixel) is improved. The color viewing angle characteristic for a specific image pattern display (see FIG. 43) is not degraded unlike the each-row multi-domain system.

Additionally, in the first exemplary embodiment, first pixel electrode PX1 of first liquid crystal display panel LCD1 (first liquid crystal cell OC1) and second pixel electrode PX2 of second liquid crystal display panel LCD2 (second liquid crystal cell OC2) are a longitudinal stripe pattern extending in the column direction. Therefore, the degrading of the transmittance (decrease of the aperture ratio) can be suppressed in first dot DOT1 of first liquid crystal display panel LCD1 (first liquid crystal cell OC1)

and second dot DOT2 of second liquid crystal display panel LCD2 (second liquid crystal cell OC2).

As described above, in liquid crystal display device LCD according to the first exemplary embodiment, the color viewing angle characteristic can be improved irrespective of the image display pattern without degrading the transmittance.

In the first exemplary embodiment, first liquid crystal display panel LCD1 is disposed on the observer side, and second liquid crystal display panel LCD2 is disposed on the side of backlight BL. However, the present disclosure is not limited to the first exemplary embodiment. Specifically, even if first liquid crystal display panel LCD1 is disposed on the side of backlight BL while second liquid crystal display panel LCD2 is disposed on the observer side, the hue change of first liquid crystal cell OC1 or second liquid crystal cell OC2 is canceled and compensated for, and the color viewing angle characteristic can be improved.

In the first exemplary embodiment, initial alignment angle THIN is set such that liquid crystal molecule LCBP of first liquid crystal cell OC1 and liquid crystal molecule LCBN of second liquid crystal cell OC2 rotate to the right (clockwise) by the transverse electric field. However, the present disclosure is not limited to the first exemplary embodiment. For example, initial alignment angle THIN may be set such that liquid crystal molecule LCBP of first liquid crystal cell OC1 and liquid crystal molecule LCBN of second liquid crystal cell OC2 rotate to the left (counterclockwise) by the transverse electric field. Even in this case, the hue change of first liquid crystal cell OC1 or second liquid crystal cell OC2 is canceled and compensated for, and the color viewing angle characteristic can be improved.

Modification of First Exemplary Embodiment

Liquid crystal display device LCD according to a modification of the first exemplary embodiment will be described below with reference to FIGS. 9 to 12.

Figure 9:
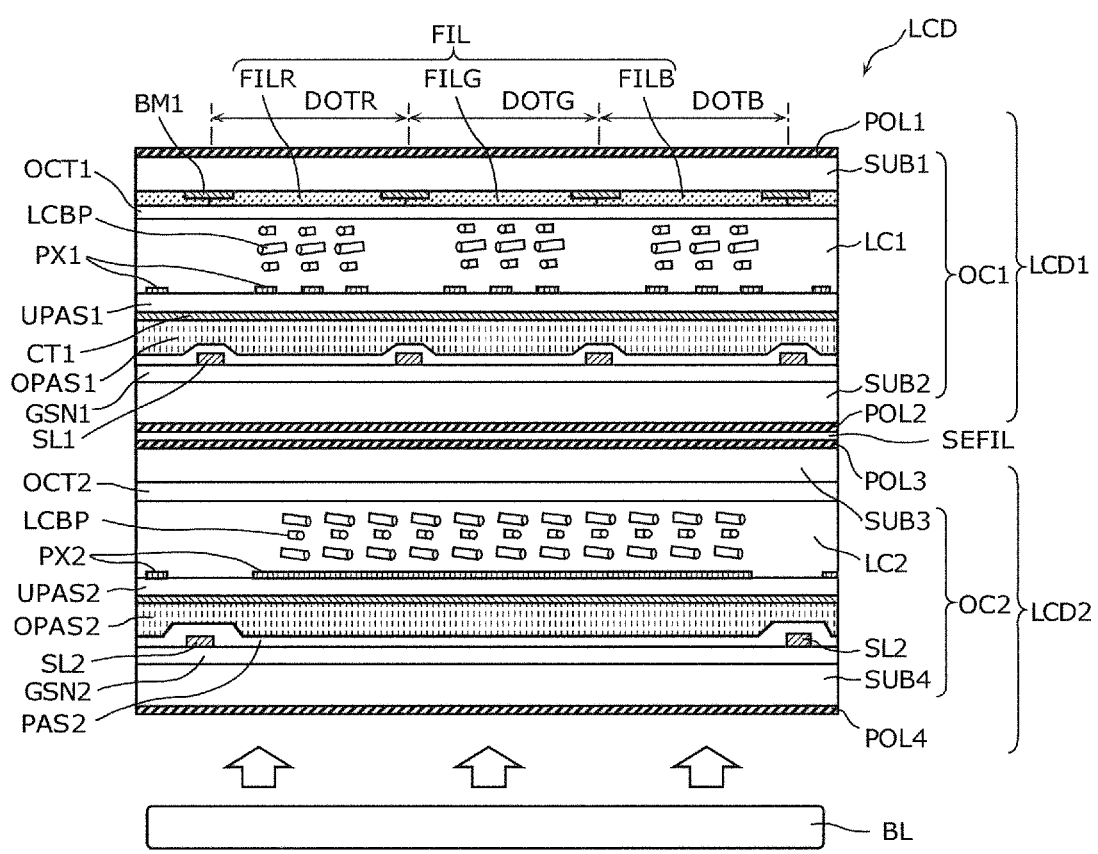
FIG. 9 is a sectional view illustrating a liquid crystal display device according to a modification of the first exemplary embodiment.
Figure 10:
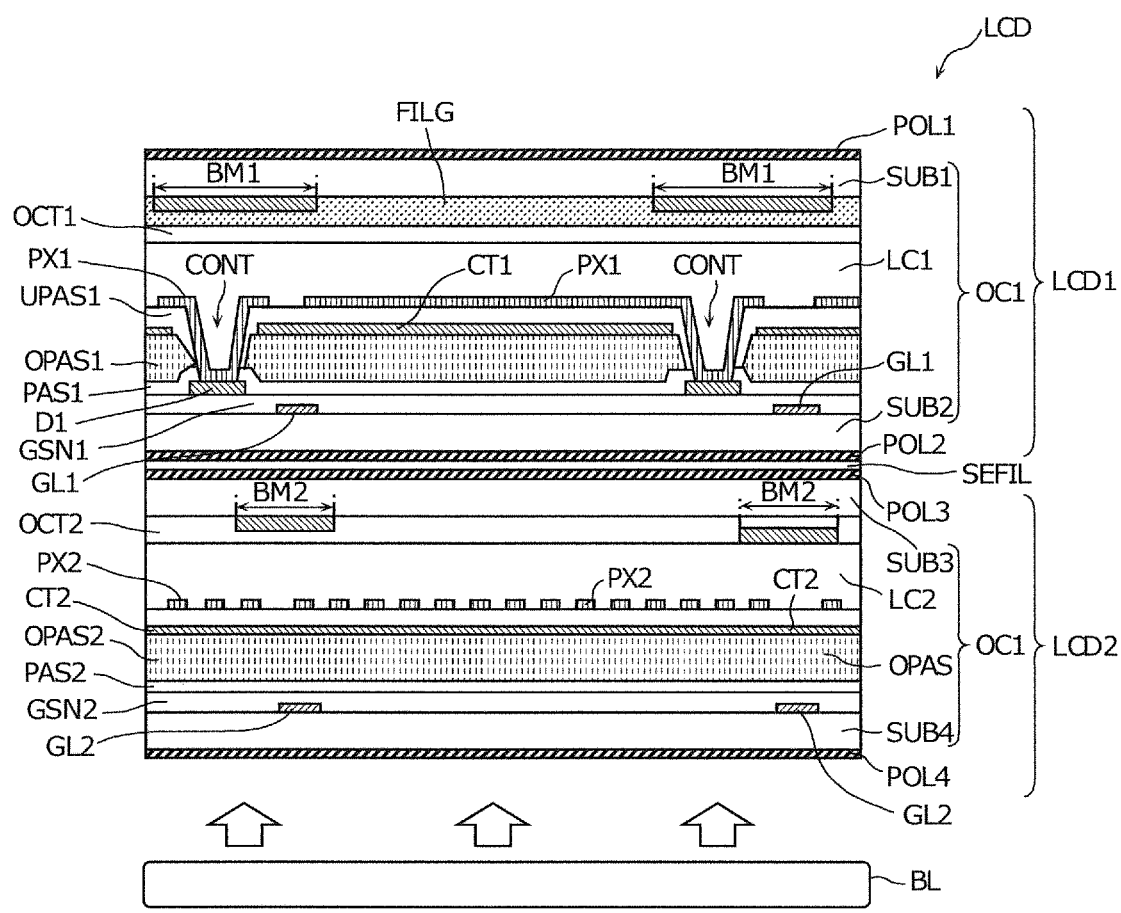
FIG. 10 is a sectional view illustrating the liquid crystal display device according to the modification of the first exemplary embodiment.
Figure 11:
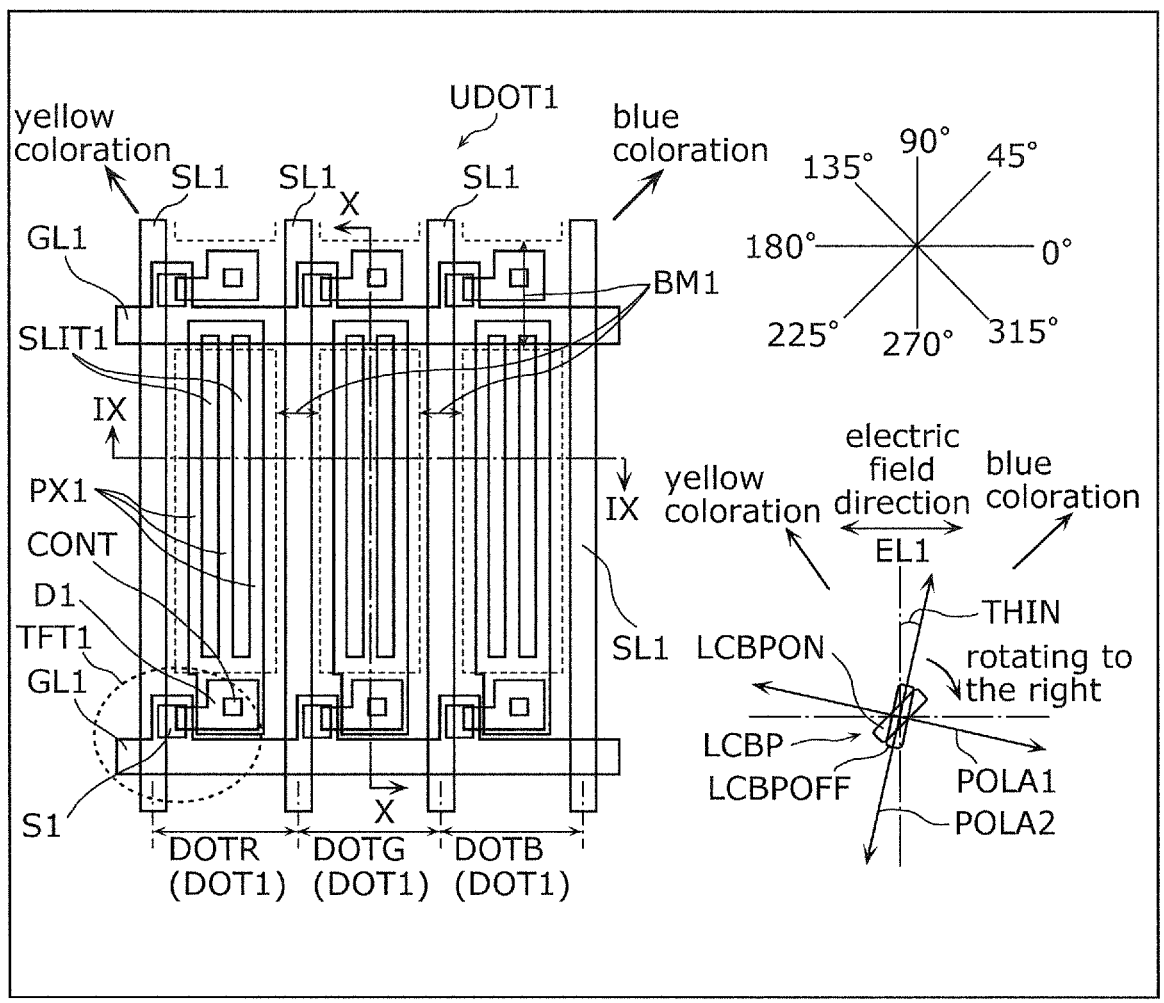
FIG. 11 is a view illustrating a pixel layout of a first liquid crystal display panel according to a modification of the first exemplary embodiment, and illustrating rotation of a liquid crystal molecule in the first liquid crystal layer of the first liquid crystal cell.
Figure 12:
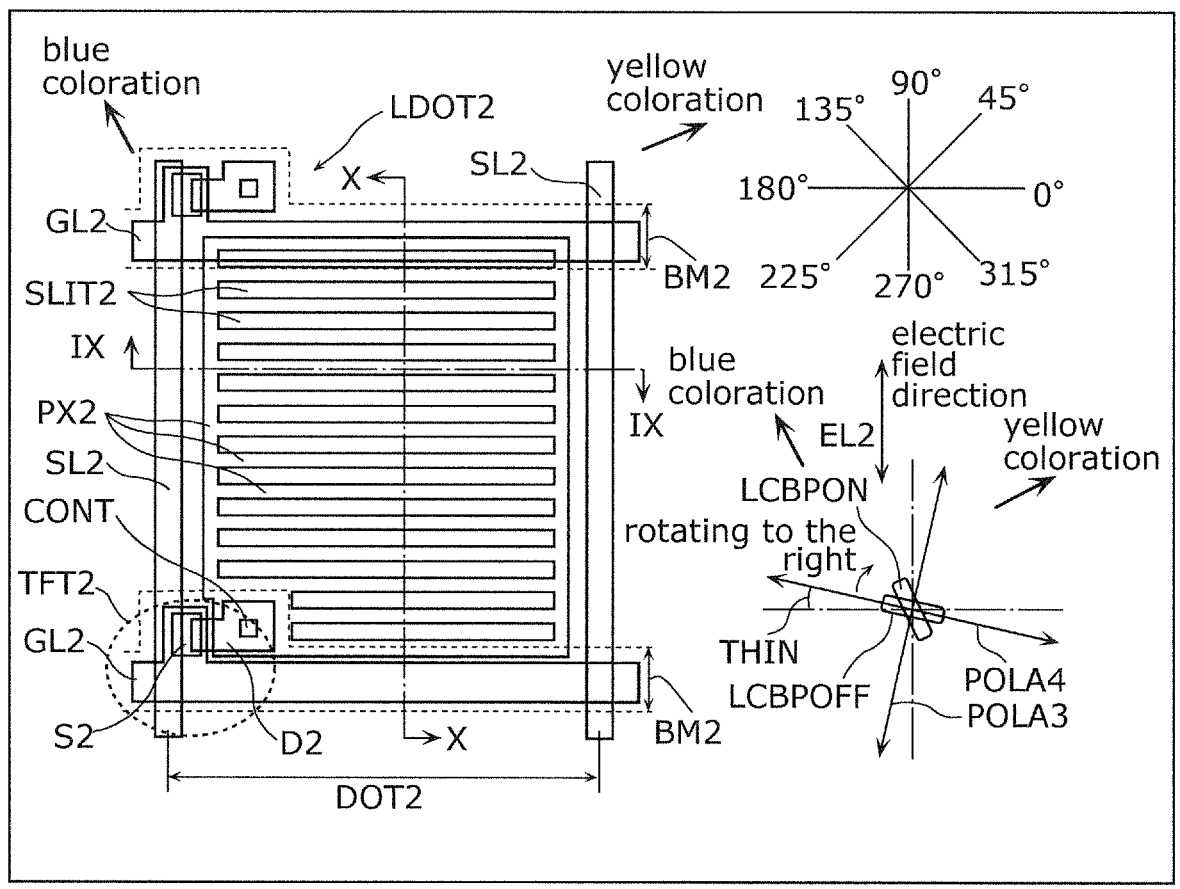
FIG. 12 is a view illustrating a pixel layout of the second liquid crystal display panel according to the modification of the first exemplary embodiment, and illustrating rotation of a liquid crystal molecule in the second liquid crystal layer of the second liquid crystal cell.

FIGS. 9 and 10 are sectional views illustrating liquid crystal display device LCD according to the modification of the first exemplary embodiment. FIG. 11 is a view illustrating a layout of pixel UDOT1 in first liquid crystal display panel LCD1 according to the modification of the first exemplary embodiment, and illustrating rotation of liquid crystal molecule LCBP in first liquid crystal layer LC1 of first liquid crystal cell OC1 according to the modification of the first exemplary embodiment. FIG. 12 is a view illustrating a layout of pixel LDOT2 in second liquid crystal display panel LCD2 according to the modification of the first exemplary embodiment, and illustrating rotation of liquid crystal molecule LCBP in second liquid crystal layer LC2 of second liquid crystal cell OC2 according to the modification of the first exemplary embodiment. FIG. 9 is a sectional view taken along line IX-IX in FIGS. 11 and 12, and FIG. 10 is a sectional view taken along line X-X in FIGS. 11 and 12.

As illustrated in FIGS. 9 to 11, first liquid crystal display panel LCD1 according to the modification is identical to first liquid crystal display panel LCD1 according to the first exemplary embodiment.

On the other hand, as illustrated in FIGS. 9, 10, and 12, second liquid crystal display panel LCD2 according to the modification is different from second liquid crystal display panel LCD2 according to the first exemplary embodiment.

Specifically, as illustrated in FIG. 12, in second liquid crystal display panel LCD2 according to the modification, second source wiring SL2 extends in the column direction while second gate wiring GL2 extends in the row direction similarly to the first exemplary embodiment. On the other hand, unlike the first exemplary embodiment, second pixel electrode PX2 according to the modification extends in the direction substantially orthogonal to second source wiring SL2, and extends in substantially parallel to second gate wiring GL2. That is, the longitudinal direction of second pixel electrode PX2 is along with the row direction. Accordingly, the plurality of slits SLIT2 of second pixel electrode PX2 extends in the row direction.

As illustrated in FIG. 12, in second liquid crystal cell OC2 of second liquid crystal display panel LCD2, liquid crystal molecule LCBP of second liquid crystal layer LC2 is not of the negative type but of the positive type. That is, in the modification, both liquid crystal molecule LCBP of first liquid crystal layer LC1 and liquid crystal molecule LCBP of second liquid crystal layer LC2 are of the positive type. Also in the modification, the alignment axes of third substrate SUB3 and fourth substrate SUB4 are substantially parallel to liquid crystal molecule LCBP of second liquid crystal layer LC2.

In the modification, when the voltage is not applied to second pixel electrode PX2 and second common electrode CT2 (for the black display), initial alignment angle THIN of liquid crystal molecule LCBPOFF in the initial alignment state in second liquid crystal layer LC2 is set so as to rotate to the right (clockwise) based on the 0°-180° line by the alignment films of third substrate SUB3 and fourth substrate SUB4. The long axis direction of liquid crystal molecule LCBPOFF is substantially matched with the direction of polarization axis (absorption axis) POLA4 of fourth polarizing plate POL4.

Also in the modification, when the voltage is applied to second pixel electrode PX2 and second common electrode CT2, the electric field (transverse electric field EL2) substantially parallel to third substrate SUB3 and fourth substrate SUB4 is generated between second pixel electrode PX2 and second common electrode CT2. In the modification, because second pixel electrode PX2 is substantially orthogonal to second source wiring SL2, and extends in the row direction, transverse electric field EL2 is generated in the column direction (the direction of the 90°-270° line) as illustrated in FIG. 12.

When transverse electric field EL2 is generated, liquid crystal molecule LCBP of second liquid crystal layer LC2 rotates according to initial alignment angle THIN. Specifically, when transverse electric field EL2 is generated, liquid crystal molecule LCBP rotates to the right from the state of liquid crystal molecule LCBPOFF to a position of a predetermined angle (for example, 45°), and becomes the state of liquid crystal molecule LCBPON (white display).

Even in liquid crystal display device LCD according to the modification, the long axis direction of liquid crystal molecule LCBPON rotating to the right by transverse electric field EL1 generated in first liquid crystal display panel LCD1 is substantially orthogonal to the long axis direction of liquid crystal molecule LCBNON rotating to the right by transverse electric field EL2 generated in second liquid crystal display panel LCD2. That is, the long axis direction of liquid crystal molecule LCBPON rotating to the right by transverse electric field EL1 is substantially matched with the short axis direction of liquid crystal molecule LCBNON rotating to the right by transverse electric field EL2.

Accordingly, similarly to liquid crystal display device LCD according to the first exemplary embodiment, the rotation of liquid crystal molecule LCBP of first liquid crystal layer LC1 and the rotation of liquid crystal molecule LCBN of second liquid crystal layer LC2 can cancel and compensate for the hue change of first liquid crystal cell OC1 or second liquid crystal cell OC2. This allows the improvement of the color viewing angle characteristic.

Also in the modification, liquid crystal molecule LCBP of one first dot DOT1 of first liquid crystal cell OC1 and liquid crystal molecule LCBP of one second dot DOT2 of second liquid crystal cell OC2 are driven by the single-domain system, and rotate in one direction in the main transmission regions of first dot DOT1 and second dot DOT2. Accordingly, the transmittance is improved compared with the one-pixel multi-domain system. The color viewing angle characteristic for a specific image pattern display is not degraded unlike the each-row multi-domain system.

As described above, in liquid crystal display device LCD according to the modification, the color viewing angle characteristic can be improved irrespective of the image display pattern without degrading the transmittance.

However, in the modification, the transmittance is slightly degraded compared with liquid crystal display device LCD according to the first exemplary embodiment. This is because the transmittance is degraded in a connection portion of second pixel electrode PX2 of second liquid crystal cell OC2 and a frame of second pixel electrode PX2. The influence decreases when first dot DOT1 and second dot DOT2 have large sizes (pixel sizes).

Second Exemplary Embodiment

Liquid crystal display device LCD according to a second exemplary embodiment will be described below.

Figure 13:
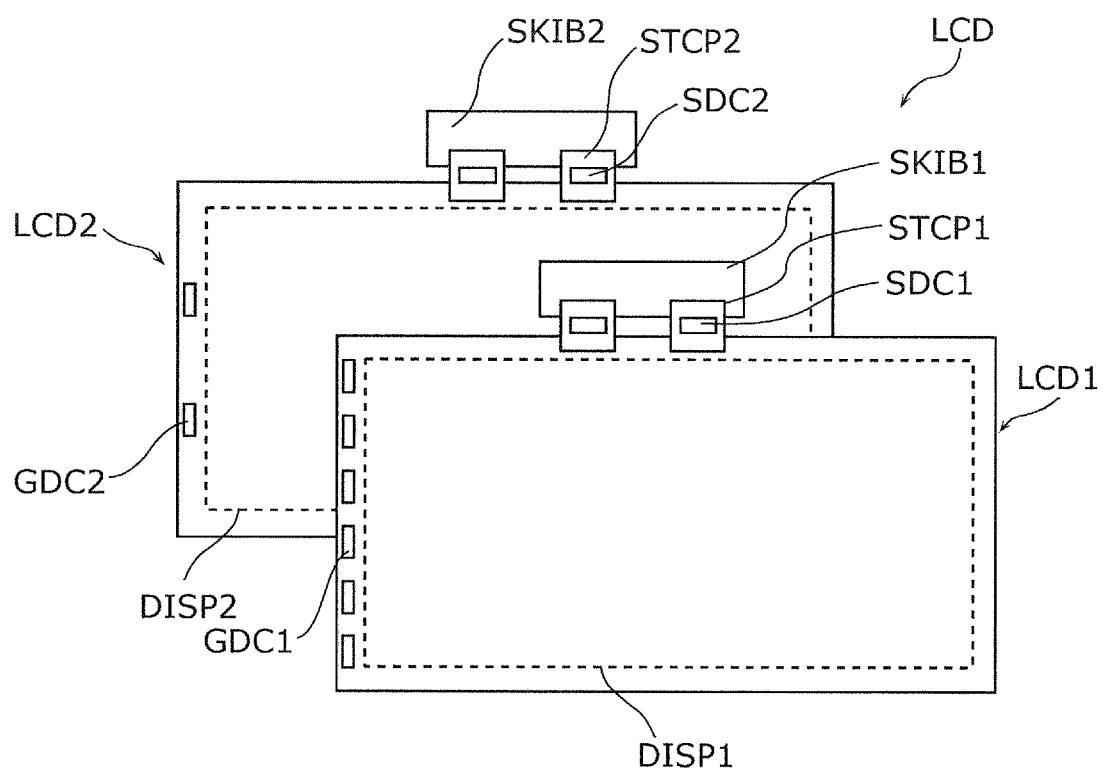
FIG. 13 is a view illustrating configurations of drivers of the first liquid crystal display panel and the second liquid crystal display panel in the liquid crystal display device according to a second exemplary embodiment.

FIG. 13 is a view illustrating configurations of drivers of first liquid crystal display panel LCD1 and second liquid crystal display panel LCD2 in liquid crystal display device LCD according to the second exemplary embodiment.

As illustrated in FIG. 13, also in liquid crystal display device LCD according to the second exemplary embodiment, first source driver SDC1 and first gate driver GDC1 are provided in first liquid crystal display panel LCD1 in order to display the color image on first image display region DISP1.

Specifically, first liquid crystal display panel LCD1 is connected to two flexible wiring boards STCP1 on each of which first source driver SDC1 formed by an IC package is mounted. Each flexible wiring board STCP1 is connected to printed board SKIB1. Six first gate drivers GDC1 formed by IC packages are mounted on first liquid crystal display panel LCD1.

Second source driver SDC2 and second gate driver GDC2 are provided in second liquid crystal display panel LCD2 in order to display the monochrome image on second image display region DISP2.

Specifically, similarly to the first exemplary embodiment, second liquid crystal display panel LCD2 is connected to two flexible wiring boards STCP2 on each of which second source driver SDC2 formed by an IC package is mounted, and each flexible wiring board STCP2 is connected to printed board SKIB2. Two second gate drivers GDC2 formed by IC packages are mounted on second liquid crystal display panel LCD2.

Detailed configurations of first liquid crystal display panel LCD1 and second liquid crystal display panel LCD2 in liquid crystal display device LCD according to the second exemplary embodiment will be described below with reference to FIGS. 14 and 15.

Figure 14:
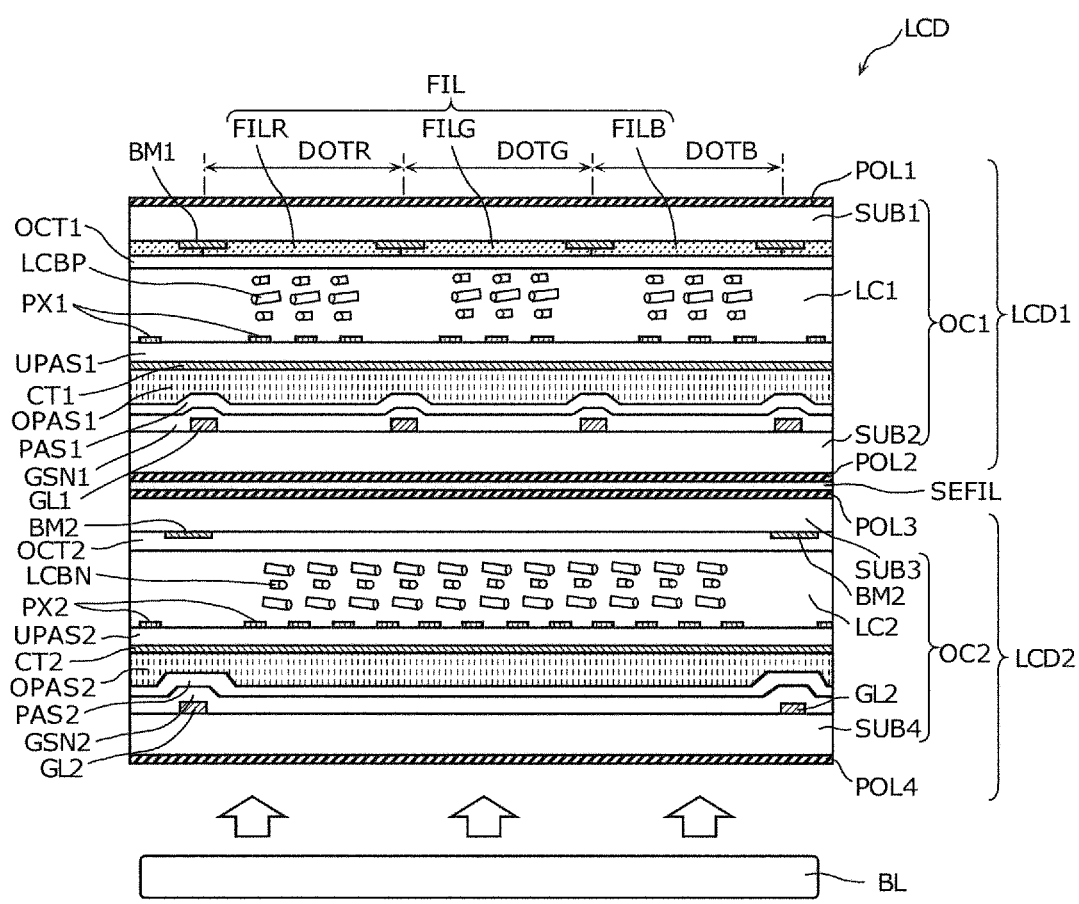
FIG. 14 is a sectional view illustrating the liquid crystal display device according to the second exemplary embodiment.
Figure 15:
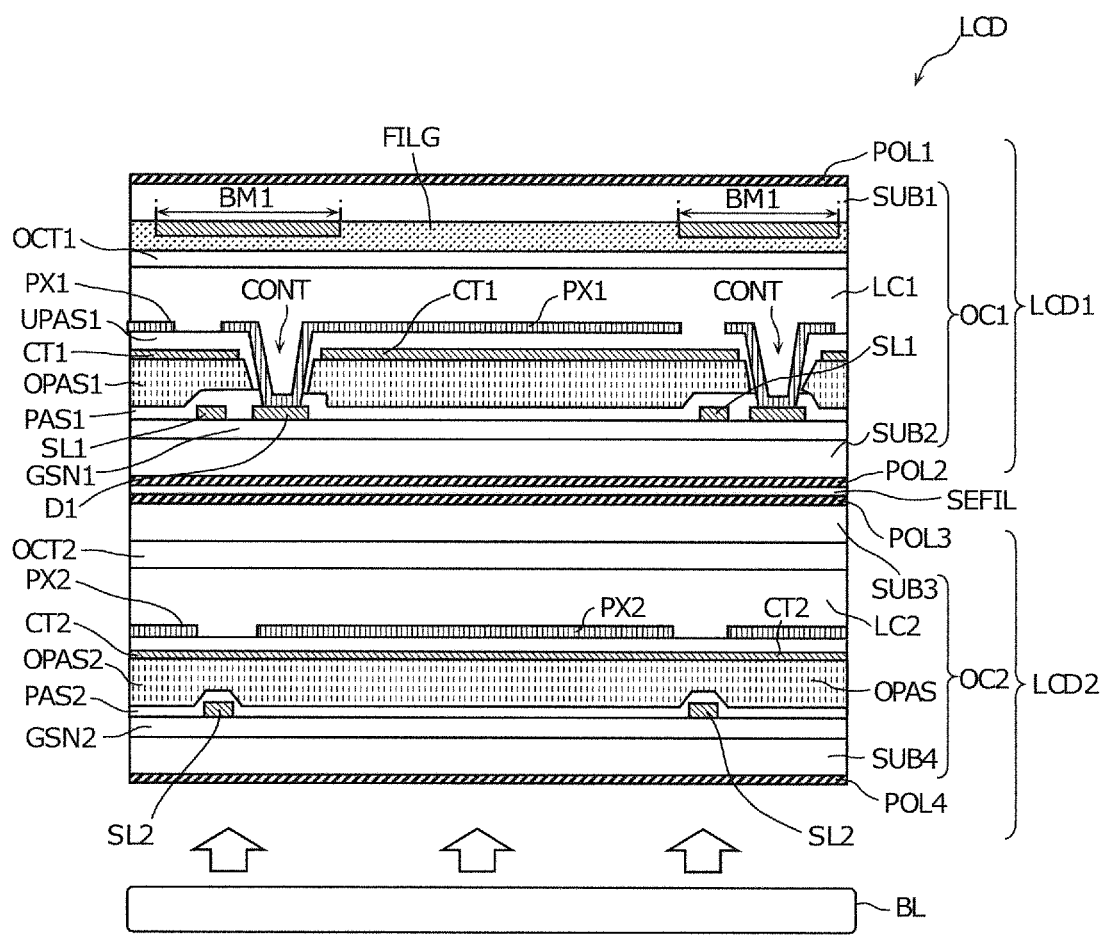
FIG. 15 is a sectional view illustrating the liquid crystal display device according to the second exemplary embodiment.
Figure 18:
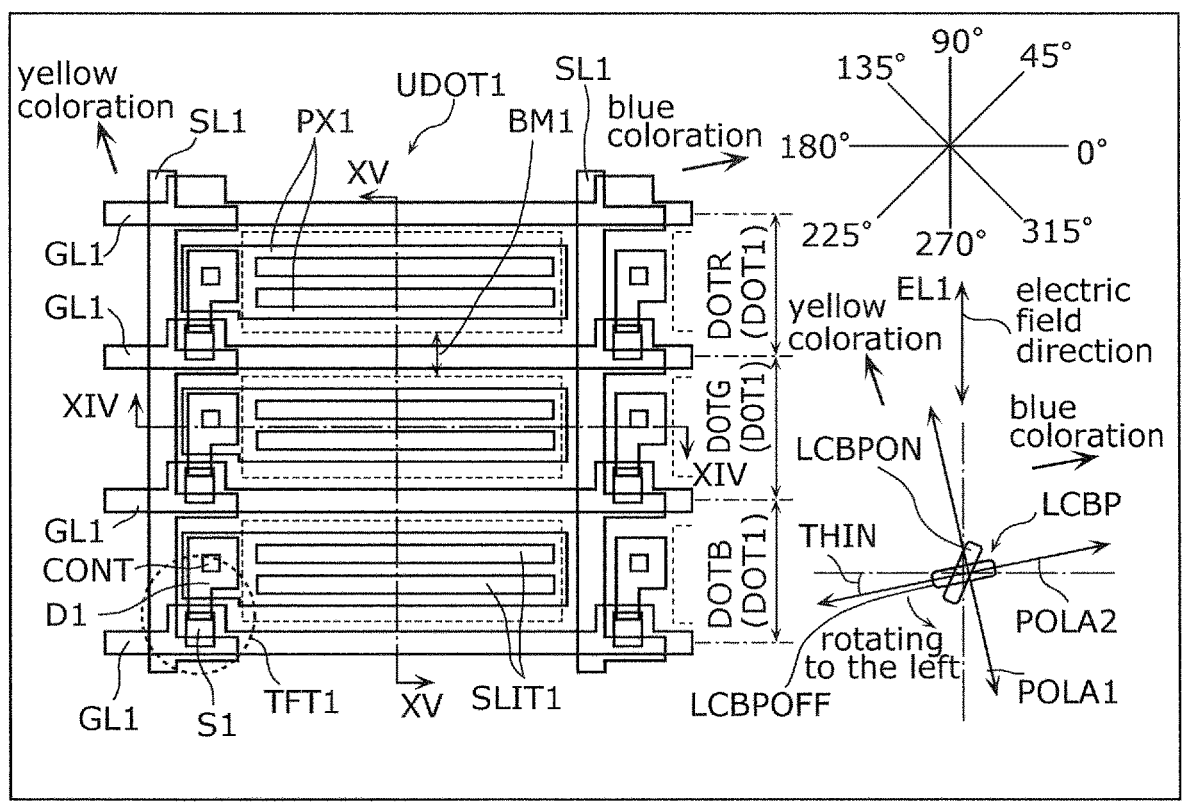
FIG. 18 is a view illustrating a pixel layout of the first liquid crystal display panel according to the second exemplary embodiment, and illustrating rotation of a liquid crystal molecule in the first liquid crystal layer of the first liquid crystal cell.
Figure 19:
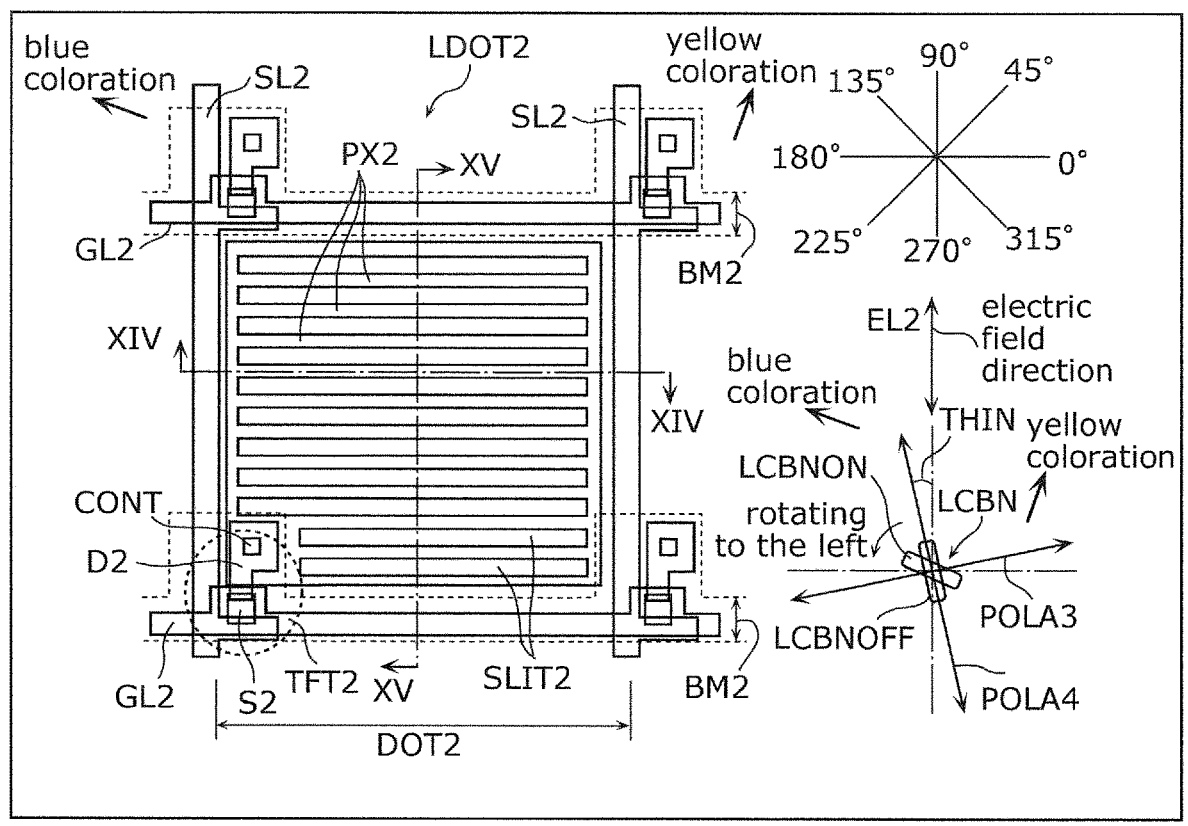
FIG. 19 is a view illustrating a pixel layout of the second liquid crystal display panel according to the second exemplary embodiment, and illustrating rotation of a liquid crystal molecule in the second liquid crystal layer of the second liquid crystal cell.

FIGS. 14 and 15 are sectional views illustrating liquid crystal display device LCD according to the second exemplary embodiment. FIG. 14 is the sectional view taken along line XIV-XIV in FIGS. 18 and 19, and FIG. 15 is the sectional view taken along line XV-XV in FIGS. 18 and 19.

As illustrated in FIGS. 14 and 15, liquid crystal display device LCD according to the second exemplary embodiment has the configuration similar to the configuration of liquid crystal display device LCD according to the first exemplary embodiment, and liquid crystal display device LCD according to the second exemplary embodiment includes first liquid crystal display panel LCD1 including first liquid crystal cell OC1 sandwiched between first polarizing plate POL1 and second polarizing plate POL2 and second liquid crystal display panel LCD2 including second liquid crystal cell OC2 sandwiched between third polarizing plate POL3 and fourth polarizing plate POL4.

Similarly to the first exemplary embodiment, first liquid crystal cell OC1 includes first substrate SUB1, second substrate SUB2, and first liquid crystal layer LC1 provided between first substrate SUB1 and second substrate SUB2. Similarly to the first exemplary embodiment, second liquid crystal cell OC2 includes third substrate SUB3, fourth substrate SUB4, and second liquid crystal layer LC2 provided between third substrate SUB3 and fourth substrate SUB4.

Liquid crystal display device LCD according to the second exemplary embodiment, particularly a point different from liquid crystal display device LCD according to the first exemplary embodiment will mainly be described below.

Figure 16A:
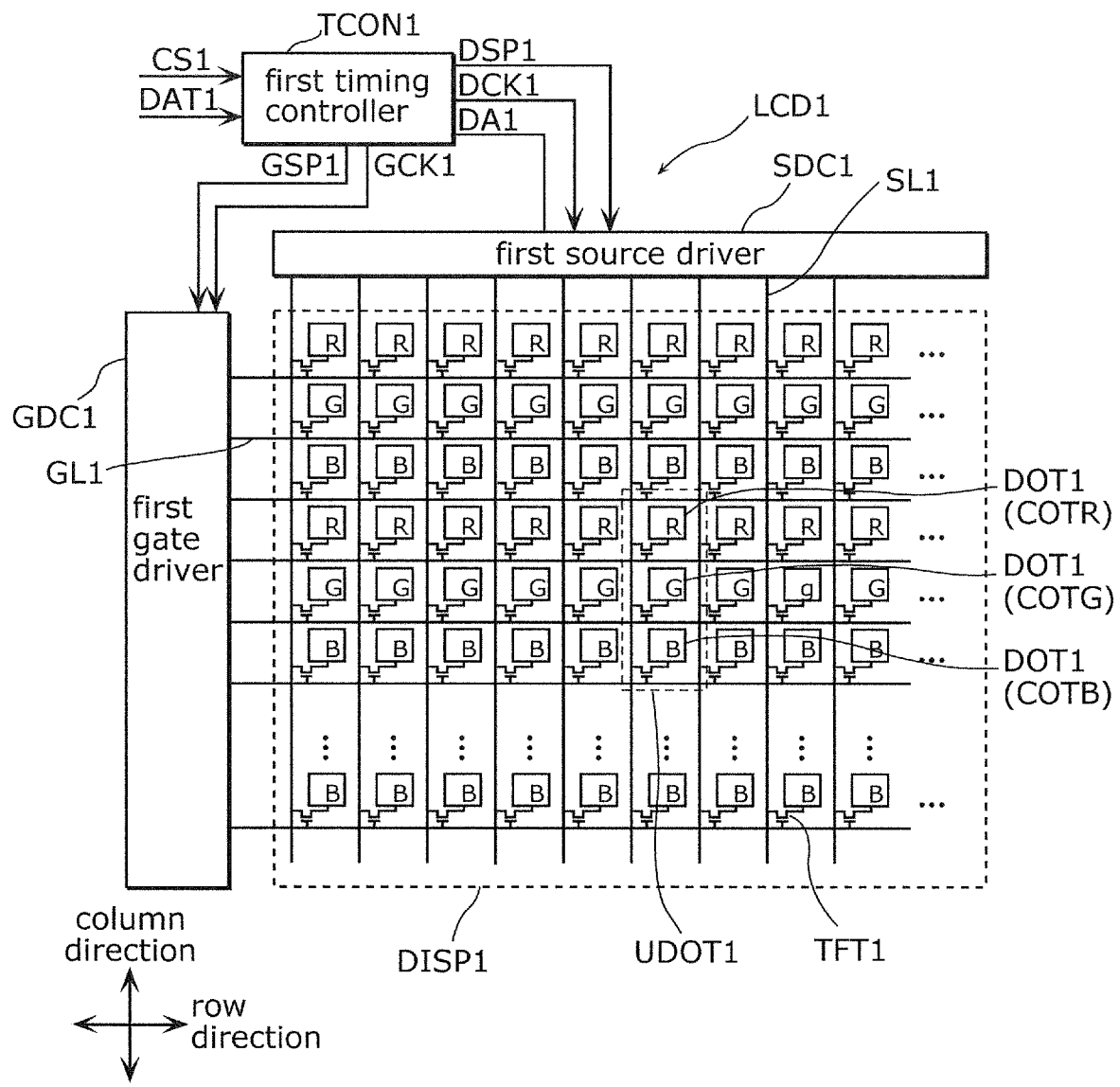
FIG. 16A is a view illustrating a schematic configuration of the first liquid crystal display panel in the liquid crystal display device according to the second exemplary embodiment.
Figure 16B:
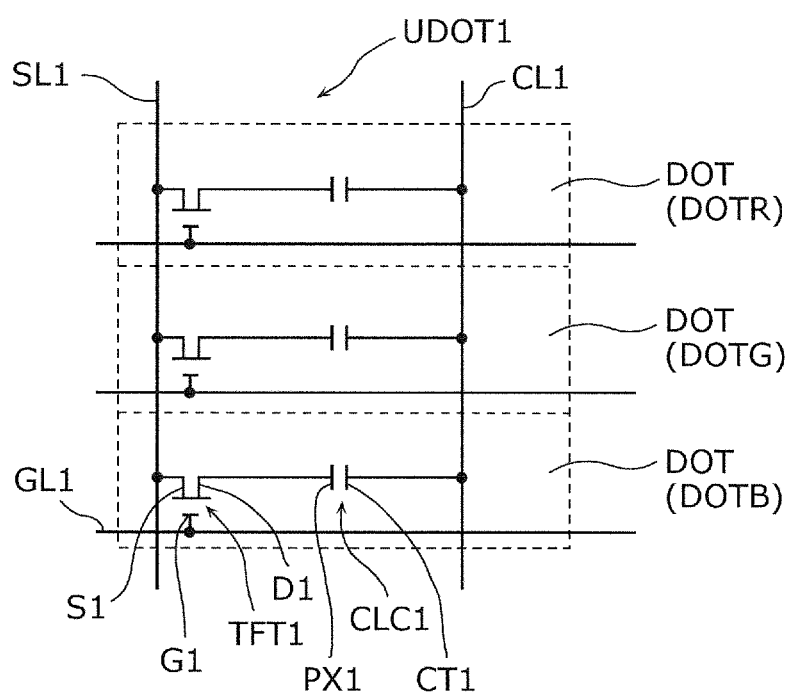
FIG. 16B is a view illustrating a circuit configuration of one pixel of the first liquid crystal display panel in FIG. 16A.
Figure 17A:
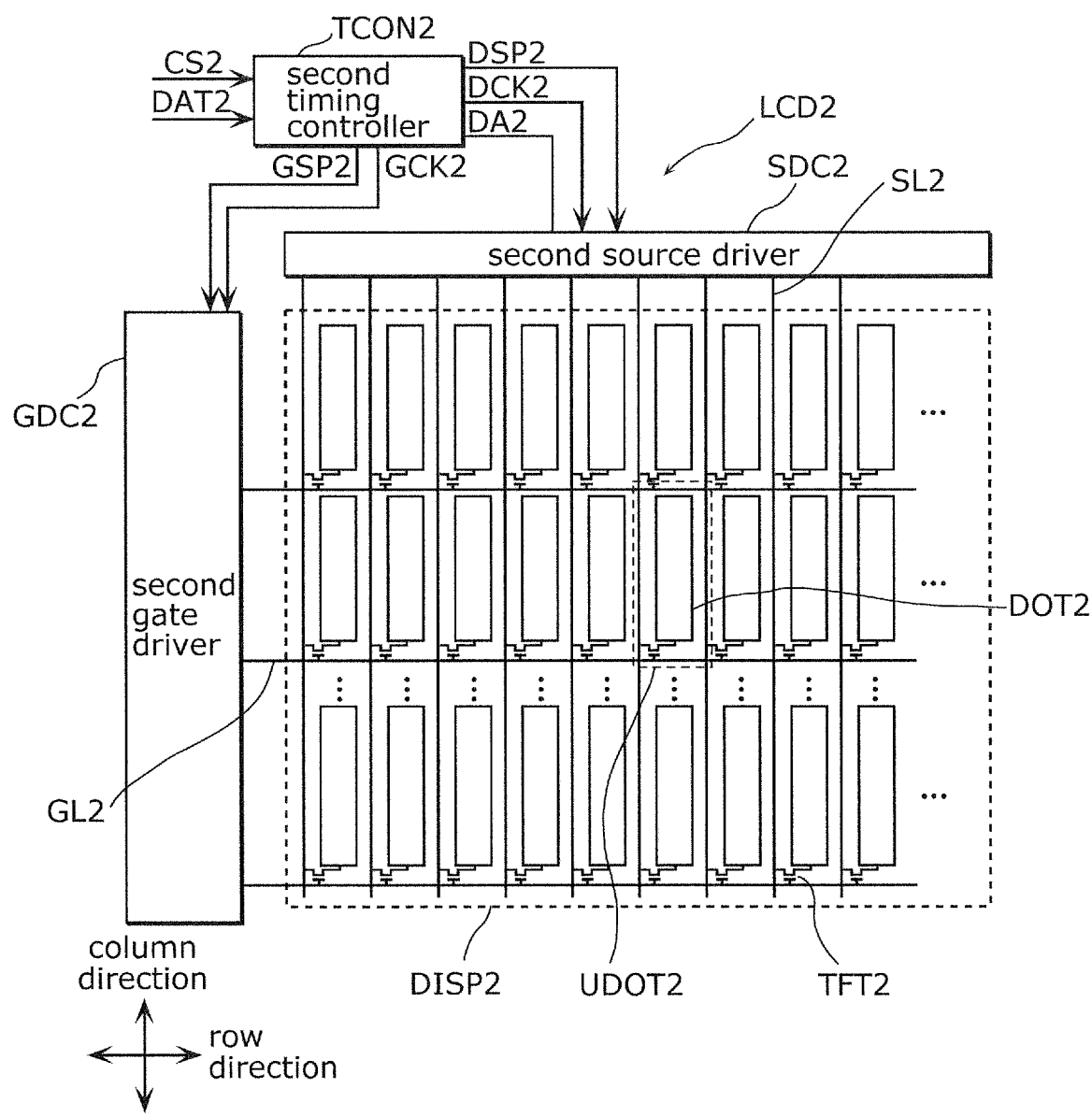
FIG. 17A is a view illustrating a schematic configuration of the second liquid crystal display panel in the liquid crystal display device according to the second exemplary embodiment.

FIG. 16A is a view illustrating a schematic configuration of first liquid crystal display panel LCD1 in liquid crystal display device LCD according to the second exemplary embodiment, and FIG. 16B is a view illustrating a circuit configuration of one pixel UDOT1 of first liquid crystal display panel LCD1 in FIG. 16A. FIG. 17A is a view illustrating a schematic configuration of second liquid crystal display panel LCD2 in liquid crystal display device LCD according to the second exemplary embodiment, and FIG. 17B is a view illustrating a circuit configuration of one pixel UDOT2 of second liquid crystal display panel LCD2 in FIG. 17A.

As illustrated in FIGS. 5A and 5B, in first liquid crystal cell OC1 according to the first exemplary embodiment, one pixel UDOT1 in first image display region DISP1 is formed by three first dots DOT1, namely, red dot DOTR, green dot DOTG, and blue dot DOTB, which are arrayed in the row direction. Specifically, in the first exemplary embodiment, red dot DOTR, green dot DOTG, and blue dot DOTB are repetitively arrayed in this order in the row direction, and first dots DOT1 of the identical color are arrayed in the column direction.

On the other hand, in first liquid crystal cell OC1 according to the second exemplary embodiment, as illustrated in FIGS. 16A and 16B, one pixel UDOT1 in first image display region DISP1 is formed by three first dots DOT1, namely, red dot DOTR, green dot DOTG, and blue dot DOTB, which are arrayed in the column direction. Specifically, in first image display region DISP1, red dot DOTR, green dot DOTG, and blue dot DOTB are repetitively arrayed in this order in the column direction, and first dots DOT1 of the identical color are arrayed in the row direction.

Figure 17B:
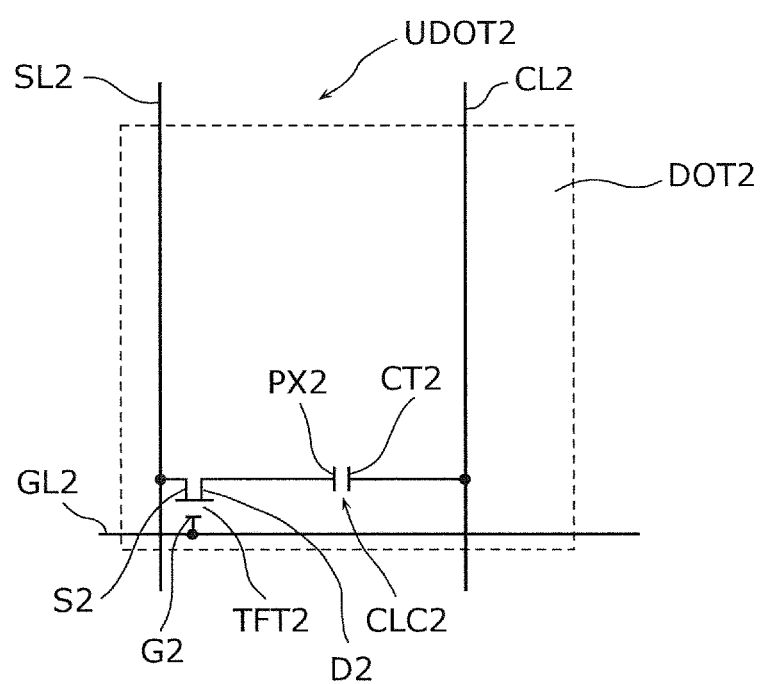
FIG. 17B is a view illustrating a circuit configuration of one pixel of the second liquid crystal display panel in FIG. 17A.

As illustrated in FIGS. 17A and 17B, also in the second exemplary embodiment, one pixel LDOT2 in second image display region DISP2 of second liquid crystal display panel LCD2 corresponds to one pixel UDOT1 in first image display region DISP1 of first liquid crystal display panel LCD1. That is, one pixel LDOT2 (second dot DOT2) of second image display region DISP2 corresponds to three first dots DOT1 (red dot DOTR, green dot DOTG, and blue dot DOTB) of first image display region DISP1.

A layout of the dot (pixel) of liquid crystal display device LCD according to the second exemplary embodiment and movement of the liquid crystal molecule in each dot will be described below with reference to FIGS. 18 and 19.

FIG. 18 is a view illustrating a layout of pixel UDOT1 in first liquid crystal display panel LCD1 according to the second exemplary embodiment, and illustrating rotation of liquid crystal molecule LCBP in first liquid crystal layer LC1 of first liquid crystal cell OC1 according to the second exemplary embodiment. FIG. 19 is a view illustrating a layout of pixel LDOT2 in second liquid crystal display panel LCD2 according to the second exemplary embodiment, and illustrating rotation of liquid crystal molecule LCBN in second liquid crystal layer LC2 of second liquid crystal cell OC2 according to the second exemplary embodiment.

As illustrated in FIG. 18, in first liquid crystal display panel LCD1 according to the second exemplary embodiment, similarly to the first exemplary embodiment, first source wiring SL1 extends in the column direction, and first gate wiring GL1 extends in the row direction. However, unlike the first exemplary embodiment, first pixel electrode PX1 extends in the direction substantially orthogonal to first source wiring SL1, and extends along with first gate wiring GL1. Accordingly, the plurality of slits SLIT1 of first pixel electrode PX1 extends in the row direction.

As illustrated in FIG. 18, in first liquid crystal display panel LCD1, liquid crystal molecule LCBP of first liquid crystal layer LC1 is of the positive type similarly to liquid crystal molecule LCBP of first liquid crystal layer LC1 according to the first exemplary embodiment. Also in the second exemplary embodiment, the alignment axes of first substrate SUB1 and second substrate SUB2 are substantially parallel to liquid crystal molecule LCBP of first liquid crystal layer LC1.

In the second exemplary embodiment, when the voltage is not applied to first pixel electrode PX1 and first common electrode CT1 (for the black display), initial alignment angle THIN of liquid crystal molecule LCBPOFF in the initial alignment state in first liquid crystal layer LC1 is set so as to rotate to the left (counterclockwise) based on the 0°-180° line by the alignment films of first substrate SUB1 and second substrate SUB2. The long axis direction of liquid crystal molecule LCBPOFF is substantially matched with the direction of polarization axis (absorption axis) POLA2 of second polarizing plate POL2.

Also in the second exemplary embodiment, when the voltage is applied to first pixel electrode PX1 and first common electrode CT1, the electric field (transverse electric field EL1) substantially parallel to first substrate SUB1 and second substrate SUB2 is generated between first pixel electrode PX1 and first common electrode CT1. In the second exemplary embodiment, because first pixel electrode PX1 extends in the row direction, transverse electric field EL1 is generated in the column direction (the direction of the 90°-270° line) as illustrated in FIG. 12.

When transverse electric field EL1 is generated, liquid crystal molecule LCBP of first liquid crystal layer LC1 rotates according to initial alignment angle THIN. Specifically, when transverse electric field EL1 is generated, liquid crystal molecule LCBP rotates to the left from the state of liquid crystal molecule LCBPOFF to a position of a predetermined angle (for example, 45°), and becomes the state of liquid crystal molecule LCBPON (white display).

On the other hand, as illustrated in FIG. 19, in second liquid crystal display panel LCD2, similarly to the first exemplary embodiment, second source wiring SL2 extends in the column direction, and second gate wiring GL2 extends in the row direction. However, unlike the first exemplary embodiment, second pixel electrode PX2 extends in the direction substantially orthogonal to second source wiring SL2, and extends along with second gate wiring GL2. Accordingly, the plurality of slits SLIT2 of second pixel electrode PX2 extends in the row direction.

As illustrated in FIG. 19, in second liquid crystal display panel LCD2, liquid crystal molecule LCBN of second liquid crystal layer LC2 is of the negative type similarly to liquid crystal molecule LCBN of second liquid crystal layer LC2 according to the first exemplary embodiment. Also in the second exemplary embodiment, the alignment axes of third substrate SUB3 and fourth substrate SUB4 are substantially parallel to liquid crystal molecule LCBN of second liquid crystal layer LC2.

In the second exemplary embodiment, when the voltage is not applied to second pixel electrode PX2 and second common electrode CT2 (for the black display), initial alignment angle THIN of liquid crystal molecule LCBNOFF in the initial alignment state in second liquid crystal layer LC2 is set so as to rotate to the left (counterclockwise) based on the 90°-270° line by the alignment films of third substrate SUB3 and fourth substrate SUB4. The long axis direction of liquid crystal molecule LCBNOFF is substantially matched with the direction of polarization axis (absorption axis) POLA4 of fourth polarizing plate POL4.

Also in the second exemplary embodiment, when the voltage is applied to second pixel electrode PX2 and second common electrode CT2, the electric field (transverse electric field EL2) substantially parallel to third substrate SUB3 and fourth substrate SUB4 is generated between second pixel electrode PX2 and second common electrode CT2. In the second exemplary embodiment, however, because second pixel electrode PX2 extends in the row direction, transverse electric field EL2 is generated in the column direction (the direction of the 90°-270° line) as illustrated in FIG. 19.

When transverse electric field EL2 is generated, liquid crystal molecule LCBN of second liquid crystal layer LC2 rotates according to initial alignment angle THIN. Specifically, when transverse electric field EL2 is generated, liquid crystal molecule LCBN rotates to the left from the state of liquid crystal molecule LCBNOFF to a position of a predetermined angle (for example, 45°), and becomes the state of liquid crystal molecule LCBNON (white display).

Even in liquid crystal display device LCD according to the second exemplary embodiment, the alignment axes of first substrate SUB1 and second substrate SUB2 in first liquid crystal display panel LCD1 are substantially orthogonal to the alignment axes of third substrate SUB3 and fourth substrate SUB4 in second liquid crystal display panel LCD2. Therefore, when transverse electric fields EL1 and EL2 are not generated in first liquid crystal cell OC1 and second liquid crystal cell OC2, the long axis direction (the alignment axis direction) of liquid crystal molecule LCBP of first liquid crystal layer LC1 is substantially orthogonal to the long axis direction (the alignment axis direction) of liquid crystal molecule LCBN of second liquid crystal layer LC2.

When the voltage is applied to first pixel electrode PX1 and first common electrode CT1 in first dot DOT1 of first liquid crystal cell OC1 while the voltage is applied to second pixel electrode PX2 and second common electrode CT2 in second dot DOT2 of second liquid crystal cell OC2, transverse electric field EL1 is generated only in one direction in first dot DOT1 while transverse electric field EL2 is generated only in one direction in second dot DOT2. At this point, also in the second exemplary embodiment, the direction of transverse electric field EL1 generated in first dot DOT1 is substantially identical to the direction of transverse electric field EL2 generated in second dot DOT2.

When transverse electric fields EL1 and EL2 are generated, liquid crystal molecule LCBP of first dot DOT1 of first liquid crystal layer LC1 rotates while liquid crystal molecule LCBN of second dot DOT2 of second liquid crystal layer LC2 rotates. In the second exemplary embodiment, the rotational direction of liquid crystal molecule LCBP of first liquid crystal layer LC1 and the rotational direction of liquid crystal molecule LCBN of second liquid crystal cell OC2 are identical to each other, but both liquid crystal molecule LCBP and liquid crystal molecule LCBN rotate to the left unlike the first exemplary embodiment.

Therefore, the long axis direction of liquid crystal molecule LCBPON rotating to the left by transverse electric field EL1 generated in first liquid crystal cell OC1 is substantially orthogonal to the long axis direction of liquid crystal molecule LCBNON rotating to the left by transverse electric field EL2 generated in second liquid crystal cell OC2. When transverse electric field EL1 is generated in first liquid crystal cell OC1 while transverse electric field EL2 is generated in second liquid crystal cell OC2, the long axis direction of liquid crystal molecule LCBPON of first liquid crystal layer LC1 is substantially matched with the short axis direction of liquid crystal molecule LCBNON of second liquid crystal layer LC2.

Accordingly, similarly to the first exemplary embodiment, rotated liquid crystal molecule LCBP (liquid crystal molecule LCBPON) of first liquid crystal layer LC1 and rotated liquid crystal molecule LCBN (liquid crystal molecule LCBNON) of second liquid crystal layer LC2 can cancel and compensate for the hue change (the coloring) of first liquid crystal cell OC1 or second liquid crystal cell OC2. Therefore, the coloring in a predetermined direction is canceled in the whole display screen of liquid crystal display device LCD, and the color viewing angle characteristic can be improved.

Liquid crystal display device LCD according to the second exemplary embodiment is also configured such that the rotation of liquid crystal molecule LCBP of first liquid crystal layer LC1 and the rotation of liquid crystal molecule LCBN of second liquid crystal layer LC2 cancel and compensate for the hue change of first liquid crystal cell OC1 or second liquid crystal cell OC2.

Also in liquid crystal display device LCD according to the second exemplary embodiment, liquid crystal molecule LCBP of one first dot DOT1 of first liquid crystal cell OC1 and liquid crystal molecule LCBN of one second dot DOT2 of second liquid crystal cell OC2 are driven by the single-domain system, and rotate in one direction in the main transmission regions of first dot DOT1 and second dot DOT2. Therefore, the transmittance can be improved compared with the one-pixel multi-domain system. The color viewing angle characteristic for a specific image pattern display is not degraded unlike the each-row multi-domain system.

Accordingly, also in liquid crystal display device LCD according to the second exemplary embodiment, the color viewing angle characteristic can be improved irrespective of the image display pattern without degrading the transmittance.

However, in the second exemplary embodiment, the transmittance is slightly degraded compared with liquid crystal display device LCD according to the first exemplary embodiment. This is because the transmittance is degraded in a connection portion of first pixel electrode PX1 (second pixel electrode PX2) and a frame of first pixel electrode PX1 (second pixel electrode PX2) in first liquid crystal cell OC1 and second liquid crystal cell OC2. The influence decreases when first dot DOT1 and second dot DOT2 have large sizes (pixel sizes).

In the second exemplary embodiment, first liquid crystal display panel LCD1 is disposed on the observer side (an upper side), and second liquid crystal display panel LCD2 is disposed on the side of backlight BL (a lower side). However, the present disclosure is not limited to the second exemplary embodiment. Specifically, even if first liquid crystal display panel LCD1 is disposed on the side of backlight BL (the lower side) while second liquid crystal display panel LCD2 is disposed on the observer side (the upper side), the hue change of first liquid crystal cell OC1 or second liquid crystal cell OC2 is canceled and compensated for, and the color viewing angle characteristic can be improved.

In the second exemplary embodiment, initial alignment angle THIN is set such that liquid crystal molecule LCBP of first liquid crystal cell OC1 and liquid crystal molecule LCBN of second liquid crystal cell OC2 rotate to the left (counterclockwise) by the transverse electric field. However, the present disclosure is not limited to the second exemplary embodiment. For example, initial alignment angle THIN may be set such that liquid crystal molecule LCBP of first liquid crystal cell OC1 and liquid crystal molecule LCBN of second liquid crystal cell OC2 rotate to the right (clockwise) by the transverse electric field. Even in this case, the hue change of first liquid crystal cell OC1 or second liquid crystal cell OC2 is canceled and compensated for, and the color viewing angle characteristic can be improved.

Modification of a Second Exemplary Embodiment

Liquid crystal display device LCD according to a modification of the second exemplary embodiment will be described below with reference to FIGS. 20 to 23.

Figure 20:
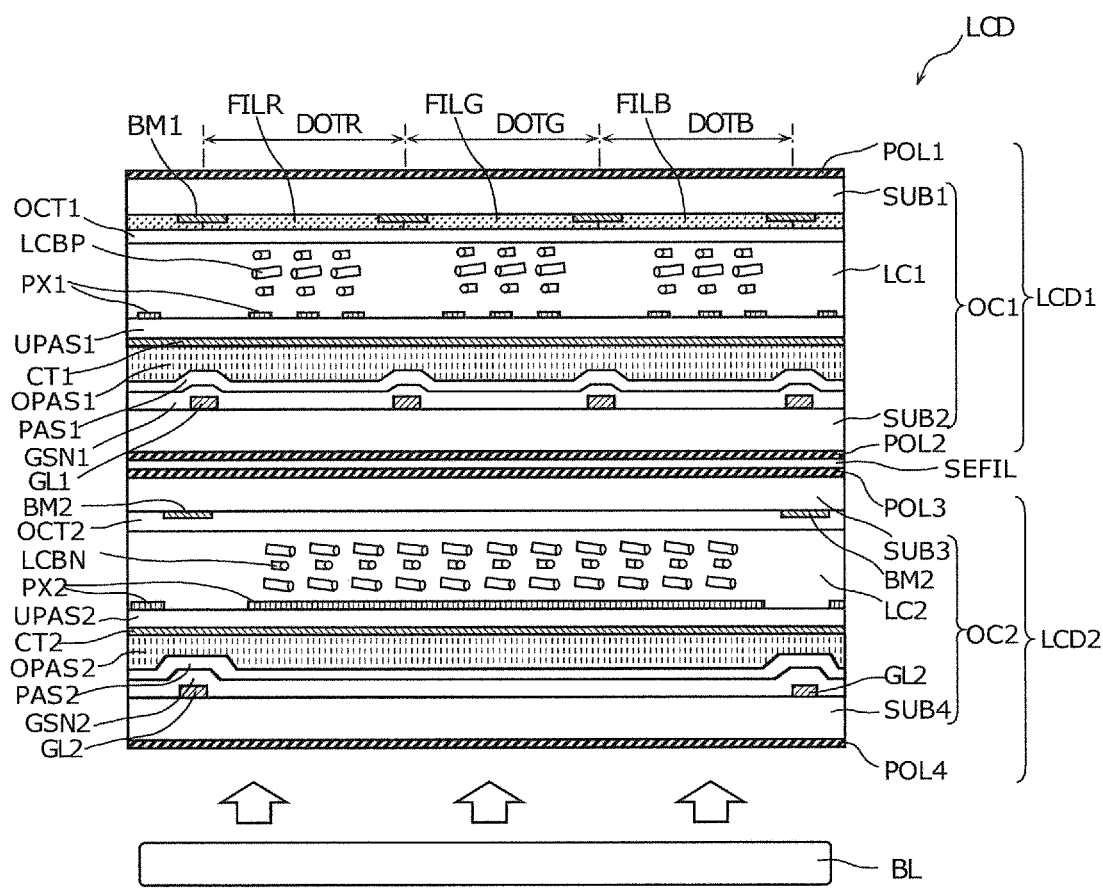
FIG. 20 is a sectional view illustrating the liquid crystal display device according to a modification of the second exemplary embodiment.
Figure 21:
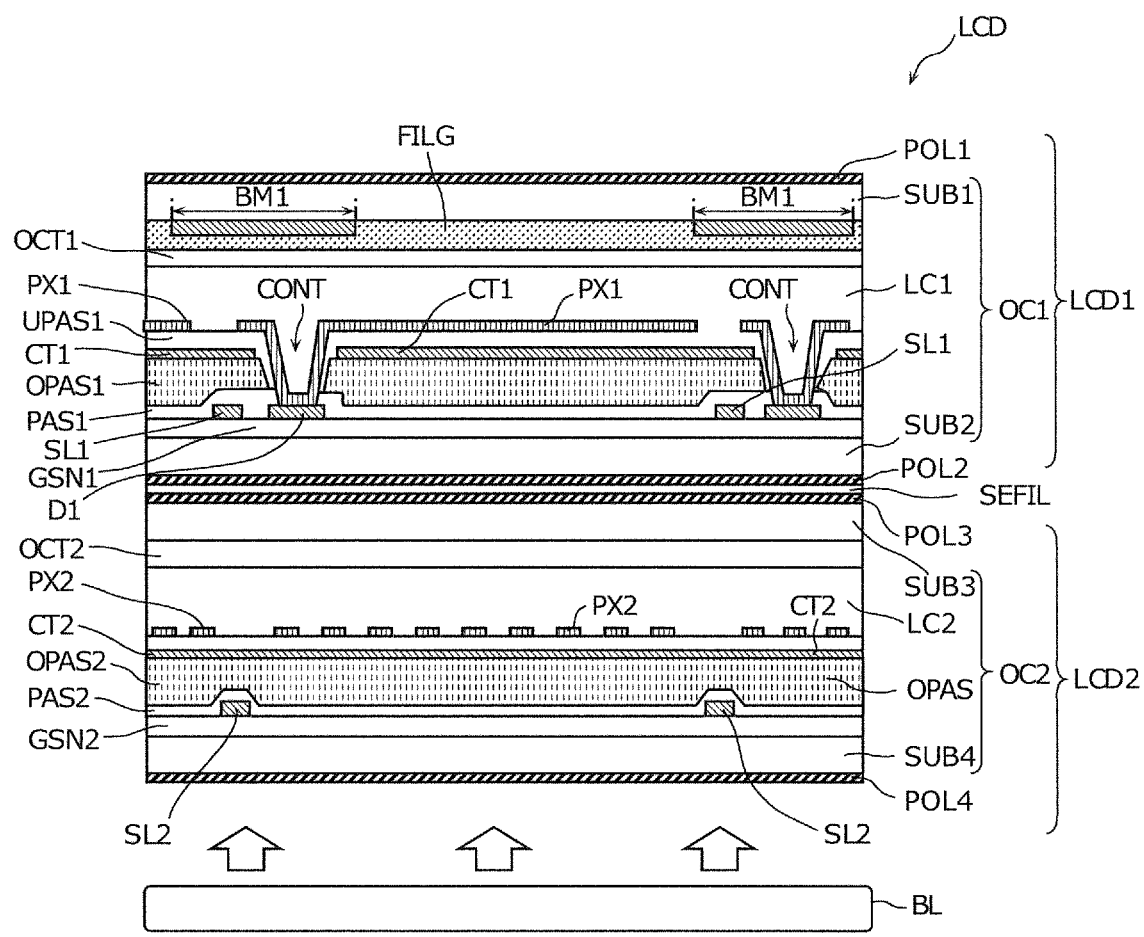
FIG. 21 is a sectional view illustrating the liquid crystal display device according to the modification of the second exemplary embodiment.
Figure 22:
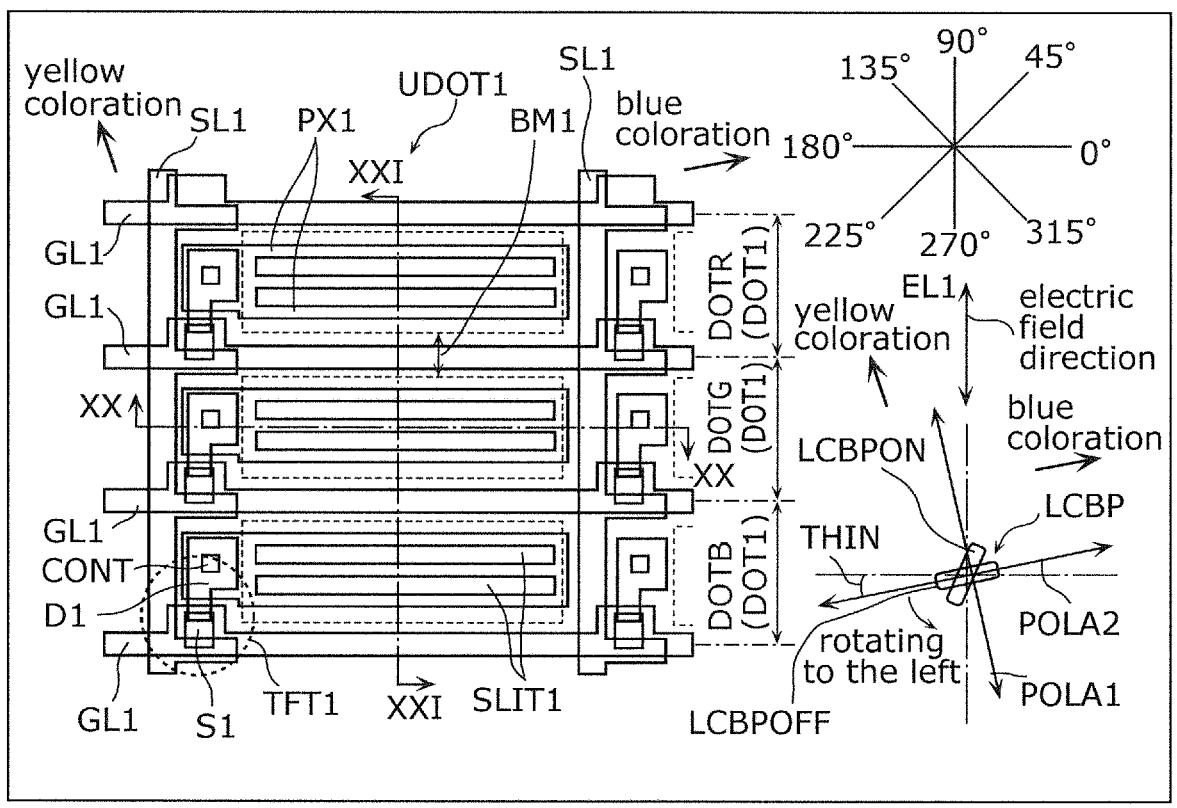
FIG. 22 is a view illustrating a pixel layout of the first liquid crystal display panel according to a modification of the second exemplary embodiment, and illustrating rotation of a liquid crystal molecule in the first liquid crystal layer of the first liquid crystal cell.
Figure 23:
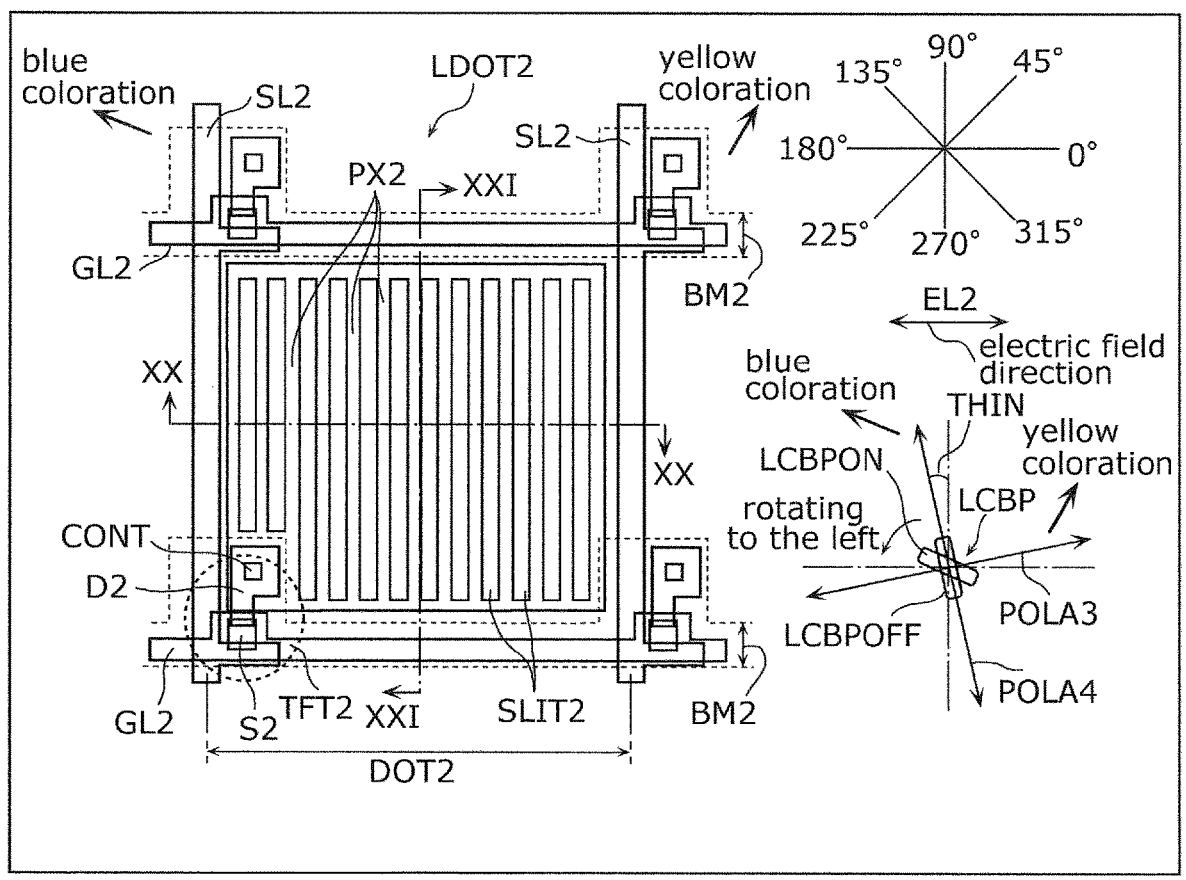
FIG. 23 is a view illustrating a pixel layout of the second liquid crystal display panel according to the modification of the second exemplary embodiment, and illustrating rotation of a liquid crystal molecule in the second liquid crystal layer of the second liquid crystal cell.

FIGS. 20 and 21 are sectional views illustrating liquid crystal display device LCD according to the modification of the second exemplary embodiment. FIG. 22 is a view illustrating a layout of pixel UDOT1 in first liquid crystal display panel LCD1 according to the modification of the second exemplary embodiment, and illustrating rotation of liquid crystal molecule LCBP in first liquid crystal layer LC1 of first liquid crystal cell OC1 according to the modification. FIG. 23 is a view illustrating a layout of pixel LDOT2 in second liquid crystal display panel LCD2 according to the modification of the second exemplary embodiment, and illustrating rotation of liquid crystal molecule LCBP in second liquid crystal layer LC2 of second liquid crystal cell OC2 according to the modification of the second exemplary embodiment. FIG. 20 is a sectional view taken along line XX-XX in FIGS. 22 and 23, and FIG. 21 is a sectional view taken along line XXI-XXI in FIGS. 22 and 23.

As illustrated in FIGS. 20 to 22B, first liquid crystal display panel LCD1 according to the modification is identical to first liquid crystal display panel LCD1 according to the second exemplary embodiment.

On the other hand, as illustrated in FIGS. 20, 21 and 23, second liquid crystal display panel LCD2 according to the modification is different from second liquid crystal display panel LCD2 according to the second exemplary embodiment.

Specifically, as illustrated in FIG. 23, in second liquid crystal display panel LCD2 according to the modification, similarly to the second exemplary embodiment, second source wiring SL2 extends in the column direction, and second gate wiring GL2 extends in the row direction. However, unlike the second exemplary embodiment, second pixel electrode PX2 extends in substantially parallel to second source wiring SL2, and extends in the direction substantially orthogonal to second gate wiring GL2. That is, a longitudinal direction of second pixel electrode PX2 is along with the column direction. Accordingly, the plurality of slits SLIT2 of second pixel electrode PX2 extends in the column direction.

As illustrated in FIG. 23, in second liquid crystal display panel LCD2, liquid crystal molecule LCBP of second liquid crystal layer LC2 is not of the negative type but of the positive type. That is, in the modification, both liquid crystal molecule LCBP of first liquid crystal layer LC1 and liquid crystal molecule LCBP of second liquid crystal layer LC2 are of the positive type. Also in the modification, the alignment axes of third substrate SUB3 and fourth substrate SUB4 are substantially parallel to liquid crystal molecule LCBP of second liquid crystal layer LC2.

In the modification, when the voltage is not applied to second pixel electrode PX2 and second common electrode CT2 (for the black display), initial alignment angle THIN of liquid crystal molecule LCBPOFF in the initial alignment state in second liquid crystal layer LC2 is set so as to rotate to the left (counterclockwise) based on the 90°-270° line by the alignment films of third substrate SUB3 and fourth substrate SUB4. The long axis direction of liquid crystal molecule LCBPOFF is substantially matched with the direction of polarization axis (absorption axis) POLA4 of fourth polarizing plate POL4.

Also in the modification, when the voltage is applied to second pixel electrode PX2 and second common electrode CT2, the electric field (transverse electric field EL2) substantially parallel to third substrate SUB3 and fourth substrate SUB4 is generated between second pixel electrode PX2 and second common electrode CT2. In the modification, because second pixel electrode PX2 is substantially parallel to second source wiring SL2, and extends in the column direction, transverse electric field EL2 is generated in the row direction (the direction of the 0°-180° line) as illustrated in FIG. 23.

When transverse electric field EL2 is generated, liquid crystal molecule LCBP of second liquid crystal layer LC2 rotates according to initial alignment angle THIN. Specifically, when transverse electric field EL2 is generated, liquid crystal molecule LCBP rotates to the left from the state of liquid crystal molecule LCBPOFF to a position of a predetermined angle (for example, 45°), and becomes the state of liquid crystal molecule LCBPON (white display).

Also in liquid crystal display device LCD according to the modification, the long axis direction of liquid crystal molecule LCBPON rotating to the left by transverse electric field EL1 generated in first liquid crystal display panel LCD1 is substantially orthogonal to the long axis direction of liquid crystal molecule LCBNON rotating to the left by transverse electric field EL2 generated in second liquid crystal display panel LCD2. That is, the long axis direction of liquid crystal molecule LCBPON rotating to the left by transverse electric field EL1 is substantially matched with the short axis direction of liquid crystal molecule LCBPON rotating to the left by transverse electric field EL2.

Accordingly, similarly to liquid crystal display device LCD according to the second exemplary embodiment, the rotation of liquid crystal molecule LCBP of first liquid crystal layer LC1 and the rotation of liquid crystal molecule LCBN of second liquid crystal layer LC2 can cancel and compensate for the hue change of first liquid crystal cell OC1 or second liquid crystal cell OC2. This allows the improvement of the color viewing angle characteristic.

Also in the modification, liquid crystal molecule LCBP of one first dot DOT1 of first liquid crystal cell OC1 and liquid crystal molecule LCBP of one second dot DOT2 of second liquid crystal cell OC2 are driven by the single-domain system, and rotate in one direction in the main transmission regions of first dot DOT1 and second dot DOT2. Accordingly, the transmittance is improved compared with the one-pixel multi-domain system. The color viewing angle characteristic for a specific image pattern display is not degraded unlike the each-row multi-domain system.

As described above, in liquid crystal display device LCD according to the modification, the color viewing angle characteristic can be improved irrespective of the image display pattern without degrading the transmittance.

Third Exemplary Embodiment

Liquid crystal display device LCD according to a third exemplary embodiment will be described below.

Similarly to liquid crystal display device LCD according to the first and second exemplary embodiments, liquid crystal display device LCD according to the third exemplary embodiment includes first liquid crystal display panel LCD1 including first liquid crystal cell OC1 sandwiched between first polarizing plate POL1 and second polarizing plate POL2 and second liquid crystal display panel LCD2 including second liquid crystal cell OC2 sandwiched between third polarizing plate POL3 and fourth polarizing plate POL4.

Liquid crystal display device LCD according to the third exemplary embodiment is configured such that the polarization axis directions of first polarizing plate POL1 to fourth polarizing plate POL4 become identical to the row direction (a 0°-180° line) or the column direction (a 90°-270° line) of the display screen of liquid crystal display device LCD.

Therefore, liquid crystal display device LCD according to the third exemplary embodiment is different from liquid crystal display device LCD according to the first and second exemplary embodiments in electrode shapes of the dots (pixels) of first liquid crystal display panel LCD1 and second liquid crystal display panel LCD2.

Liquid crystal display device LCD according to the third exemplary embodiment will be described in detail below with reference to FIGS. 24 to 25.

Figure 24:
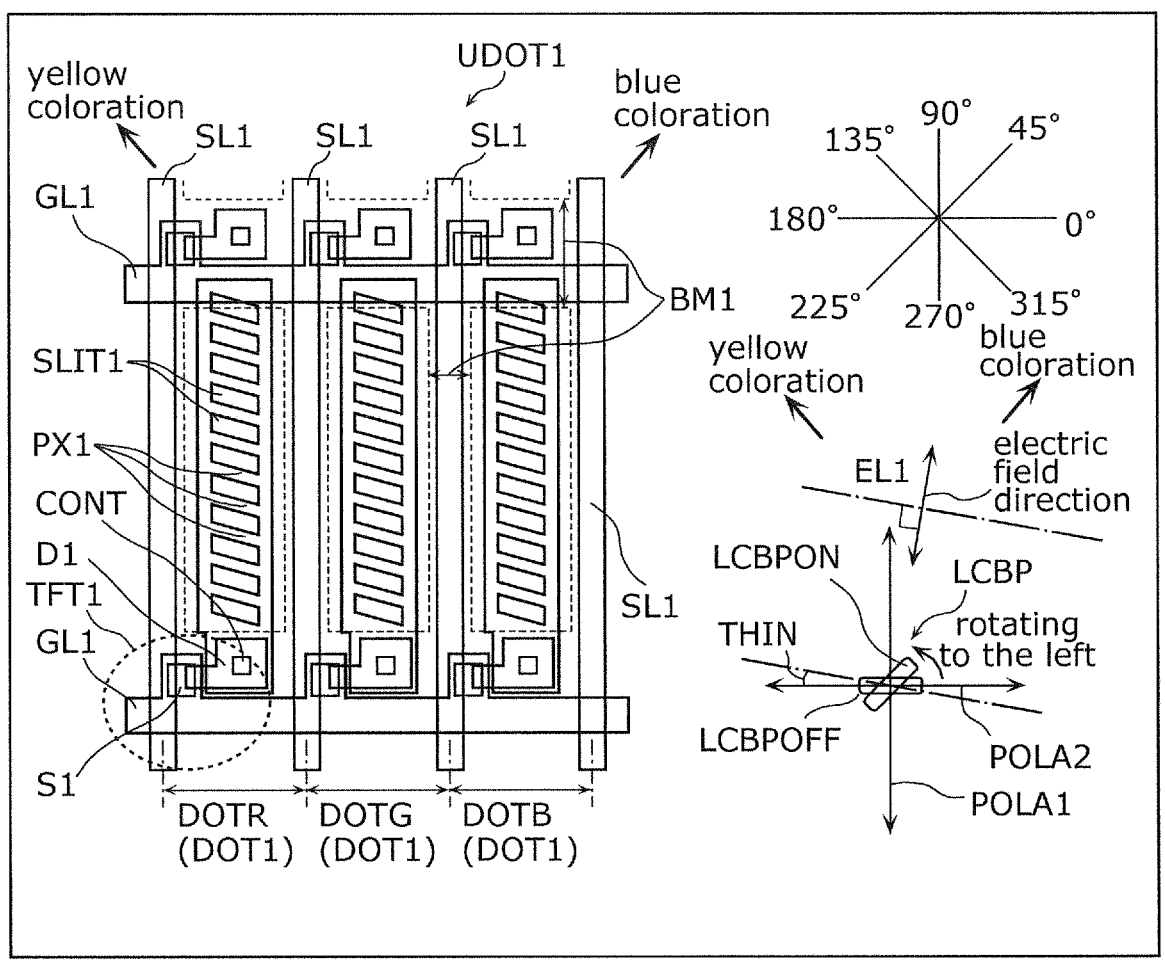
FIG. 24 is a view illustrating a pixel layout of the first liquid crystal display panel according to a third exemplary embodiment, and illustrating rotation of a liquid crystal molecule in the first liquid crystal layer of the first liquid crystal cell.

FIG. 24 is a view illustrating a layout of pixel UDOT1 in first liquid crystal display panel LCD1 according to the third exemplary embodiment, and illustrating rotation of liquid crystal molecule LCBP in first liquid crystal layer LC1 of first liquid crystal cell OC1 according to the third exemplary embodiment. FIG. 25 is a view illustrating a layout of pixel LDOT2 in second liquid crystal display panel LCD2 according to the third exemplary embodiment, and illustrating rotation of liquid crystal molecule LCBN in second liquid crystal layer LC2 of second liquid crystal cell OC2 according to the third exemplary embodiment.

As illustrated in FIG. 24, in first liquid crystal display panel LCD1, similarly to the first and exemplary embodiments, first source wiring SL1 extends in the column direction, and first gate wiring GL1 extends in the row direction. However, unlike the first and second exemplary embodiments, first pixel electrode PX1 is not in parallel to first source wiring SL1 and first gate wiring GL1, but extends so as to be inclined to first source wiring SL1 and first gate wiring GL1. Accordingly, the plurality of slits SLIT1 of first pixel electrode PX1 extends so as to be inclined to first source wiring SL1 and first gate wiring GL1. Specifically, the plurality of slits SLIT1 of first pixel electrode PX1 extends so as to be inclined downward to the right.

In the third exemplary embodiment, first source wiring SL1 extending in the column direction is substantially parallel to polarization axis POLA2 of second polarizing plate POL2, and first gate wiring GL1 extending in the row direction is substantially parallel to polarization axis POLA1 of first polarizing plate POL1.

As illustrated in FIG. 24, in first liquid crystal display panel LCD1, liquid crystal molecule LCBP of first liquid crystal layer LC1 is of the positive type similarly to liquid crystal molecule LCBP of first liquid crystal layer LC1 according to the first and second exemplary embodiments. Also in the third exemplary embodiment, the alignment axes of first substrate SUB1 and second substrate SUB2 are substantially parallel to liquid crystal molecule LCBP of first liquid crystal layer LC1.

In the third exemplary embodiment, the initial alignment axis (the long axis direction) of liquid crystal molecule LCBPOFF in the initial alignment state in first liquid crystal layer LC1 is substantially matched with the direction substantially orthogonal to first source wiring SL1, namely, the row direction (the 0°-180° line). Initial alignment angle THIN of liquid crystal molecule LCBPOFF is set so as to rotate to the left (counterclockwise) within the range of 0°<THIN<20° based on the initial alignment axis of liquid crystal molecule LCBPOFF. The long axis direction of liquid crystal molecule LCBPOFF is substantially matched with the direction of polarization axis (absorption axis) POLA2 of second polarizing plate POL2.

Also in the third exemplary embodiment, when the voltage is applied to first pixel electrode PX1 and first common electrode CT1, the electric field (transverse electric field EL1) substantially parallel to first substrate SUB1 and second substrate SUB2 is generated between first pixel electrode PX1 and first common electrode CT1. In the third exemplary embodiment, however, because first pixel electrode PX1 extends so as to be inclined, transverse electric field EL1 is generated in the direction inclined to the column direction and the row direction as illustrated in FIG. 24.

When transverse electric field EL1 is generated, liquid crystal molecule LCBP of first liquid crystal layer LC1 rotates according to initial alignment angle THIN. Specifically, when transverse electric field EL1 is generated, liquid crystal molecule LCBP rotates to the left from the state of liquid crystal molecule LCBPOFF to a position of a predetermined angle (for example, 45°), and becomes the state of liquid crystal molecule LCBPON (white display).

Figure 25:
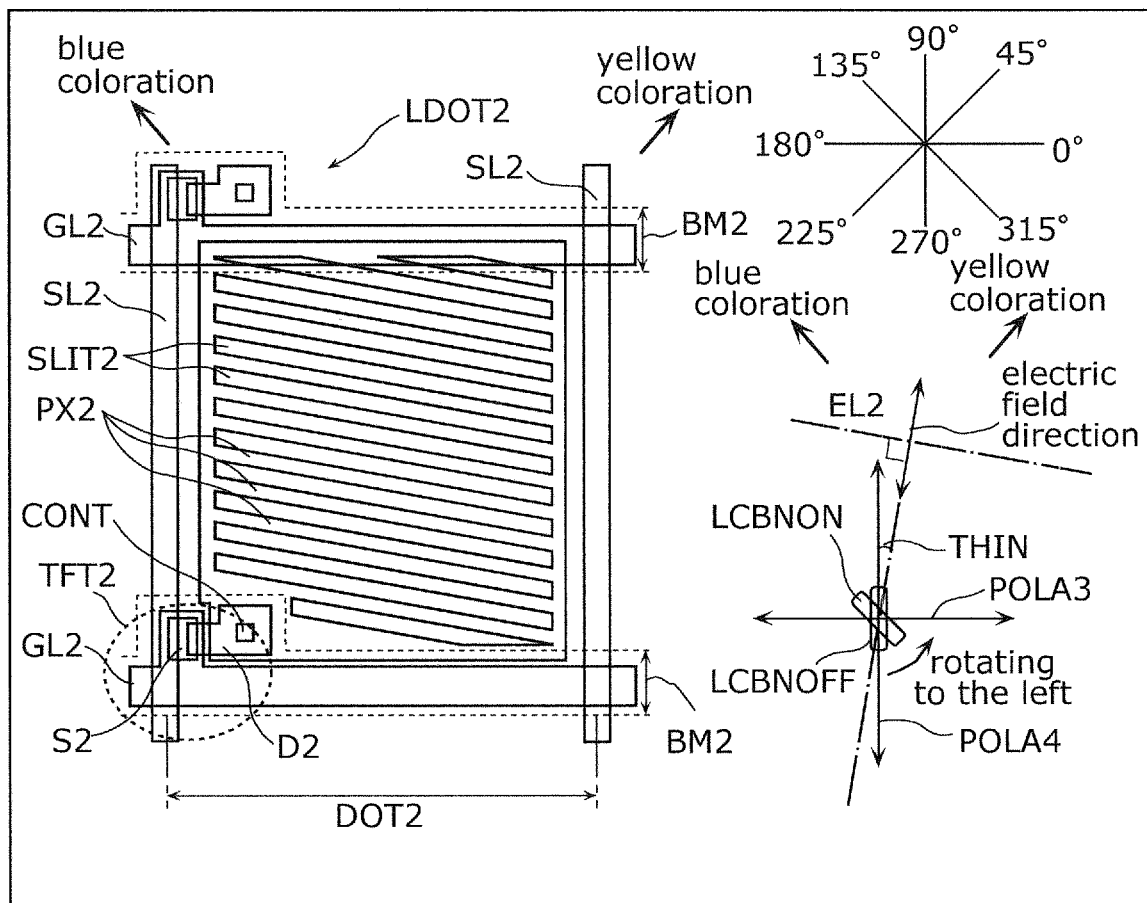
FIG. 25 is a view illustrating a pixel layout of the second liquid crystal display panel according to the third exemplary embodiment, and illustrating rotation of a liquid crystal molecule in the second liquid crystal layer of the second liquid crystal cell.

On the other hand, as illustrated in FIG. 25, in second liquid crystal display panel LCD2, similarly to the first and second exemplary embodiments, second source wiring SL2 extends in the column direction, and second gate wiring GL2 extends in the row direction. However, unlike the first and second exemplary embodiments, second pixel electrode PX2 extends so as to be inclined to second source wiring SL2 and second gate wiring GL2. Accordingly, the plurality of slits SLIT2 of second pixel electrode PX2 extends so as to be inclined to second source wiring SL2 and second gate wiring GL2. Specifically, the plurality of slits SLIT2 of second pixel electrode PX2 extends so as to be inclined downward to the right.

In the third exemplary embodiment, first source wiring SL1 extending in the column direction is substantially parallel to polarization axis POLA4 of fourth polarizing plate POL4, and second gate wiring GL2 extending in the row direction is substantially parallel to polarization axis POLA3 of third polarizing plate POL3.

As illustrated in FIG. 25, in second liquid crystal display panel LCD2, liquid crystal molecule LCBN of second liquid crystal layer LC2 is of the negative type similarly to liquid crystal molecule LCBN of second liquid crystal layer LC2 according to the first and second exemplary embodiments. Also in the second exemplary embodiment, the alignment axes of third substrate SUB3 and fourth substrate SUB4 are substantially parallel to liquid crystal molecule LCBN of second liquid crystal layer LC2.

In the third exemplary embodiment, the initial alignment axis (the long axis direction) of liquid crystal molecule LCBNOFF in the initial alignment state in second liquid crystal layer LC2 is set so as to be substantially parallel to second source wiring SL2, namely, so as to be substantially parallel to the column direction (the 90°-270° line). Initial alignment angle THIN of liquid crystal molecule LCBNOFF is set so as to rotate to the left (counterclockwise) within the range of 0°<THIN<20° based on the initial alignment axis of liquid crystal molecule LCBNOFF. The long axis direction of liquid crystal molecule LCBNOFF is substantially matched with the direction of polarization axis (absorption axis) POLA4 of fourth polarizing plate POL4.

Also in the third exemplary embodiment, when the voltage is applied to second pixel electrode PX2 and second common electrode CT2, the electric field (transverse electric field EL2) substantially parallel to third substrate SUB3 and fourth substrate SUB4 is generated between second pixel electrode PX2 and second common electrode CT2. In the third exemplary embodiment, however, because second pixel electrode PX2 extends so as to be inclined, transverse electric field EL2 is generated in the direction inclined to the column direction and the row direction as illustrated in FIG. 25.

When transverse electric field EL2 is generated, liquid crystal molecule LCBN of second liquid crystal layer LC2 rotates according to initial alignment angle THIN. Specifically, when transverse electric field EL2 is generated, liquid crystal molecule LCBN rotates to the left from the state of liquid crystal molecule LCBNOFF to a position of a predetermined angle (for example, 45°), and becomes the state of liquid crystal molecule LCBNON (white display).

In liquid crystal display device LCD according to the third exemplary embodiment, the alignment axes of first substrate SUB1 and second substrate SUB2 in first liquid crystal display panel LCD1 are substantially orthogonal to the alignment axes of third substrate SUB3 and fourth substrate SUB4 in second liquid crystal display panel LCD2. Therefore, when transverse electric fields EL1 and EL2 are not generated in first liquid crystal cell OC1 and second liquid crystal cell OC2, the long axis direction (the alignment axis direction) of liquid crystal molecule LCBP of first liquid crystal layer LC1 is substantially orthogonal to the long axis direction (the alignment axis direction) of liquid crystal molecule LCBN of second liquid crystal layer LC2.

When the voltage is applied to first pixel electrode PX1 and first common electrode CT1 in first dot DOT1 of first liquid crystal cell OC1 while the voltage is applied to second pixel electrode PX2 and second common electrode CT2 in second dot DOT2 of second liquid crystal cell OC2, transverse electric field EL1 is generated only in one direction in first dot DOT1 while transverse electric field EL2 is generated only in one direction in second dot DOT2. At this point, also in the third exemplary embodiment, the direction of transverse electric field EL1 generated in first dot DOT1 is substantially identical to the direction of transverse electric field EL2 generated in second dot DOT2.

When transverse electric fields EL1 and EL2 are generated, liquid crystal molecule LCBP of first dot DOT1 of first liquid crystal layer LC1 rotates while liquid crystal molecule LCBN of second dot DOT2 of second liquid crystal layer LC2 rotates. In the third exemplary embodiment, the rotational direction of liquid crystal molecule LCBP of first liquid crystal layer LC1 and the rotational direction of liquid crystal molecule LCBN of second liquid crystal cell OC2 are identical to each other, and both liquid crystal molecule LCBP and liquid crystal molecule LCBN rotate to the left.

Therefore, the long axis direction of liquid crystal molecule LCBPON rotating to the left by transverse electric field EL1 generated in first liquid crystal cell OC1 is substantially orthogonal to the long axis direction of liquid crystal molecule LCBNON rotating to the left by transverse electric field EL2 generated in second liquid crystal cell OC2. When transverse electric field EL1 is generated in first liquid crystal cell OC1 while transverse electric field EL2 is generated in second liquid crystal cell OC2, the long axis direction of liquid crystal molecule LCBPON of first liquid crystal layer LC1 is substantially matched with the short axis direction of liquid crystal molecule LCBNON of second liquid crystal layer LC2.

Accordingly, similarly to the first and second exemplary embodiments, rotated liquid crystal molecule LCBP (liquid crystal molecule LCBPON) of first liquid crystal layer LC1 and rotated liquid crystal molecule LCBN (liquid crystal molecule LCBNON) of second liquid crystal layer LC2 can cancel and compensate for the hue change (the coloring) of first liquid crystal cell OC1 or second liquid crystal cell OC2. Therefore, the coloring in a predetermined direction is canceled in the whole display screen of liquid crystal display device LCD, and the color viewing angle characteristic can be improved.

Liquid crystal display device LCD according to the third exemplary embodiment is also configured such that the rotation of liquid crystal molecule LCBP of first liquid crystal layer LC1 and the rotation of liquid crystal molecule LCBN of second liquid crystal layer LC2 cancel and compensate for the hue change of first liquid crystal cell OC1 or second liquid crystal cell OC2.

Also in liquid crystal display device LCD according to the third exemplary embodiment, liquid crystal molecule LCBP of one first dot DOT1 of first liquid crystal cell OC1 and liquid crystal molecule LCBN of one second dot DOT2 of second liquid crystal cell OC2 are driven by the single-domain system, and rotate in one direction in the main transmission regions of first dot DOT1 and second dot DOT2. Therefore, the transmittance can be improved compared with the one-pixel multi-domain system. The color viewing angle characteristic for a specific image pattern display is not degraded unlike the each-row multi-domain system.

Accordingly, also in liquid crystal display device LCD according to the third exemplary embodiment, the color viewing angle characteristic can be improved irrespective of the image display pattern without degrading the transmittance.

Additionally, in the third exemplary embodiment, first source wiring SL1 extends in substantially parallel to polarization axis POLA1 of first polarizing plate POL1, and first gate wiring GL1 extends in substantially parallel to polarization axis POLA2 of second polarizing plate POL2. Second source wiring SL2 extends in substantially parallel to polarization axis POLA4 of fourth polarizing plate POL4, and second gate wiring GL2 extends in substantially parallel to polarization axis POLA3 of third polarizing plate POL3.

Therefore, polarization axis POLA1 of first polarizing plate POL1 is substantially matched with the column direction (the 90°-270° line), and polarization axis POLA2 of second polarizing plate POL2 is substantially matched with the row direction (the 0°-180° line). Polarization axis POLA3 of third polarizing plate POL3 is substantially matched with the row direction (the 0°-180° line), and polarization axis POLA4 of fourth polarizing plate POL4 is substantially matched with the column direction (the 90°-270° line).

Accordingly, when an individual polarizing plate is cut out by cutting a large-size polarizing plate sheet, the large-size polarizing plate sheet can be cut into a rectangular shape without obliquely cutting the large-size polarizing plate sheet. An acquisition rate of the polarizing plate can thus be increased.

First Modification of Third Exemplary Embodiment

Liquid crystal display device LCD according to a first modification of the third exemplary embodiment will be described below with reference to FIGS. 26 to 27.

Figure 26:
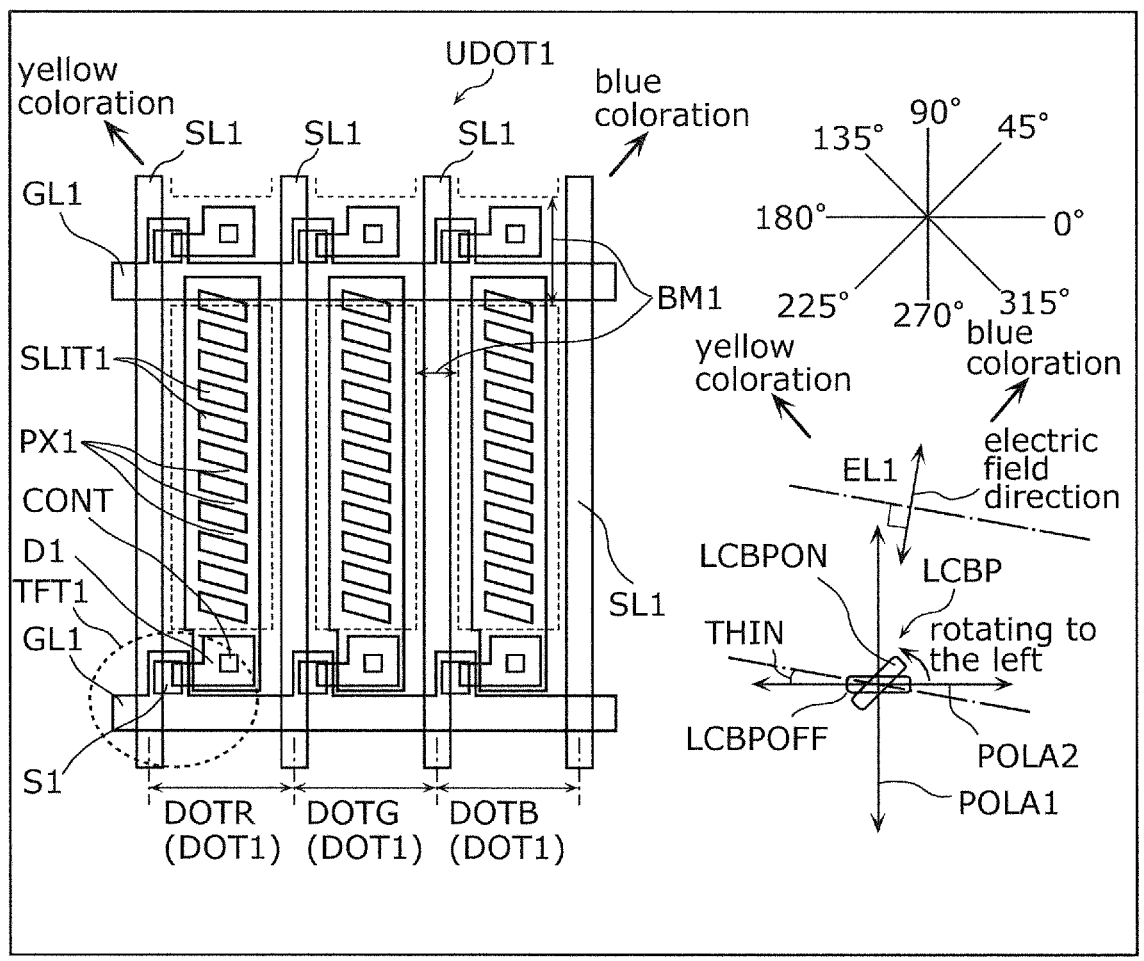
FIG. 26 is a view illustrating a pixel layout of the first liquid crystal display panel according to a first modification of the third exemplary embodiment, and illustrating rotation of a liquid crystal molecule in the first liquid crystal layer of the first liquid crystal cell.

FIG. 26 is a view illustrating a layout of pixel UDOT1 in first liquid crystal display panel LCD1 according to the first modification of the third exemplary embodiment, and illustrating rotation of liquid crystal molecule LCBP in first liquid crystal layer LC1 of first liquid crystal cell OC1 according to the first modification of the third exemplary embodiment. FIG. 27 is a view illustrating a layout of pixel LDOT2 in second liquid crystal display panel LCD2 according to the first modification of the third exemplary embodiment, and illustrating rotation of liquid crystal molecule LCBP in second liquid crystal layer LC2 of second liquid crystal cell OC2 according to the first modification of the third exemplary embodiment.

As illustrated in FIG. 26, first liquid crystal display panel LCD1 according to the first modification is identical to first liquid crystal display panel LCD1 according to the third exemplary embodiment.

Figure 27:
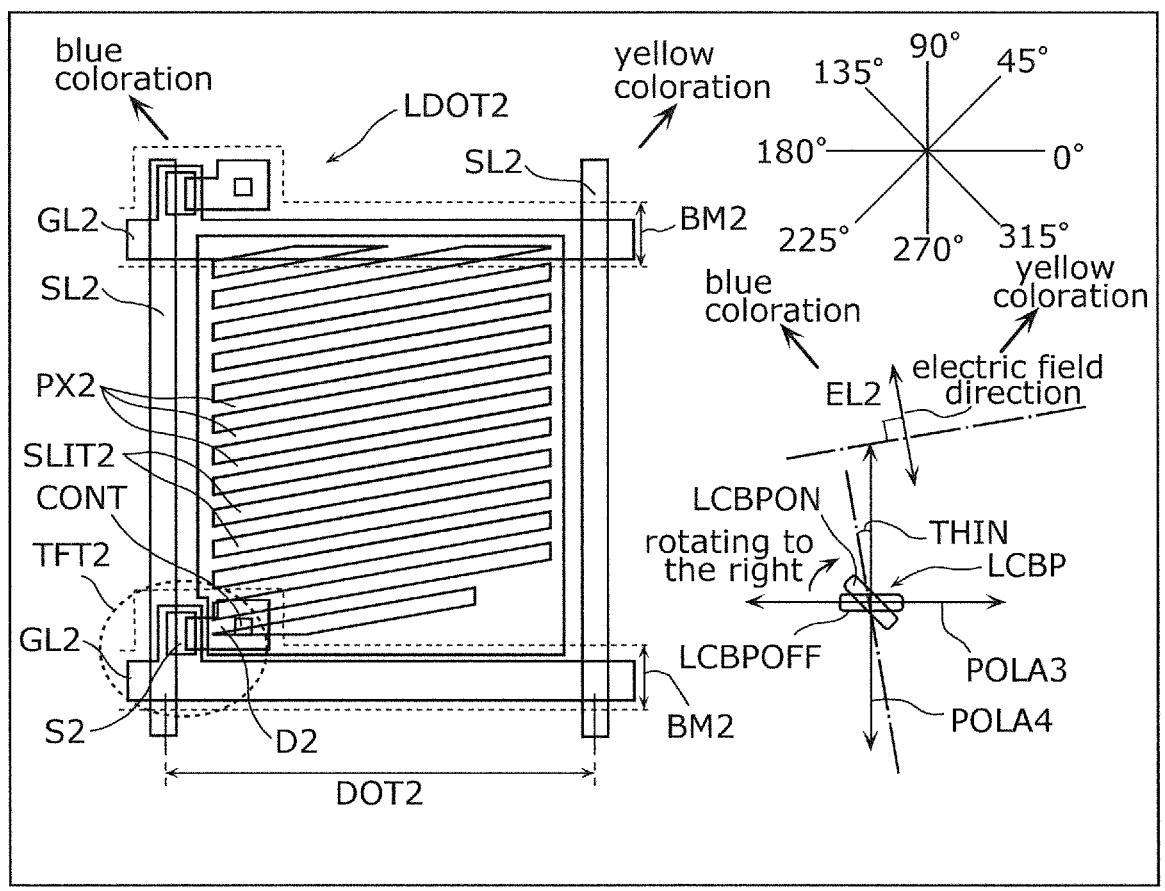
FIG. 27 is a view illustrating a pixel layout of the second liquid crystal display panel according to the first modification of the third exemplary embodiment, and illustrating rotation of a liquid crystal molecule in the second liquid crystal layer of the second liquid crystal cell.

On the other hand, as illustrated in FIG. 27, second liquid crystal display panel LCD2 according to the first modification is different from second liquid crystal display panel LCD2 according to the third exemplary embodiment.

Specifically, as illustrated in FIG. 27, in second liquid crystal display panel LCD2 according to the first modification, similarly to the third exemplary embodiment, second pixel electrode PX2 extends so as to be inclined to second source wiring SL2 and second gate wiring GL2. However, unlike the third exemplary embodiment, second pixel electrode PX2 extends so as to be inclined upward to the right. Accordingly, the plurality of slits SLIT2 of second pixel electrode PX2 also extends so as to be inclined upward to the right.

Also in the first modification, first source wiring SL1 extending in the column direction is substantially parallel to polarization axis POLA4 of fourth polarizing plate POL4, and second gate wiring GL2 extending in the row direction is substantially parallel to polarization axis POLA3 of third polarizing plate POL3.

As illustrated in FIG. 27, in second liquid crystal display panel LCD2 according to the first modification, liquid crystal molecule LCBP of second liquid crystal layer LC2 is not of the negative type but of the positive type. That is, in the modification, both liquid crystal molecule LCBP of first liquid crystal layer LC1 and liquid crystal molecule LCBP of second liquid crystal layer LC2 are of the positive type. Also in the first modification, the alignment axes of third substrate SUB3 and fourth substrate SUB4 are substantially parallel to liquid crystal molecule LCBP of second liquid crystal layer LC2.

In the first modification, the initial alignment axis (the long axis direction) of liquid crystal molecule LCBPOFF in the initial alignment state in second liquid crystal layer LC2 is set so as to be substantially parallel to second gate wiring GL2, namely, so as to be substantially parallel to the column direction (the 0°-180° line). Initial alignment angle THIN of liquid crystal molecule LCBPOFF is set so as to rotate to the right (clockwise) within the range of 0°<THIN<20° based on the initial alignment axis of liquid crystal molecule LCBPOFF. That is, the rotational direction of liquid crystal molecule LCBP of second liquid crystal layer LC2 is opposite to the rotational direction of liquid crystal molecule LCBN of first liquid crystal layer LC1. The long axis direction of liquid crystal molecule LCBPOFF of second liquid crystal layer LC2 is substantially matched with the direction of polarization axis (absorption axis) POLA3 of third polarizing plate POL3.

Also in the first modification, when the voltage is applied to second pixel electrode PX2 and second common electrode CT2, the electric field (transverse electric field EL2) substantially parallel to third substrate SUB3 and fourth substrate SUB4 is generated between second pixel electrode PX2 and second common electrode CT2. In the first modification, because second pixel electrode PX2 extends so as to be inclined, transverse electric field EL2 is generated in the direction inclined to the column direction and the row direction as illustrated in FIG. 27.

When transverse electric field EL2 is generated, liquid crystal molecule LCBP of second liquid crystal layer LC2 rotates according to initial alignment angle THIN. Specifically, when transverse electric field EL2 is generated, liquid crystal molecule LCBP rotates to the right from the state of liquid crystal molecule LCBPOFF to a position of a predetermined angle (for example, 45°), and becomes the state of liquid crystal molecule LCBPON (white display).

In liquid crystal display device LCD according to the first modification, unlike the third exemplary embodiment, the alignment axes of first substrate SUB1 and second substrate SUB2 in first liquid crystal display panel LCD1 are substantially parallel to the alignment axes of third substrate SUB3 and fourth substrate SUB4 in second liquid crystal display panel LCD2. Therefore, when transverse electric fields EL1 and EL2 are not generated in first liquid crystal cell OC1 and second liquid crystal cell OC2, the long axis direction (the alignment axis direction) of liquid crystal molecule LCBP of first liquid crystal layer LC1 is substantially matched with the long axis direction (the alignment axis direction) of liquid crystal molecule LCBP of second liquid crystal layer LC2.

When the voltage is applied to first pixel electrode PX1 and first common electrode CT1 in first dot DOT1 of first liquid crystal cell OC1 while the voltage is applied to second pixel electrode PX2 and second common electrode CT2 in second dot DOT2 of second liquid crystal cell OC2, transverse electric field EL1 is generated only in one direction in first dot DOT1 while transverse electric field EL2 is generated only in one direction in second dot DOT2. At this point, in the first modification, the direction of transverse electric field EL1 generated in first dot DOT1 is different from the direction of transverse electric field EL2 generated in second dot DOT2.

When transverse electric fields EL1 and EL2 are generated, liquid crystal molecule LCBP of first dot DOT1 of first liquid crystal layer LC1 rotates while liquid crystal molecule LCBP of second dot DOT2 of second liquid crystal layer LC2 rotates. In the first modification, the rotational direction of liquid crystal molecule LCBP of first liquid crystal layer LC1 is opposite to the rotational direction of liquid crystal molecule LCBP of second liquid crystal cell OC2, liquid crystal molecule LCBP of first liquid crystal layer LC1 rotates to the left, and liquid crystal molecule LCBP of second liquid crystal cell OC2 rotates to the right.

Therefore, the long axis direction of liquid crystal molecule LCBPON rotating to the left by transverse electric field EL1 generated in first liquid crystal cell OC1 is substantially orthogonal to the long axis direction of liquid crystal molecule LCBPON rotating to the right by transverse electric field EL2 generated in second liquid crystal cell OC2. When transverse electric field EL1 is generated in first liquid crystal cell OC1 while transverse electric field EL2 is generated in second liquid crystal cell OC2, the long axis direction of liquid crystal molecule LCBPON of first liquid crystal layer LC1 is substantially matched with the short axis direction of liquid crystal molecule LCBPON of second liquid crystal layer LC2.

Accordingly, similarly to the third exemplary embodiment, rotated liquid crystal molecule LCBP (liquid crystal molecule LCBPON) of first liquid crystal layer LC1 and rotated liquid crystal molecule LCBP (liquid crystal molecule LCBPON) of second liquid crystal layer LC2 can cancel and compensate for the hue change (the coloring) of first liquid crystal cell OC1 or second liquid crystal cell OC2. Therefore, the coloring in a predetermined direction is canceled in the whole display screen of liquid crystal display device LCD, and the color viewing angle characteristic can be improved.

Liquid crystal display device LCD according to the first modification is also configured such that the rotation of liquid crystal molecule LCBP of first liquid crystal layer LC1 and the rotation of liquid crystal molecule LCBP of second liquid crystal layer LC2 cancel and compensate for the hue change of first liquid crystal cell OC1 or second liquid crystal cell OC2.

Also in liquid crystal display device LCD according to the first modification, liquid crystal molecule LCBP of one first dot DOT1 of first liquid crystal cell OC1 and liquid crystal molecule LCBP of one second dot DOT2 of second liquid crystal cell OC2 are driven by the single-domain system, and rotate in one direction in the main transmission regions of first dot DOT1 and second dot DOT2. Therefore, the transmittance can be improved compared with the one-pixel multi-domain system. The color viewing angle characteristic for a specific image pattern display is not degraded unlike the each-row multi-domain system.

Accordingly, also in liquid crystal display device LCD according to the first modification, the color viewing angle characteristic can be improved irrespective of the image display pattern without degrading the transmittance.

Also in the first modification, polarization axis POLA1 of first polarizing plate POL1 is substantially matched with the column direction (the 90°-270° line), and polarization axis POLA2 of second polarizing plate POL2 is substantially matched with the row direction (the 0°-180° line). Polarization axis POLA3 of third polarizing plate POL3 is substantially matched with the row direction (the 0°-180° line), and polarization axis POLA4 of fourth polarizing plate POL4 is substantially matched with the column direction (the 90°-270° line). Accordingly, similarly to the third exemplary embodiment, the large-size polarizing plate sheet can be cut into the rectangular shape without obliquely cutting the large-size polarizing plate sheet, so that the acquisition rate of the polarizing plate can be increased.

Second Modification of Third Exemplary Embodiment

Liquid crystal display device LCD according to a second modification of the third exemplary embodiment will be described below with reference to FIGS. 28 to 29.

Figure 28:
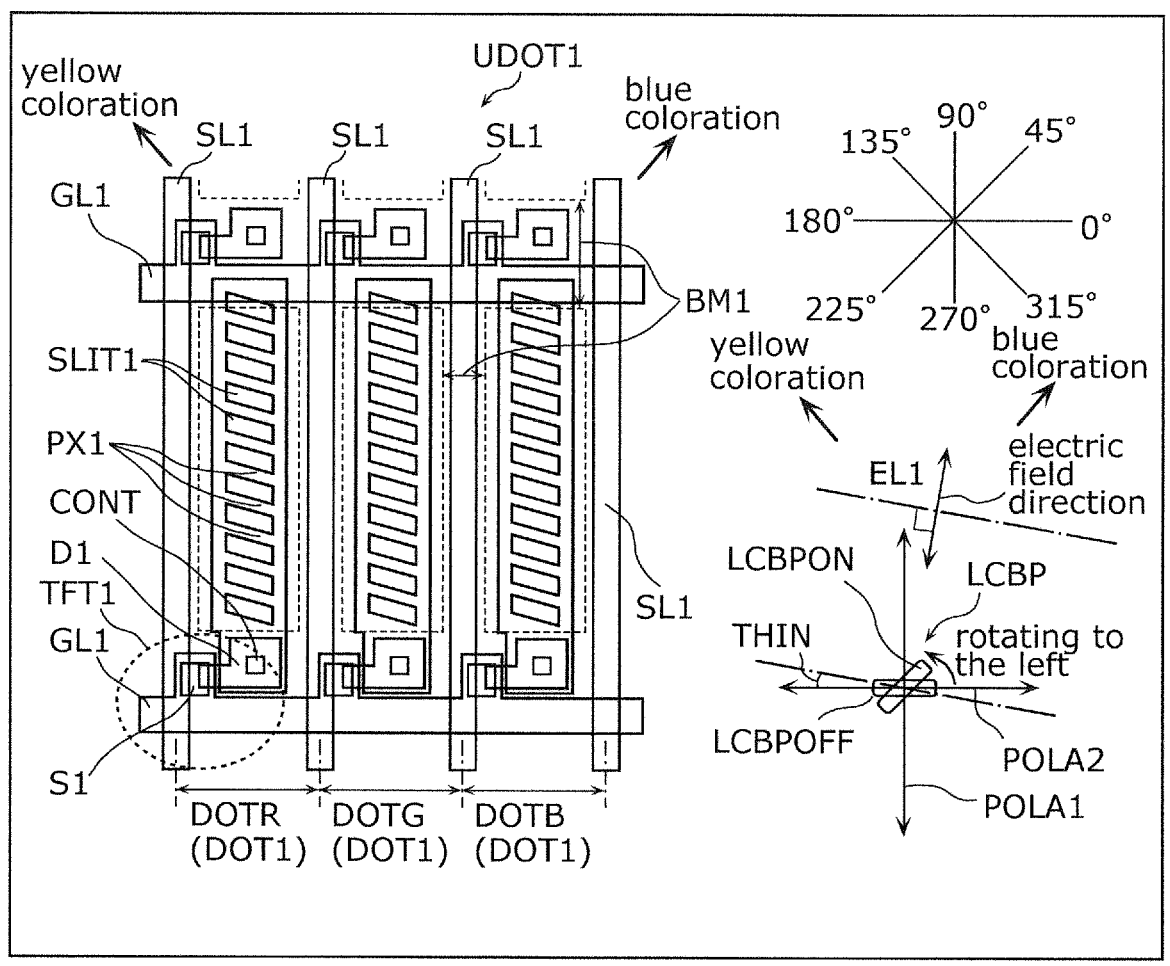
FIG. 28 is a view illustrating a pixel layout of the first liquid crystal display panel according to a second modification of the third exemplary embodiment, and illustrating rotation of a liquid crystal molecule in the first liquid crystal layer of the first liquid crystal cell.

FIG. 28 is a view illustrating a layout of pixel UDOT1 in first liquid crystal display panel LCD1 according to the second modification of the third exemplary embodiment, and illustrating rotation of liquid crystal molecule LCBP in first liquid crystal layer LC1 of first liquid crystal cell OC1 according to the second modification of the third exemplary embodiment. FIG. 29 is a view illustrating a layout of pixel LDOT2 in second liquid crystal display panel LCD2 according to the second modification of the third exemplary embodiment, and illustrating rotation of liquid crystal molecule LCBN in second liquid crystal layer LC2 of second liquid crystal cell OC2 according to the second modification of the third exemplary embodiment.

As illustrated in FIG. 28, first liquid crystal display panel LCD1 according to the second modification is identical to first liquid crystal display panel LCD1 according to the third exemplary embodiment.

Figure 29:
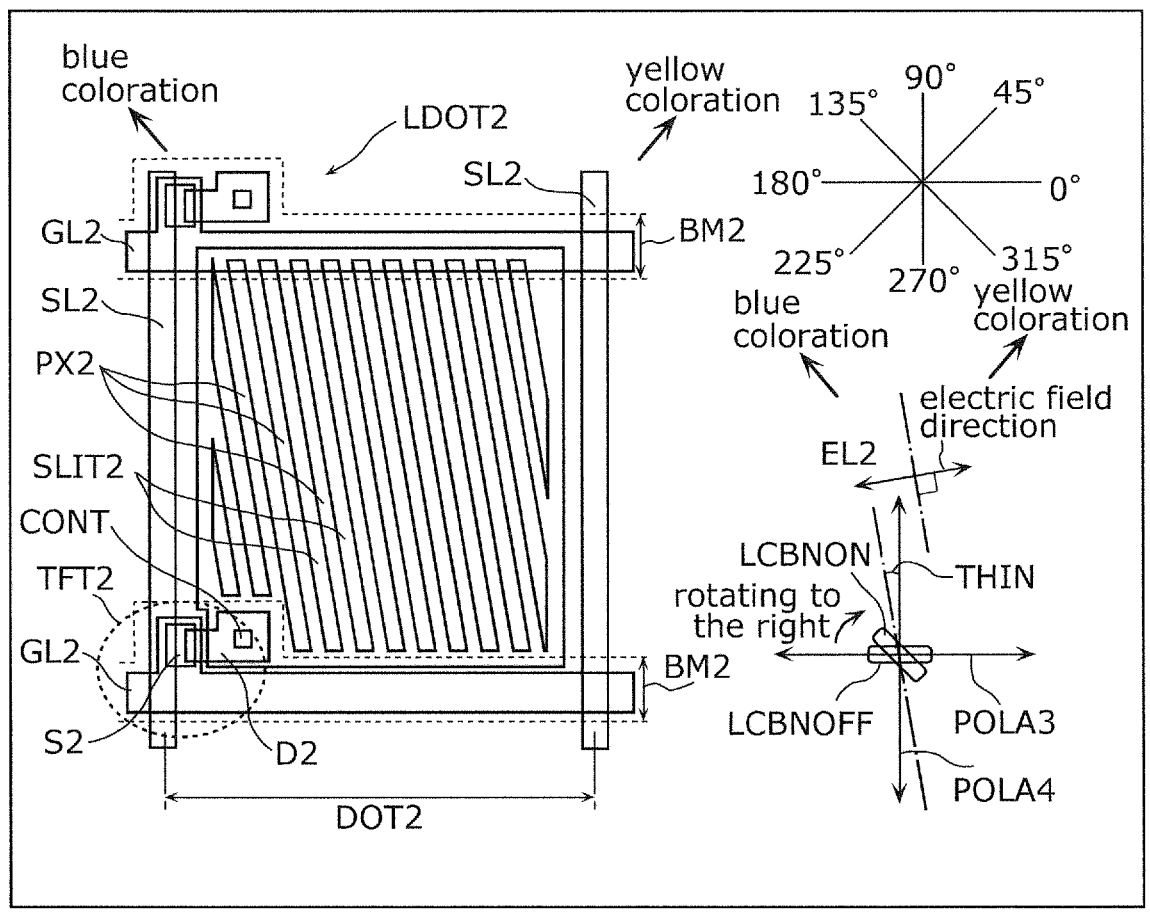
FIG. 29 is a view illustrating a pixel layout of the second liquid crystal display panel according to the second modification of the third exemplary embodiment, and illustrating rotation of a liquid crystal molecule in the second liquid crystal layer of the second liquid crystal cell.

On the other hand, as illustrated in FIG. 29, second liquid crystal display panel LCD2 according to the second modification is different from second liquid crystal display panel LCD2 according to the third exemplary embodiment.

Specifically, as illustrated in FIG. 29, in second liquid crystal display panel LCD2 according to the second modification, second pixel electrode PX2 extends so as to be inclined downward to the right similarly to the third exemplary embodiment. However, unlike the third exemplary embodiment, second pixel electrode PX2 extends so as to be inclined downward to the right and such that transverse electric field EL2 is generated in the direction substantially orthogonal to the direction of transverse electric field EL1 generated in first liquid crystal cell OC1.

Also in the second modification, first source wiring SL1 extending in the column direction is substantially parallel to polarization axis POLA4 of fourth polarizing plate POL4, and second gate wiring GL2 extending in the row direction is substantially parallel to polarization axis POLA3 of third polarizing plate POL3.

As illustrated in FIG. 29, in second liquid crystal display panel LCD2 according to the second modification, liquid crystal molecule LCBN of second liquid crystal layer LC2 is of the negative type. Also in the second modification, the alignment axes of third substrate SUB3 and fourth substrate SUB4 are substantially parallel to liquid crystal molecule LCBN of second liquid crystal layer LC2.

In the second modification, the initial alignment axis (the long axis direction) of liquid crystal molecule LCBNOFF in the initial alignment state in second liquid crystal layer LC2 is set so as to be substantially parallel to second gate wiring GL2, namely, so as to be substantially parallel to the column direction (the 0°-180° line). Initial alignment angle THIN of liquid crystal molecule LCBNOFF is set so as to rotate to the right (clockwise) within the range of 0°<THIN<20° based on the initial alignment axis of liquid crystal molecule LCBNOFF. That is, the rotational direction of liquid crystal molecule LCBN of second liquid crystal layer LC2 is opposite to the rotational direction of liquid crystal molecule LCBP of first liquid crystal layer LC1. The long axis direction of liquid crystal molecule LCBNOFF of second liquid crystal layer LC2 is substantially matched with the direction of polarization axis (absorption axis) POLA3 of third polarizing plate POL3.

Also in the second modification, when the voltage is applied to second pixel electrode PX2 and second common electrode CT2, the electric field (transverse electric field EL2) substantially parallel to third substrate SUB3 and fourth substrate SUB4 is generated between second pixel electrode PX2 and second common electrode CT2. In the second modification, transverse electric field EL2 is generated in the direction substantially orthogonal to transverse electric field EL1 generated in first liquid crystal cell OC1.

When transverse electric field EL2 is generated, liquid crystal molecule LCBN of second liquid crystal layer LC2 rotates according to initial alignment angle THIN. Specifically, when transverse electric field EL2 is generated, liquid crystal molecule LCBN rotates to the right from the state of liquid crystal molecule LCBNOFF to a position of a predetermined angle (for example, 45°), and becomes the state of liquid crystal molecule LCBNON (white display).

In liquid crystal display device LCD according to the second modification, similarly to the first modification of the third exemplary embodiment, the alignment axes of first substrate SUB1 and second substrate SUB2 in first liquid crystal display panel LCD1 are substantially parallel to the alignment axes of third substrate SUB3 and fourth substrate SUB4 in second liquid crystal display panel LCD2. Therefore, when transverse electric fields EL1 and EL2 are not generated in first liquid crystal cell OC1 and second liquid crystal cell OC2, the long axis direction (the alignment axis direction) of liquid crystal molecule LCBP of first liquid crystal layer LC1 is substantially matched with the long axis direction (the alignment axis direction) of liquid crystal molecule LCBP of second liquid crystal layer LC2.

When the voltage is applied to first pixel electrode PX1 and first common electrode CT1 in first dot DOT1 of first liquid crystal cell OC1 while the voltage is applied to second pixel electrode PX2 and second common electrode CT2 in second dot DOT2 of second liquid crystal cell OC2, transverse electric field EL1 is generated only in one direction in first dot DOT1 while transverse electric field EL2 is generated only in one direction in second dot DOT2. At this point, in the second modification, the direction of transverse electric field EL1 generated in first dot DOT1 is substantially orthogonal to the direction of transverse electric field EL2 generated in second dot DOT2.

When transverse electric fields EL1 and EL2 are generated, liquid crystal molecule LCBP of first dot DOT1 of first liquid crystal layer LC1 rotates while liquid crystal molecule LCBN of second dot DOT2 of second liquid crystal layer LC2 rotates. In the second modification, the rotational direction of liquid crystal molecule LCBP of first liquid crystal layer LC1 is opposite to the rotational direction of liquid crystal molecule LCBP of second liquid crystal cell OC2, liquid crystal molecule LCBP of first liquid crystal layer LC1 rotates to the left, and liquid crystal molecule LCBN of second liquid crystal cell OC2 rotates to the right.

Therefore, the long axis direction of liquid crystal molecule LCBPON rotating to the left by transverse electric field EL1 generated in first liquid crystal cell OC1 is substantially orthogonal to the long axis direction of liquid crystal molecule LCBNON rotating to the right by transverse electric field EL2 generated in second liquid crystal cell OC2. When transverse electric field EL1 is generated in first liquid crystal cell OC1 while transverse electric field EL2 is generated in second liquid crystal cell OC2, the long axis direction of liquid crystal molecule LCBPON of first liquid crystal layer LC1 is substantially matched with the short axis direction of liquid crystal molecule LCBNON of second liquid crystal layer LC2.

Accordingly, similarly to the third exemplary embodiment, rotated liquid crystal molecule LCBP (liquid crystal molecule LCBPON) of first liquid crystal layer LC1 and rotated liquid crystal molecule LCBN (liquid crystal molecule LCBNON) of second liquid crystal layer LC2 can cancel and compensate for the hue change (the coloring) of first liquid crystal cell OC1 or second liquid crystal cell OC2. Therefore, the coloring in a predetermined direction is canceled in the whole display screen of liquid crystal display device LCD, and the color viewing angle characteristic can be improved.

Liquid crystal display device LCD according to the second modification is also configured such that the rotation of liquid crystal molecule LCBP of first liquid crystal layer LC1 and the rotation of liquid crystal molecule LCBN of second liquid crystal layer LC2 cancel and compensate for the hue change of first liquid crystal cell OC1 or second liquid crystal cell OC2.

Also in liquid crystal display device LCD according to the second modification, liquid crystal molecule LCBP of one first dot DOT1 of first liquid crystal cell OC1 and liquid crystal molecule LCBN of one second dot DOT2 of second liquid crystal cell OC2 are driven by the single-domain system, and rotate in one direction in the main transmission regions of first dot DOT1 and second dot DOT2. Therefore, the transmittance can be improved compared with the one-pixel multi-domain system. The color viewing angle characteristic for a specific image pattern display is not degraded unlike the each-row multi-domain system.

Accordingly, also in liquid crystal display device LCD according to the second modification, the color viewing angle characteristic can be improved irrespective of the image display pattern without degrading the transmittance.

Also in the second modification, polarization axis POLA1 of first polarizing plate POL1 is substantially matched with the column direction (the 90°-270° line), and polarization axis POLA2 of second polarizing plate POL2 is substantially matched with the row direction (the 0°-180° line). Polarization axis POLA3 of third polarizing plate POL3 is substantially matched with the row direction (the 0°-180° line), and polarization axis POLA4 of fourth polarizing plate POL4 is substantially matched with the column direction (the 90°-270° line). Accordingly, similarly to the first modification of the third exemplary embodiment, the large-size polarizing plate sheet can be cut into the rectangular shape without obliquely cutting the large-size polarizing plate sheet, so that the acquisition rate of the polarizing plate can be increased.

Third Modification of Third Exemplary Embodiment

Liquid crystal display device LCD according to a third modification of the third exemplary embodiment will be described in detail below with reference to FIGS. 30 to 31.

Figure 30:
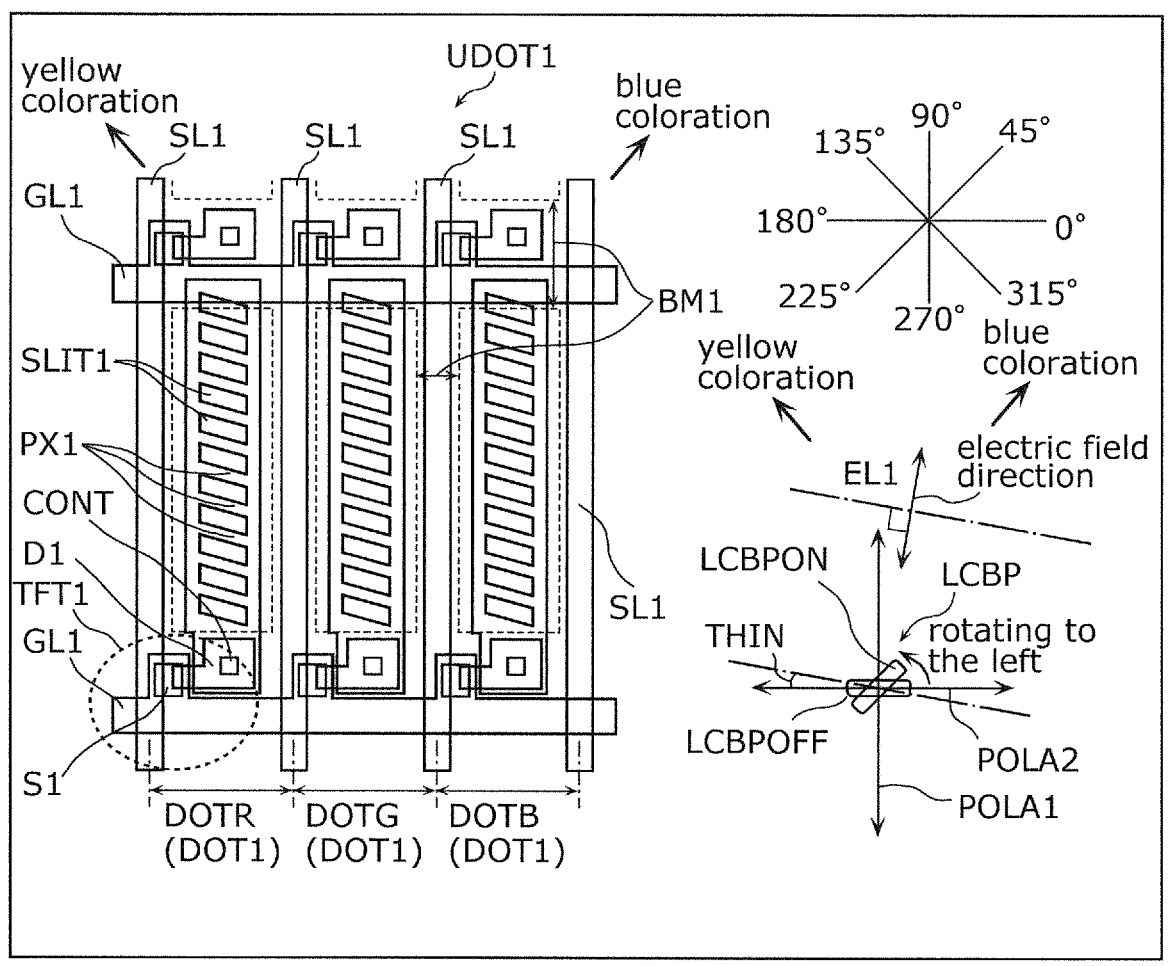
FIG. 30 is a view illustrating a pixel layout of the first liquid crystal display panel according to a third modification of the third exemplary embodiment, and illustrating rotation of a liquid crystal molecule in the first liquid crystal layer of the first liquid crystal cell.

FIG. 30 is a view illustrating a layout of pixel UDOT1 in first liquid crystal display panel LCD1 according to the third modification of the third exemplary embodiment, and illustrating rotation of liquid crystal molecule LCBP in first liquid crystal layer LC1 of first liquid crystal cell OC1 according to the third modification of the third exemplary embodiment. FIG. 31 is a view illustrating a layout of pixel LDOT2 in second liquid crystal display panel LCD2 according to the third modification of the third exemplary embodiment, and illustrating rotation of liquid crystal molecule LCBP in second liquid crystal layer LC2 of second liquid crystal cell OC2 according to the third modification of the third exemplary embodiment.

As illustrated in FIG. 30, first liquid crystal display panel LCD1 according to the third modification is identical to first liquid crystal display panel LCD1 according to the third exemplary embodiment.

Figure 31:
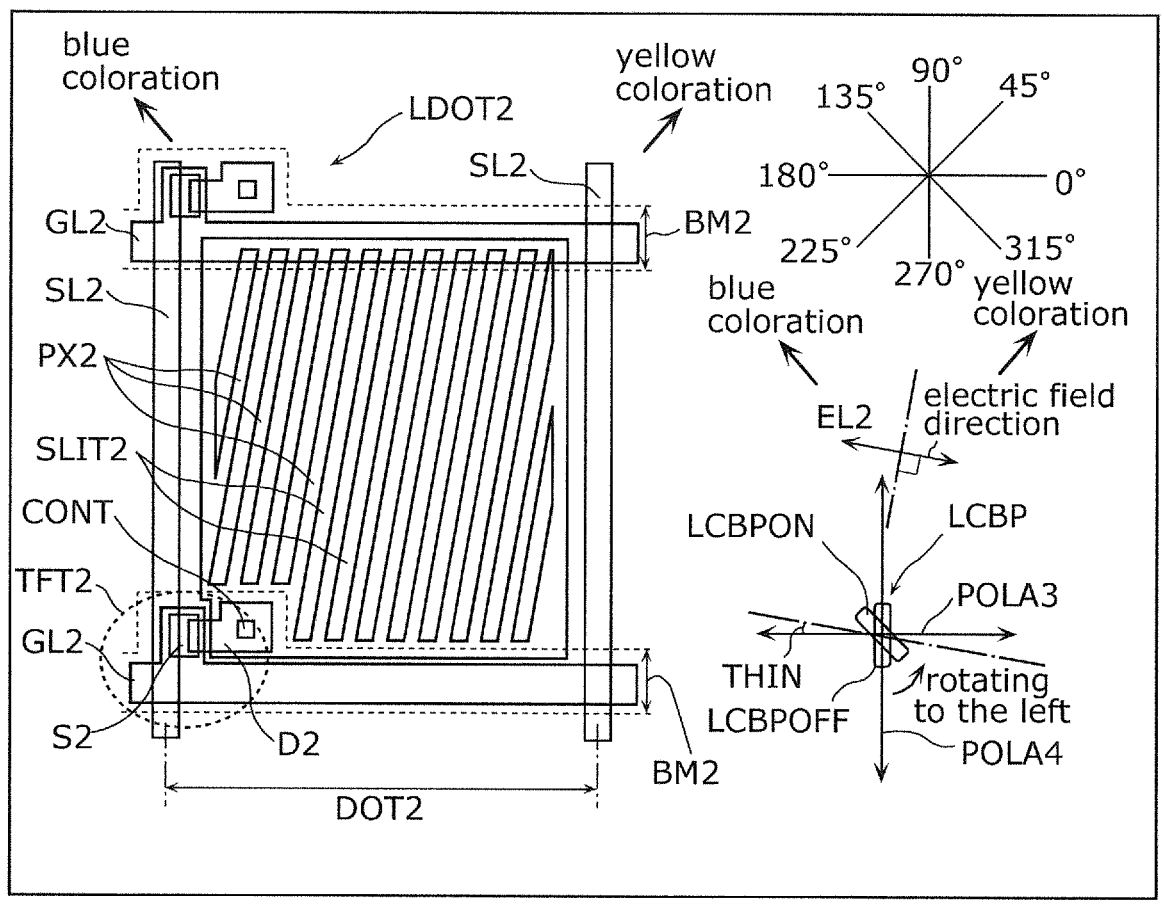
FIG. 31 is a view illustrating a pixel layout of the second liquid crystal display panel according to the third modification of the third exemplary embodiment, and illustrating rotation of a liquid crystal molecule in the second liquid crystal layer of the second liquid crystal cell.

On the other hand, as illustrated in FIG. 31, second liquid crystal display panel LCD2 according to the third modification is different from second liquid crystal display panel LCD2 according to the third exemplary embodiment.

Specifically, as illustrated in FIG. 31, in second liquid crystal display panel LCD2 according to the third modification, second pixel electrode PX2 extends so as to be inclined upward to the right and such that transverse electric field EL2 is generated in the direction substantially orthogonal to the direction of transverse electric field EL1 generated in first liquid crystal cell OC1.

Also in the third modification, first source wiring SL1 extending in the column direction is substantially parallel to polarization axis POLA4 of fourth polarizing plate POL4, and second gate wiring GL2 extending in the row direction is substantially parallel to polarization axis POLA3 of third polarizing plate POL3.

As illustrated in FIG. 31, in second liquid crystal display panel LCD2 according to the third modification, liquid crystal molecule LCBP of second liquid crystal layer LC2 is of the positive type. Also in the third modification, the alignment axes of third substrate SUB3 and fourth substrate SUB4 are substantially parallel to liquid crystal molecule LCBP of second liquid crystal layer LC2.

In the third modification, the initial alignment axis (the long axis direction) of liquid crystal molecule LCBPOFF in the initial alignment state in second liquid crystal layer LC2 is set so as to be substantially parallel to second source wiring SL2, namely, so as to be substantially parallel to the column direction (the 90°-270° line). Initial alignment angle THIN of liquid crystal molecule LCBPOFF is set so as to rotate to the left (counterclockwise) within the range of 0°<THIN<20° based on the initial alignment axis of liquid crystal molecule LCBPOFF. That is, the rotational direction of liquid crystal molecule LCBP of second liquid crystal layer LC2 is identical to the rotational direction of liquid crystal molecule LCBP of first liquid crystal layer LC1. The long axis direction of liquid crystal molecule LCBPOFF of second liquid crystal layer LC2 is substantially matched with the direction of polarization axis (absorption axis) POLA4 of fourth polarizing plate POL4.

Also in the third modification, when the voltage is applied to second pixel electrode PX2 and second common electrode CT2, the electric field (transverse electric field EL2) substantially parallel to third substrate SUB3 and fourth substrate SUB4 is generated between second pixel electrode PX2 and second common electrode CT2. In the third modification, transverse electric field EL2 is generated in the direction substantially orthogonal to transverse electric field EL1 generated in first liquid crystal cell OC1.

When transverse electric field EL2 is generated, liquid crystal molecule LCBP of second liquid crystal layer LC2 rotates according to initial alignment angle THIN. Specifically, when transverse electric field EL2 is generated, liquid crystal molecule LCBP rotates to the left from the state of liquid crystal molecule LCBPOFF to a position of a predetermined angle (for example, 45°), and becomes the state of liquid crystal molecule LCBPON (white display).

In liquid crystal display device LCD according to the third modification, the alignment axes of first substrate SUB1 and second substrate SUB2 in first liquid crystal display panel LCD1 are substantially orthogonal to the alignment axes of third substrate SUB3 and fourth substrate SUB4 in second liquid crystal display panel LCD2. Therefore, when transverse electric fields EL1 and EL2 are not generated in first liquid crystal cell OC1 and second liquid crystal cell OC2, the long axis direction (the alignment axis direction) of liquid crystal molecule LCBP of first liquid crystal layer LC1 is substantially orthogonal to the long axis direction (the alignment axis direction) of liquid crystal molecule LCBP of second liquid crystal layer LC2.

When the voltage is applied to first pixel electrode PX1 and first common electrode CT1 in first dot DOT1 of first liquid crystal cell OC1 while the voltage is applied to second pixel electrode PX2 and second common electrode CT2 in second dot DOT2 of second liquid crystal cell OC2, transverse electric field EL1 is generated only in one direction in first dot DOT1 while transverse electric field EL2 is generated only in one direction in second dot DOT2. At this point, in the third modification, the direction of transverse electric field EL1 generated in first dot DOT1 is substantially orthogonal to the direction of transverse electric field EL2 generated in second dot DOT2.

When transverse electric fields EL1 and EL2 are generated, liquid crystal molecule LCBP of first dot DOT1 of first liquid crystal layer LC1 rotates while liquid crystal molecule LCBP of second dot DOT2 of second liquid crystal layer LC2 rotates. In the third modification, the rotational direction of liquid crystal molecule LCBP of first liquid crystal layer LC1 and the rotational direction of liquid crystal molecule LCBP of second liquid crystal cell OC2 are identical to each other, and both liquid crystal molecule LCBP of first liquid crystal layer LC1 and liquid crystal molecule LCBP of second liquid crystal cell OC2 rotate to the left.

Therefore, the long axis direction of liquid crystal molecule LCBPON rotating to the left by transverse electric field EL1 generated in first liquid crystal cell OC1 is substantially orthogonal to the long axis direction of liquid crystal molecule LCBPON rotating to the left by transverse electric field EL2 generated in second liquid crystal cell OC2. When transverse electric field EL1 is generated in first liquid crystal cell OC1 while transverse electric field EL2 is generated in second liquid crystal cell OC2, the long axis direction of liquid crystal molecule LCBPON of first liquid crystal layer LC1 is substantially matched with the short axis direction of liquid crystal molecule LCBPON of second liquid crystal layer LC2.

Accordingly, similarly to the third exemplary embodiment, rotated liquid crystal molecule LCBP (liquid crystal molecule LCBPON) of first liquid crystal layer LC1 and rotated liquid crystal molecule LCBP (liquid crystal molecule LCBPON) of second liquid crystal layer LC2 can cancel and compensate for the hue change (the coloring) of first liquid crystal cell OC1 or second liquid crystal cell OC2. Therefore, the coloring in a predetermined direction is canceled in the whole display screen of liquid crystal display device LCD, and the color viewing angle characteristic can be improved.

Liquid crystal display device LCD according to the third modification is also configured such that the rotation of liquid crystal molecule LCBP of first liquid crystal layer LC1 and the rotation of liquid crystal molecule LCBP of second liquid crystal layer LC2 cancel and compensate for the hue change of first liquid crystal cell OC1 or second liquid crystal cell OC2.

Also in liquid crystal display device LCD according to the third modification, liquid crystal molecule LCBP of one first dot DOT1 of first liquid crystal cell OC1 and liquid crystal molecule LCBP of one second dot DOT2 of second liquid crystal cell OC2 are driven by the single-domain system, and rotate in one direction in the main transmission regions of first dot DOT1 and second dot DOT2. Therefore, the transmittance can be improved compared with the one-pixel multi-domain system. The color viewing angle characteristic for a specific image pattern display is not degraded unlike the each-row multi-domain system.

Accordingly, also in liquid crystal display device LCD according to the third modification, the color viewing angle characteristic can be improved irrespective of the image display pattern without degrading the transmittance.

Also in the third modification, polarization axis POLA1 of first polarizing plate POL1 is substantially matched with the column direction (the 90°-270° line), and polarization axis POLA2 of second polarizing plate POL2 is substantially matched with the row direction (the 0°-180° line). Polarization axis POLA3 of third polarizing plate POL3 is substantially matched with the row direction (the 0°-180° line), and polarization axis POLA4 of fourth polarizing plate POL4 is substantially matched with the column direction (the 90°-270° line). Accordingly, similarly to the first modification of the third exemplary embodiment, the large-size polarizing plate sheet can be cut into the rectangular shape without obliquely cutting the large-size polarizing plate sheet, so that the acquisition rate of the polarizing plate can be increased.

Fourth Exemplary Embodiment

Liquid crystal display device LCD according to a fourth exemplary embodiment will be described below.

Figure 32A:
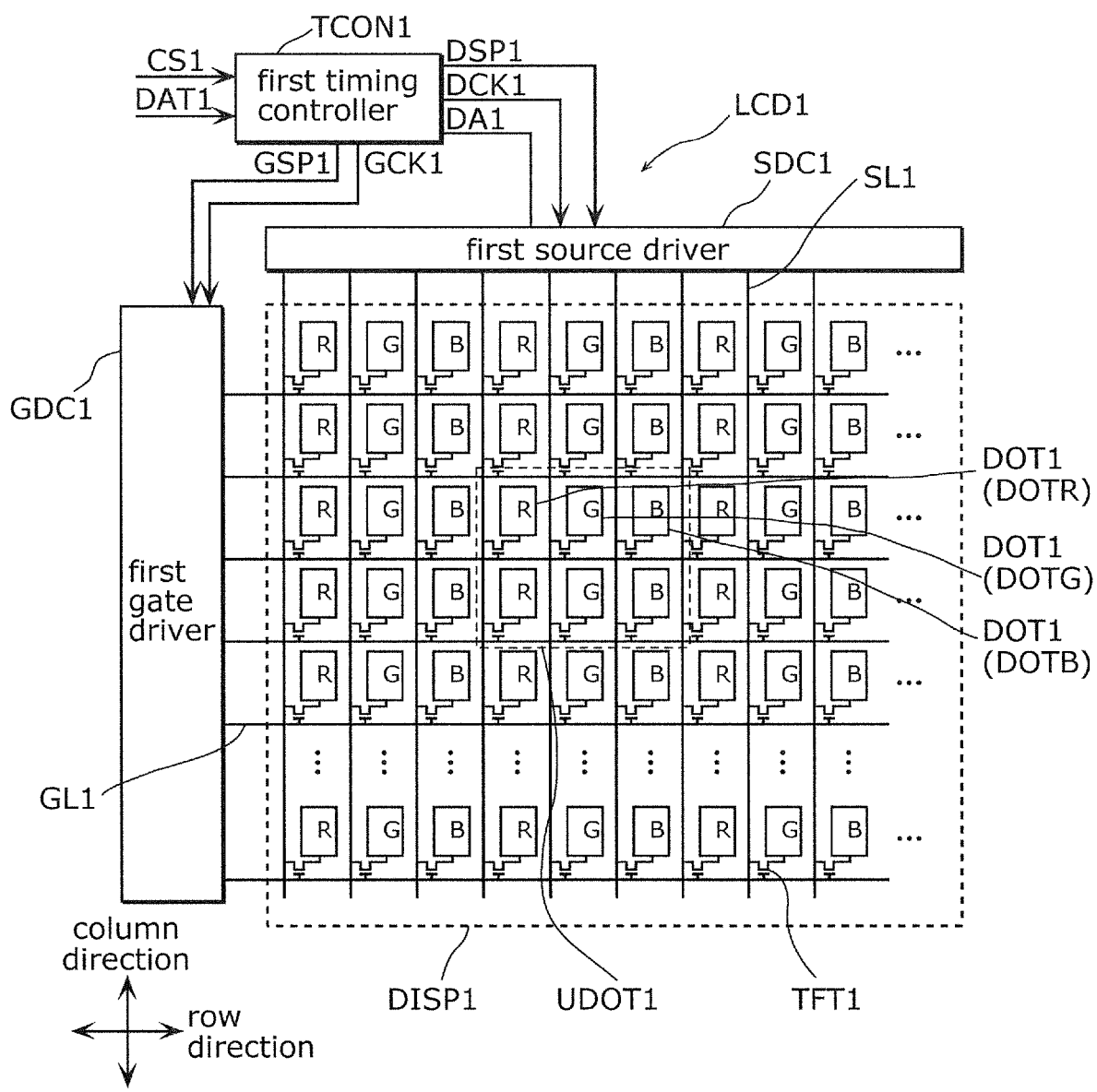
FIG. 32A is a view illustrating a schematic configuration of the first liquid crystal display panel in the liquid crystal display device according to a fourth exemplary embodiment.
Figure 32B:
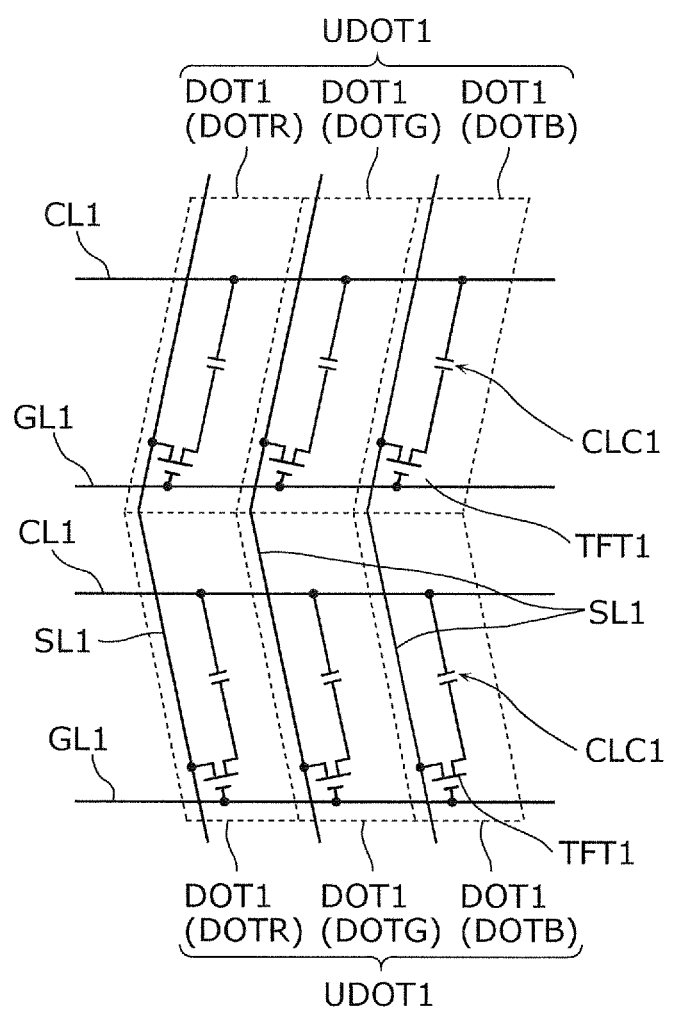
FIG. 32B is a view illustrating a circuit configuration of one pixel of the first liquid crystal display panel in FIG. 32A.
Figure 33A:
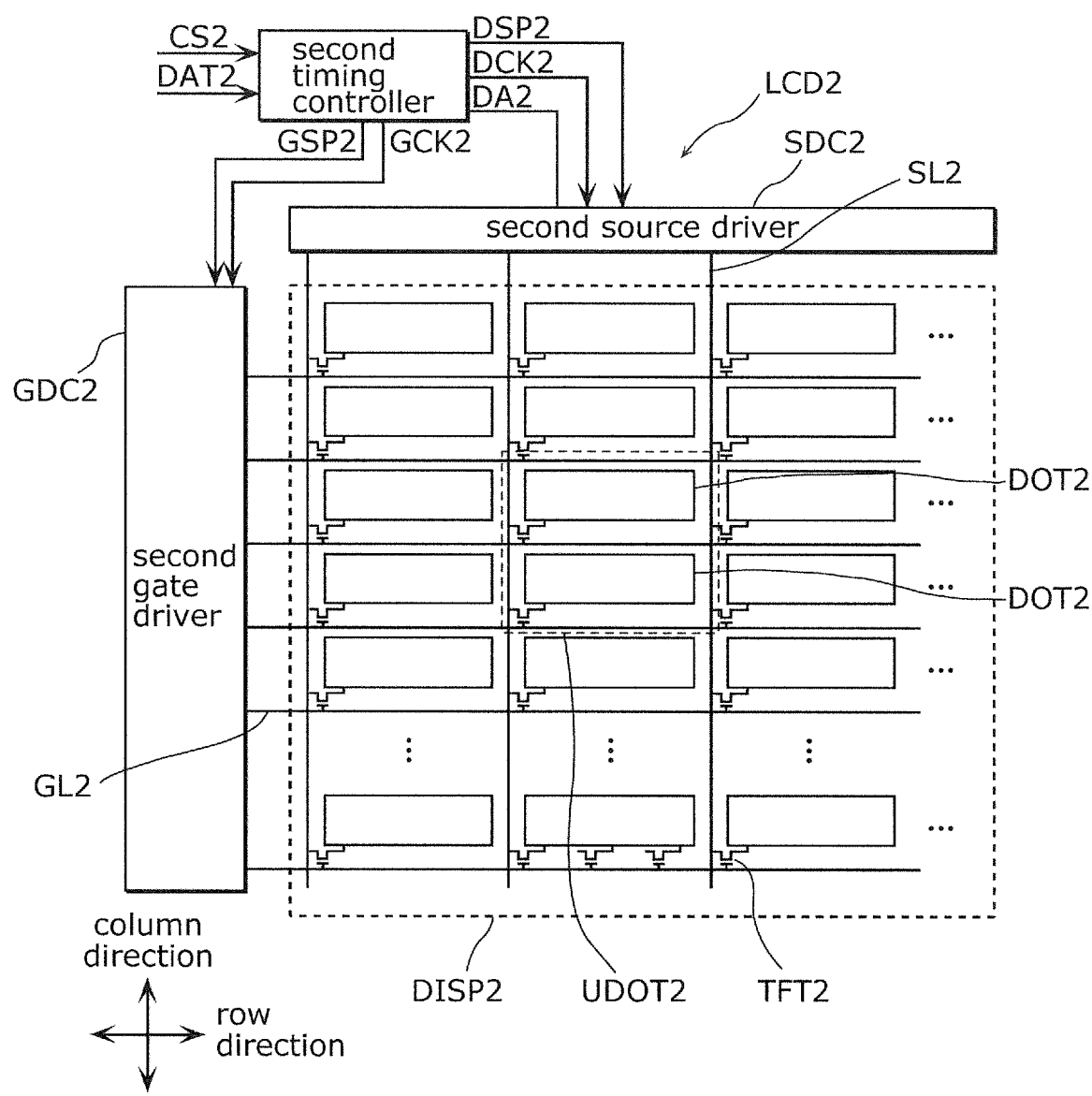
FIG. 33A is a view illustrating a schematic configuration of the second liquid crystal display panel in the liquid crystal display device according to the fourth exemplary embodiment.

FIG. 32A is a view illustrating a schematic configuration of first liquid crystal display panel LCD1 in liquid crystal display device LCD according to the fourth exemplary embodiment, and FIG. 32B is a view illustrating a circuit configuration of one pixel UDOT1 of first liquid crystal display panel LCD1 in FIG. 32A. FIG. 33A is a view illustrating a schematic configuration of second liquid crystal display panel LCD2 in liquid crystal display device LCD according to the fourth exemplary embodiment, and FIG. 33B is a view illustrating a circuit configuration of one pixel LDOT2 of second liquid crystal display panel LCD2 in FIG. 33A.

Liquid crystal display device LCD according to the fourth exemplary embodiment has a configuration in which liquid crystal display device LCD according to first exemplary embodiment is compatible with the each-row multi-domain system. That is, first liquid crystal display panel LCD1 and second liquid crystal display panel LCD2 are driven by the each-row multi-domain system.

As illustrated in FIGS. 32A and 32B, in first liquid crystal display panel LCD1, a wiring contour of each first dot DOT1 in first image display region DISP1 is formed into not a rectangular shape but a parallelogram shape. The plurality of first dots DOT1 arrayed into a matrix shape is arrayed toward the identical orientation in the row direction. On the other hand, the plurality of first dots DOT1 is alternately inverted in the column direction. That is, the plurality of first dots DOT1 in the column direction is formed into a chevron stripe pattern.

Figure 33B:
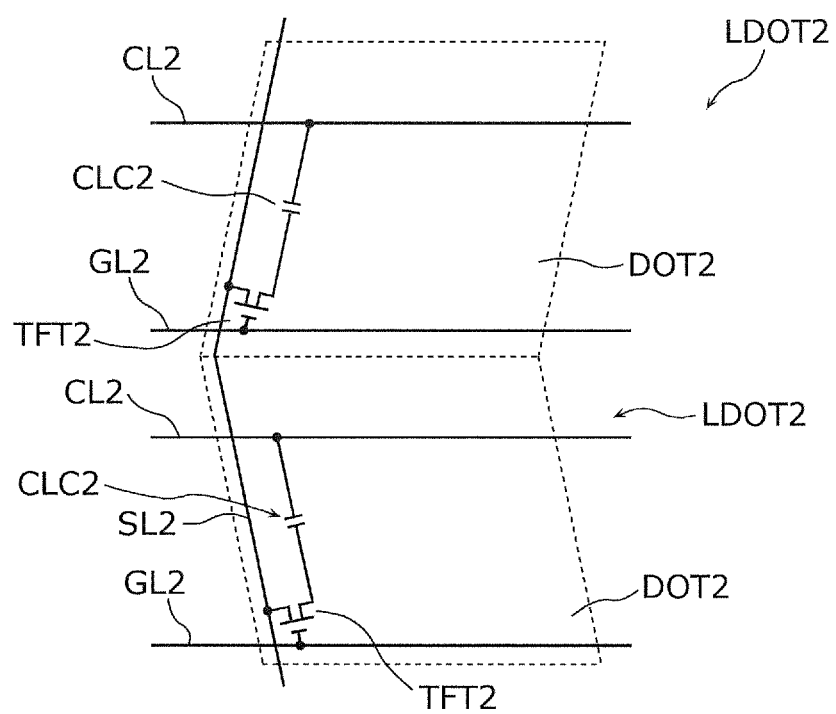
FIG. 33B is a view illustrating a circuit configuration of one pixel of the second liquid crystal display panel in FIG. 33A.

As illustrated in FIGS. 33A and 33B, in second liquid crystal display panel LCD2, the wiring contour of each second dot DOT2 in second image display region DISP2 is also formed into not the rectangular shape, but the parallelogram shape. The plurality of second dots DOT2 arrayed into the matrix shape is arrayed toward the identical orientation in the row direction so as to correspond to first dot DOT1. On the other hand, the plurality of second dots DOT2 is alternately inverted in the column direction. That is, the plurality of second dots DOT2 in the column direction is formed into the chevron stripe pattern.

A layout of the dot (pixel) of liquid crystal display device LCD according to the fourth exemplary embodiment and movement of the liquid crystal molecule will be described below with reference to FIGS. 34 to 35.

Figure 34:
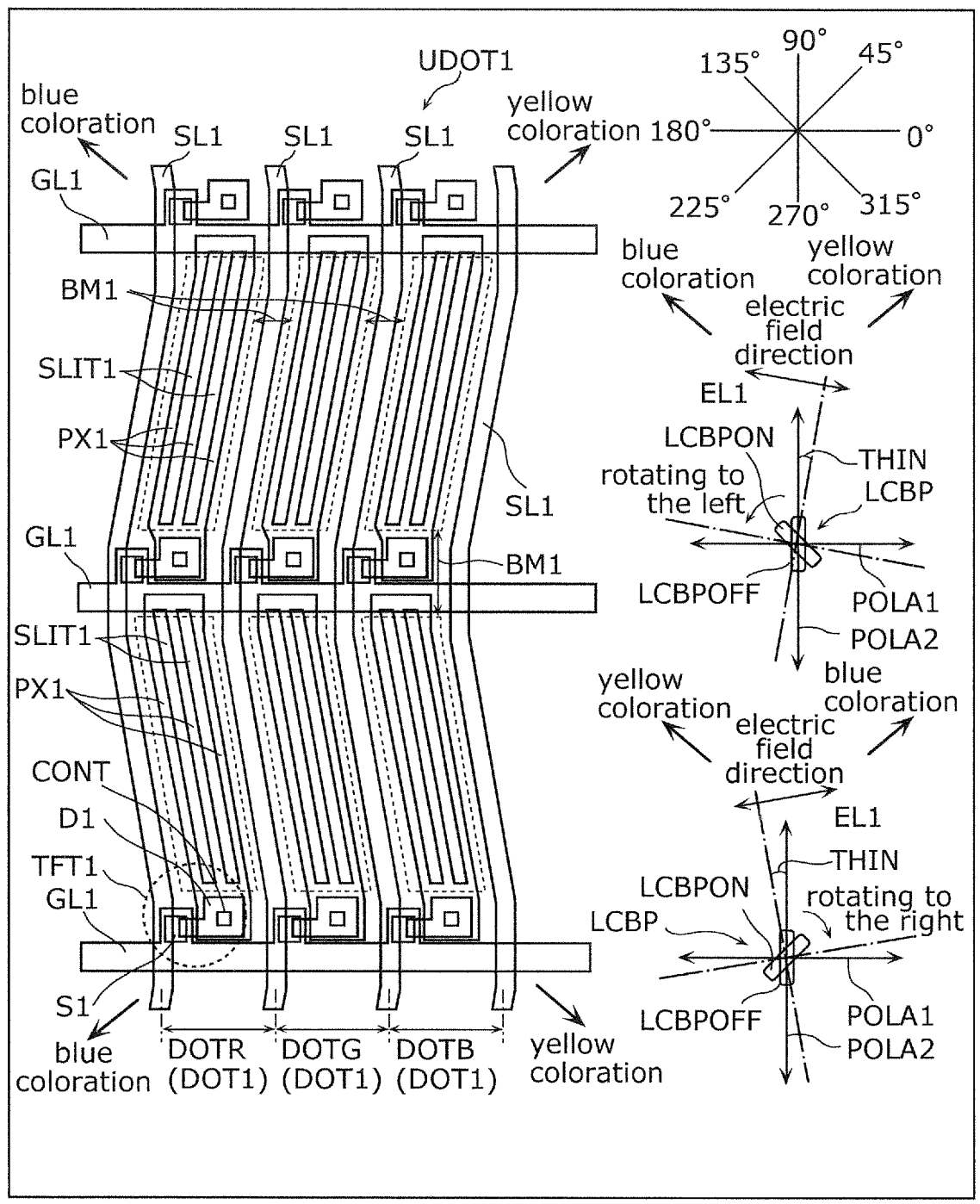
FIG. 34 is a view illustrating a pixel layout of the first liquid crystal display panel of the fourth exemplary embodiment, and illustrating rotation of a liquid crystal molecule in a first liquid crystal layer of a first liquid crystal cell.

FIG. 34 is a view illustrating a layout of pixel UDOT1 in first liquid crystal display panel LCD1 according to the fourth exemplary embodiment, and illustrating rotation of liquid crystal molecule LCBP in first liquid crystal layer LC1 of first liquid crystal cell OC1 according to the fourth exemplary embodiment. FIG. 35 is a view illustrating a layout of pixel LDOT2 in second liquid crystal display panel LCD2 according to the fourth exemplary embodiment, and illustrating rotation of liquid crystal molecule LCBN in second liquid crystal layer LC2 of second liquid crystal cell OC2 according to the fourth exemplary embodiment.

As illustrated in FIG. 34, in first liquid crystal display panel LCD1 according to the fourth exemplary embodiment, first gate wiring GL1 extends in the row direction similarly to the first exemplary embodiment. However, unlike the first exemplary embodiment, first source wiring SL1 and first pixel electrode PX1 extend so as to be inclined to the 90°-270° line. Specifically, first source wiring SL1 and first pixel electrode PX1 are formed in parallel to each other, and are bent such that an inclination angle is alternately inverted in each row. That is, first source wiring SL1 is formed into the chevron stripe pattern.

As illustrated in FIG. 34, in first liquid crystal display panel LCD1, liquid crystal molecule LCBP of first liquid crystal layer LC1 is of the positive type. Also in the fourth exemplary embodiment, the alignment axes of first substrate SUB1 and second substrate SUB2 are substantially parallel to liquid crystal molecule LCBP of first liquid crystal layer LC1.

Also in the fourth exemplary embodiment, when the voltage is applied to first pixel electrode PX1 and first common electrode CT1, the electric field (transverse electric field EL1) substantially parallel to first substrate SUB1 and second substrate SUB2 is generated between first pixel electrode PX1 and first common electrode CT1. In the fourth exemplary embodiment, because first pixel electrode PX1 is formed such that the inclination angle is alternately inverted in each row, two direction types of transverse electric field EL1 is alternately generated in each row as illustrated in FIG. 34. When transverse electric field EL1 is generated, liquid crystal molecule LCBP alternately rotates to the left and the right in each row.

Figure 35:
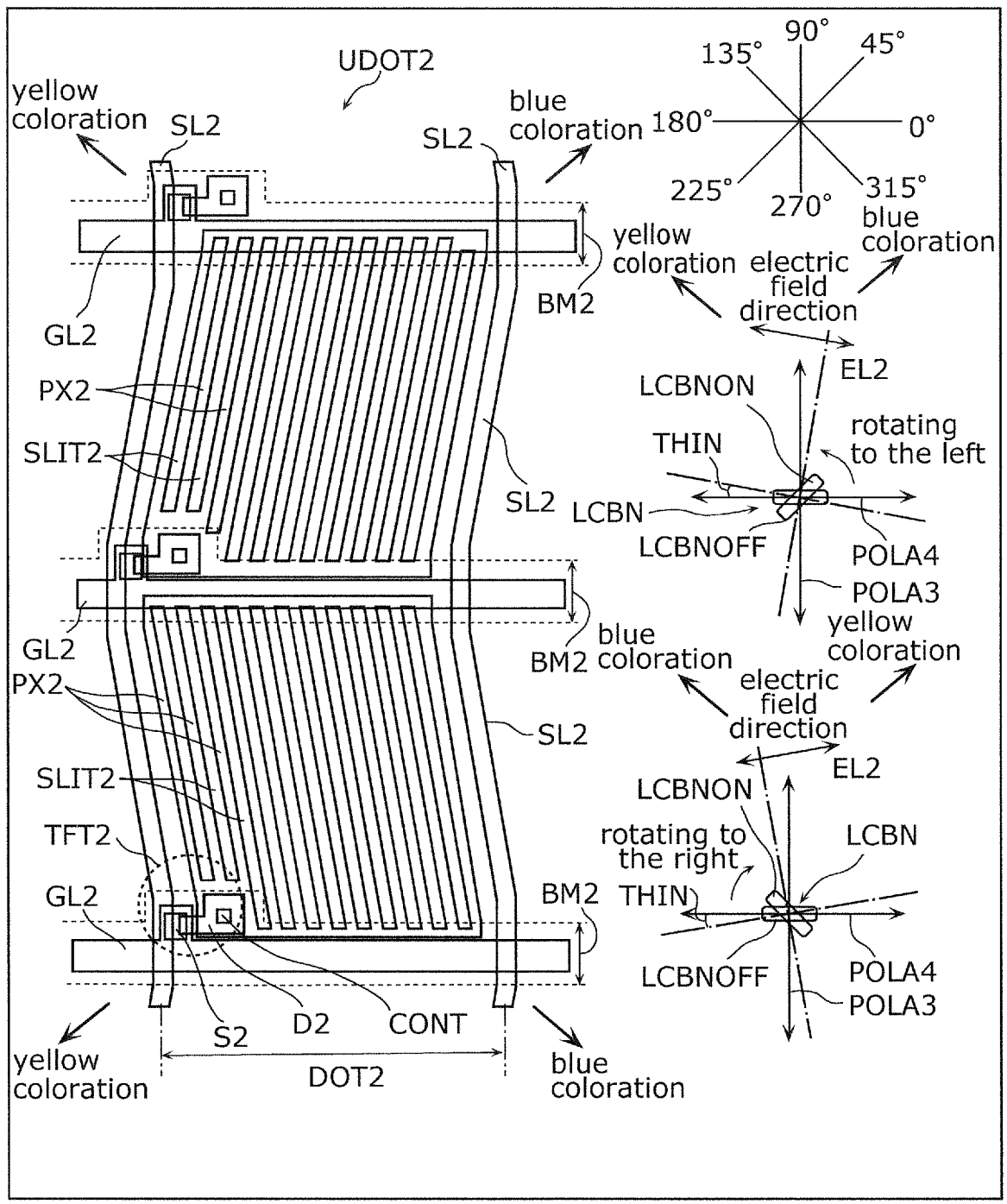
FIG. 35 is a view illustrating a pixel layout of the second liquid crystal display panel according to the fourth exemplary embodiment, and illustrating rotation of a liquid crystal molecule in the second liquid crystal layer of the second liquid crystal cell.

As illustrated in FIG. 35, in second liquid crystal display panel LCD2, second source wiring SL2 and second pixel electrode PX2 are also formed in parallel to each other, and are bent such that the inclination angle is alternately inverted in each row. Second source wiring SL2 and second pixel electrode PX2 are formed so as to be bent in the direction identical to that of first source wiring SL1 and first pixel electrode PX1 in first liquid crystal cell OC1. That is, second source wiring SL2 is formed into the chevron stripe pattern.

As illustrated in FIG. 35, in second liquid crystal display panel LCD2, liquid crystal molecule LCBN of second liquid crystal layer LC2 is of the negative type. Also in the fourth exemplary embodiment, the alignment axes of third substrate SUB3 and fourth substrate SUB4 are substantially parallel to liquid crystal molecule LCBN of second liquid crystal layer LC2.

Also in the fourth exemplary embodiment, when the voltage is applied to second pixel electrode PX2 and second common electrode CT2, the electric field (transverse electric field EL2) substantially parallel to third substrate SUB3 and fourth substrate SUB4 is generated between second pixel electrode PX2 and second common electrode CT2. In the fourth exemplary embodiment, because second pixel electrode PX2 is formed such that the inclination angle is alternately inverted in each row, two direction types of transverse electric field EL2 is alternately generated in each row as illustrated in FIG. 35. When transverse electric field EL2 is generated, liquid crystal molecule LCBN alternately rotates to the left and the right in each row.

Thus, in liquid crystal display device LCD according to the fourth exemplary embodiment, when transverse electric fields EL1 and EL2 are not generated in first liquid crystal cell OC1 and second liquid crystal cell OC2, the long axis direction (the alignment axis direction) of liquid crystal molecule LCBP of first liquid crystal layer LC1 is substantially orthogonal to the long axis direction (the alignment axis direction) of liquid crystal molecule LCBN of second liquid crystal layer LC2 in each row.

When the voltage is applied to first pixel electrode PX1 and first common electrode CT1 in first dot DOT1 of first liquid crystal cell OC1 while the voltage is applied to second pixel electrode PX2 and second common electrode CT2 in second dot DOT2 of second liquid crystal cell OC2, transverse electric field EL1 is generated only in one direction in first dot DOT1 while transverse electric field EL2 is generated only in one direction in second dot DOT2. At this point, also in the fourth exemplary embodiment, the direction of transverse electric field EL1 generated in first dot DOT1 is substantially identical to the direction of transverse electric field EL2 generated in second dot DOT2 overlapping first dot DOT1.

When transverse electric fields EL1 and EL2 are generated, liquid crystal molecule LCBP of first dot DOT1 of first liquid crystal layer LC1 alternately rotates to the left and the right in each row while liquid crystal molecule LCBN of second dot DOT2 of second liquid crystal layer LC2 alternately rotates to the left and the right in each row.

Therefore, for laminated first liquid crystal cell OC1 and second liquid crystal cell OC2, the long axis direction of liquid crystal molecule LCBPON rotating to the left or the right by transverse electric field EL1 generated in first liquid crystal cell OC1 is substantially orthogonal to the long axis direction of liquid crystal molecule LCBNON rotating to the left or the right by transverse electric field EL2 generated in second liquid crystal cell OC2 in each corresponding first dot DOT1 and second dot DOT2. When transverse electric field EL1 is generated in first liquid crystal cell OC1 while transverse electric field EL2 is generated in second liquid crystal cell OC2, the long axis direction of liquid crystal molecule LCBPON of first liquid crystal layer LC1 is substantially matched with the short axis direction of liquid crystal molecule LCBNON of second liquid crystal layer LC2 in each corresponding dot of first liquid crystal cell OC1 and second liquid crystal cell OC2.

Resultantly, similarly to the first exemplary embodiment, rotated liquid crystal molecule LCBP (liquid crystal molecule LCBPON) of first liquid crystal layer LC1 and rotated liquid crystal molecule LCBN (liquid crystal molecule LCBNON) of second liquid crystal layer LC2 can cancel and compensate for the hue change (the coloring) of first liquid crystal cell OC1 or second liquid crystal cell OC2. Therefore, the coloring in a predetermined direction is canceled in the whole display screen of liquid crystal display device LCD, and the color viewing angle characteristic can be improved.

Liquid crystal display device LCD according to the fourth exemplary embodiment is also configured such that the rotation of liquid crystal molecule LCBP of first liquid crystal layer LC1 and the rotation of liquid crystal molecule LCBN of second liquid crystal layer LC2 cancel and compensate for the hue change of first liquid crystal cell OC1 or second liquid crystal cell OC2.

Also in liquid crystal display device LCD according to the fourth exemplary embodiment, liquid crystal molecule LCBP of one first dot DOT1 of first liquid crystal cell OC1 and liquid crystal molecule LCBN of one second dot DOT2 of second liquid crystal cell OC2 are driven by the single-domain system, and rotate in one direction in the main transmission regions of first dot DOT1 and second dot DOT2. Therefore, the transmittance can be improved compared with the one-pixel multi-domain system. The color viewing angle characteristic for a specific image pattern display is not degraded unlike the each-row multi-domain system.

Accordingly, in liquid crystal display device LCD according to the fourth exemplary embodiment, the color viewing angle characteristic can be improved irrespective of the image display pattern without degrading the transmittance.

Additionally, in the fourth exemplary embodiment, first liquid crystal cell OC1 and second liquid crystal cell OC2 are driven by the each-row multi-domain system. Therefore, not only the color viewing angle characteristic can be improved in first dot DOT1 of first liquid crystal cell OC1 and second dot DOT2 of second liquid crystal cell OC2, but also the color viewing angle characteristic can also be improved in two rows adjacent to each other in first liquid crystal cell OC1 and second liquid crystal cell OC2.

Accordingly, in liquid crystal display device LCD according to the fourth exemplary embodiment, the color viewing angle characteristic can further be improved compared with liquid crystal display device LCD according to the first to third exemplary embodiments.

First Modification of Fourth Exemplary Embodiment

Liquid crystal display device LCD according to a first modification of the fourth exemplary embodiment will be described below with reference to FIG. 36.

Liquid crystal display device LCD according to the first modification is different from liquid crystal display device LCD according to the fourth exemplary embodiment in the configuration of second liquid crystal display panel LCD2. That is, first liquid crystal display panel LCD1 according to the first modification is identical in configuration to the first liquid crystal display panel LCD1 according to the fourth exemplary embodiment.

Figure 36:
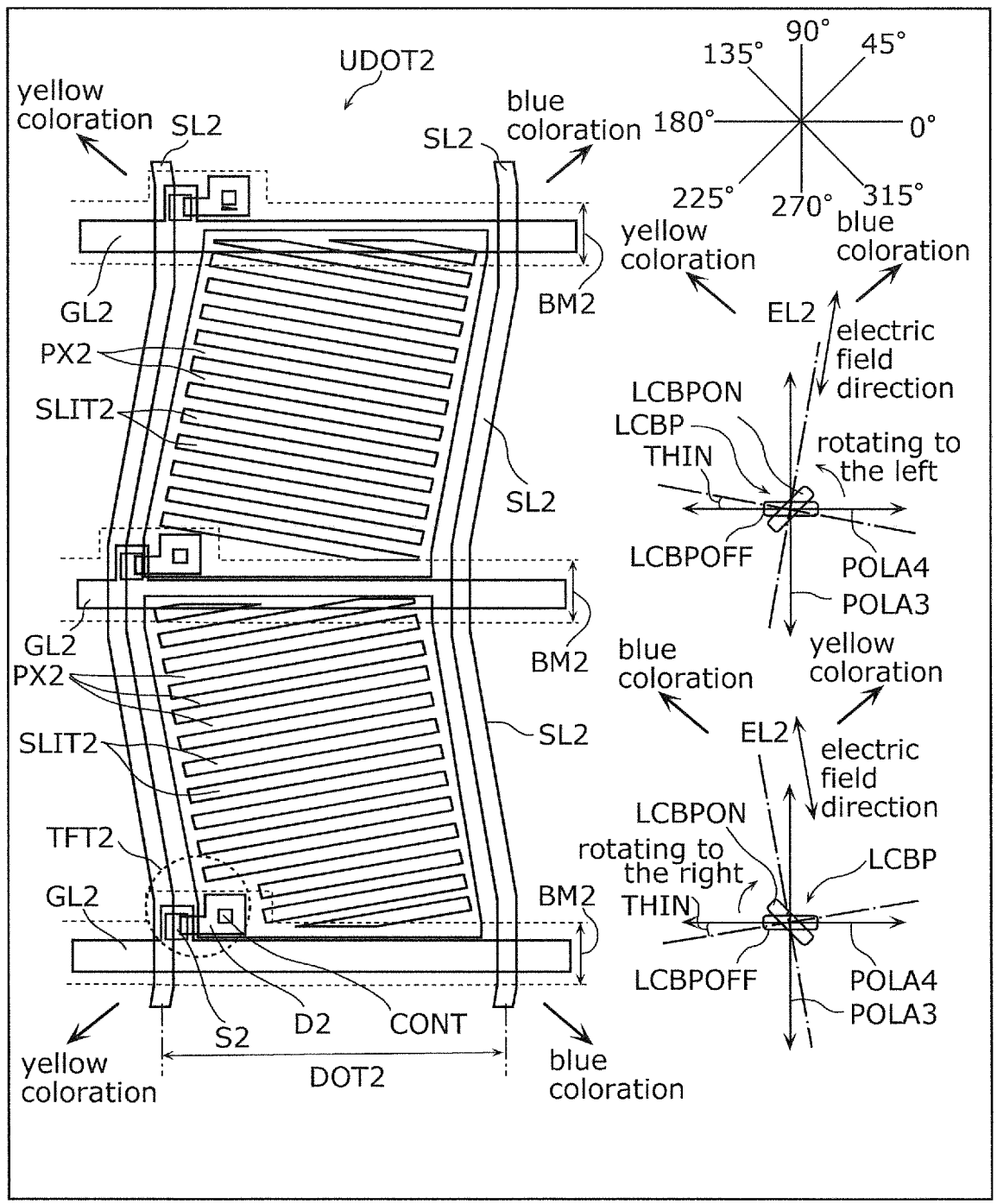
FIG. 36 is a view illustrating a pixel layout of the second liquid crystal display panel according to a first modification of the fourth exemplary embodiment, and illustrating rotation of a liquid crystal molecule in the second liquid crystal layer of the second liquid crystal cell.

FIG. 36 is a view illustrating a layout of pixel LDOT2 in second liquid crystal display panel LCD2 according to the first modification of the fourth exemplary embodiment, and illustrating rotation of liquid crystal molecule LCBP in second liquid crystal layer LC2 of second liquid crystal cell OC2 according to the first modification of the fourth exemplary embodiment.

As illustrated in FIG. 36, in second liquid crystal display panel LCD2 according to the first modification, although second pixel electrode PX2 is formed such that the inclination angle is alternately inverted in each row similarly to second pixel electrode PX2 according to the fourth exemplary embodiment, second pixel electrode PX2 according to the first modification is different from second pixel electrode PX2 according to the fourth exemplary embodiment in the inclination angle of each first dot DOT1. Specifically, second pixel electrode PX2 according to the first modification extends so as to be orthogonal to second source line SL2 in which the inclination angle is alternately inverted in each row.

As illustrated in FIG. 36, in second liquid crystal display panel LCD2, liquid crystal molecule LCBP of second liquid crystal layer LC2 is of the positive type. That is, in the first modification, both liquid crystal molecule LCBP of first liquid crystal layer LC1 (not illustrated) and liquid crystal molecule LCBP of second liquid crystal layer LC2 are of the positive type.

Also in the first modification, similarly to the fourth exemplary embodiment, when the voltage is applied to second pixel electrode PX2 and second common electrode CT2, transverse electric field EL2 is generated in the two directions different from each other in each row as illustrated in FIG. 36. When transverse electric field EL2 is generated, liquid crystal molecule LCBP alternately rotates to the left and the right in each row.

Thus, also in liquid crystal display device LCD according to the first modification, when transverse electric fields EL1 and EL2 are generated, liquid crystal molecule LCBP of first dot DOT1 of first liquid crystal layer LC1 alternately rotates to the left and the right in each row while liquid crystal molecule LCBP of second dot DOT2 of second liquid crystal layer LC2 alternately rotates to the left and the right in each row.

Therefore, for laminated first liquid crystal cell OC1 and second liquid crystal cell OC2, the long axis direction of liquid crystal molecule LCBPON rotating to the left or the right by transverse electric field EL1 generated in first liquid crystal cell OC1 is substantially orthogonal to the long axis direction of liquid crystal molecule LCBPON rotating to the left or the right by transverse electric field EL2 generated in second liquid crystal cell OC2 in each corresponding first dot DOT1 and second dot DOT2.

Accordingly, similarly to the fourth exemplary embodiment, rotated liquid crystal molecule LCBP (liquid crystal molecule LCBPON) of first liquid crystal layer LC1 and rotated liquid crystal molecule LCBP (liquid crystal molecule LCBPON) of second liquid crystal layer LC2 can cancel and compensate for the hue change (the coloring) of first liquid crystal cell OC1 or second liquid crystal cell OC2. Therefore, the coloring in a predetermined direction is canceled in the whole display screen of liquid crystal display device LCD, and the color viewing angle characteristic can be improved.

Liquid crystal display device LCD according to the first modification is also configured such that the rotation of liquid crystal molecule LCBP of first liquid crystal layer LC1 and the rotation of liquid crystal molecule LCBP of second liquid crystal layer LC2 cancel and compensate for the hue change of first liquid crystal cell OC1 or second liquid crystal cell OC2.

Also in liquid crystal display device LCD according to the first modification, liquid crystal molecule LCBP of one first dot DOT1 of first liquid crystal cell OC1 and liquid crystal molecule LCBP of one second dot DOT2 of second liquid crystal cell OC2 are driven by the single-domain system, and rotate in one direction in the main transmission regions of first dot DOT1 and second dot DOT2. Therefore, the transmittance can be improved compared with the one-pixel multi-domain system. The color viewing angle characteristic for a specific image pattern display is not degraded unlike the each-row multi-domain system.

Accordingly, also in liquid crystal display device LCD according the first modification, the color viewing angle characteristic can be improved irrespective of the image display pattern without degrading the transmittance.

Also in the first modification, first liquid crystal cell OC1 and second liquid crystal cell OC2 are driven by the each-row multi-domain system. Accordingly, in liquid crystal display device LCD according to the first modification, the color viewing angle characteristic can further be improved compared with liquid crystal display device LCD according to the first to third exemplary embodiments.

Second Modification of Fourth Exemplary Embodiment

Liquid crystal display device LCD according to a second modification of the fourth exemplary embodiment will be described below with reference to FIG. 37.

Liquid crystal display device LCD according to the second modification is different from liquid crystal display device LCD according to the fourth exemplary embodiment in the configuration of second liquid crystal display panel LCD2. That is, first liquid crystal display panel LCD1 according to the second modification is identical in configuration to the first liquid crystal display panel LCD1 according to the fourth exemplary embodiment.

Figure 37:
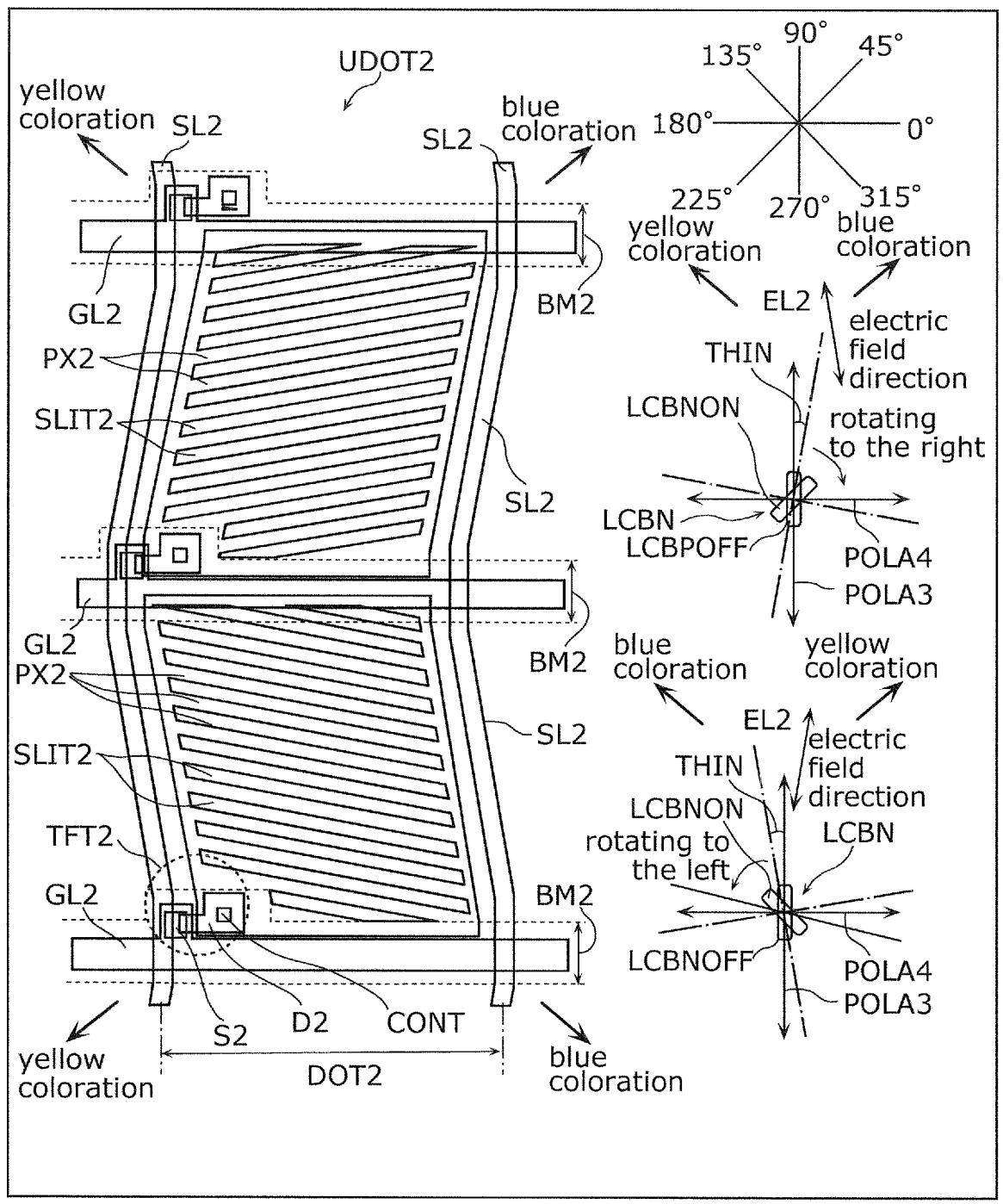
FIG. 37 is a view illustrating a pixel layout of the second liquid crystal display panel according to a second modification of the fourth exemplary embodiment, and illustrating rotation of a liquid crystal molecule in the second liquid crystal layer of the second liquid crystal cell.
Figure 38A:
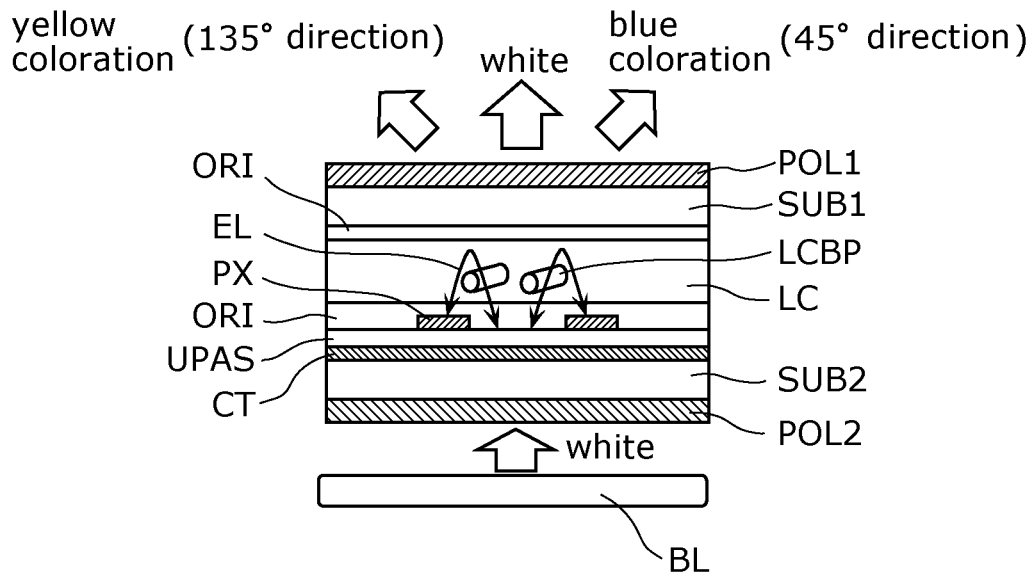
FIG. 38A is a sectional view illustrating an example of a pixel configuration of a conventional transverse electric field system liquid crystal display device.
Figure 38B:
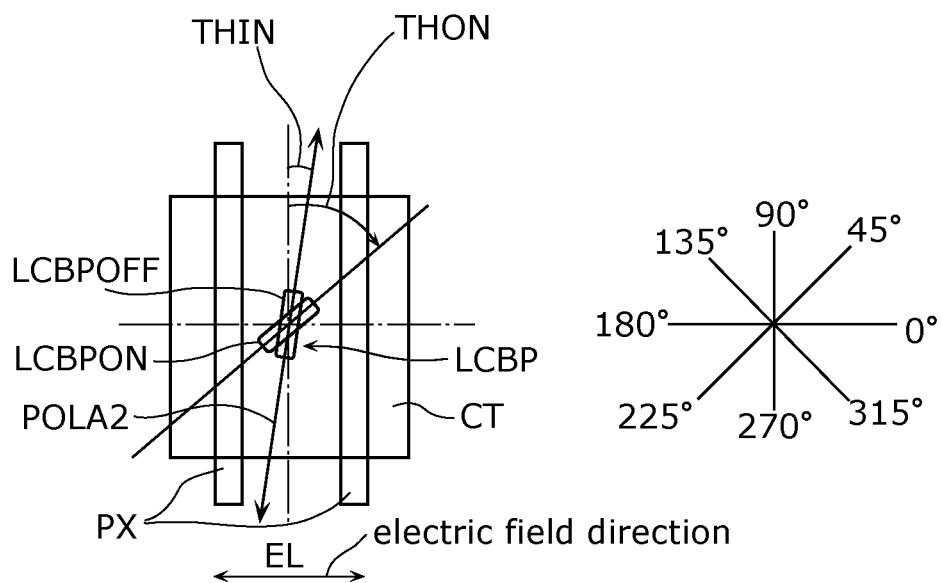
FIG. 38B is a plan view illustrating the example of the pixel configuration of the conventional transverse electric field system liquid crystal display device.
Figure 39:
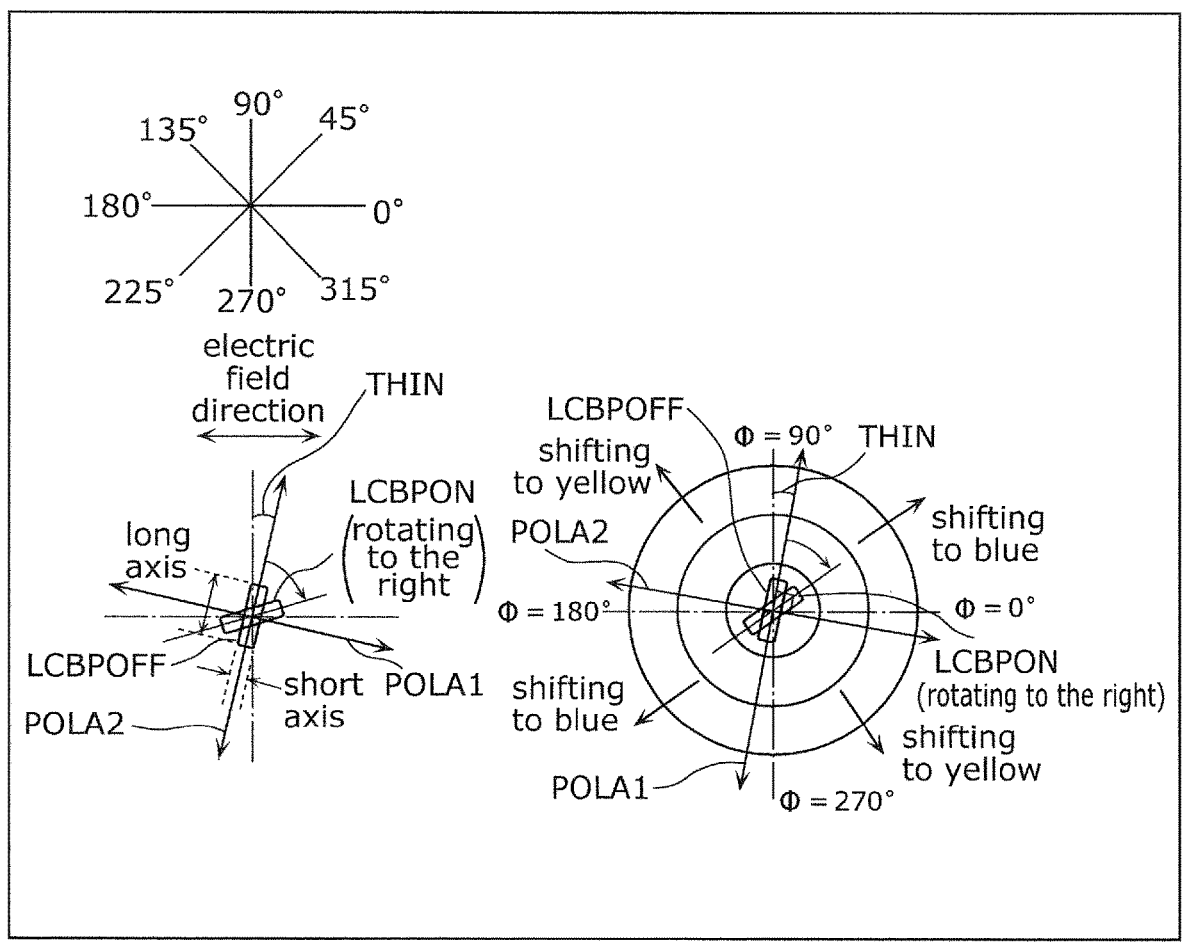
FIG. 39 is a view illustrating a hue change in a transverse electric field system liquid crystal display device.
Figure 40:
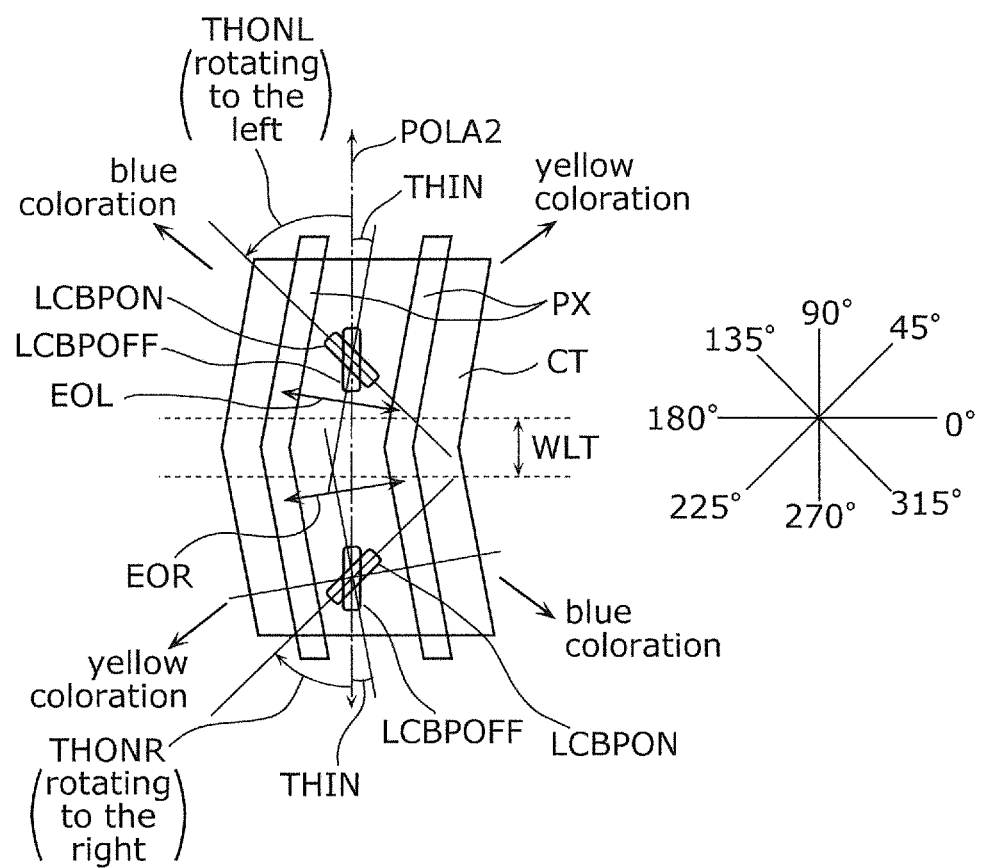
FIG. 40 is a view illustrating a configuration of a transverse electric field system liquid crystal display device in which a color viewing angle characteristic is improved by a multi-domain system.
Figure 41:
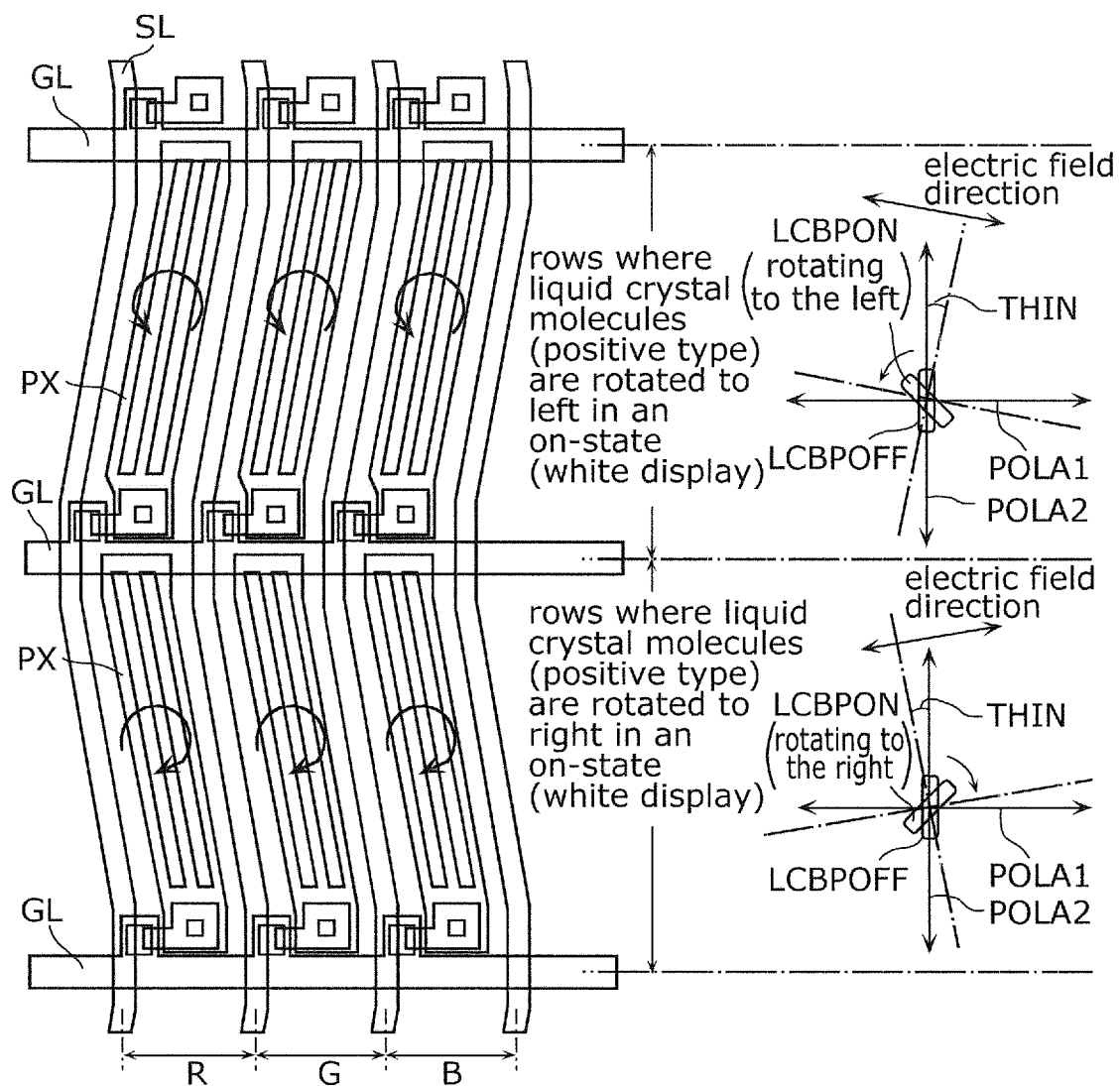
FIG. 41 is a view illustrating a configuration of a transverse electric field system liquid crystal display device in which the color viewing angle characteristic is improved by an each-row multi-domain system.
Figure 42:
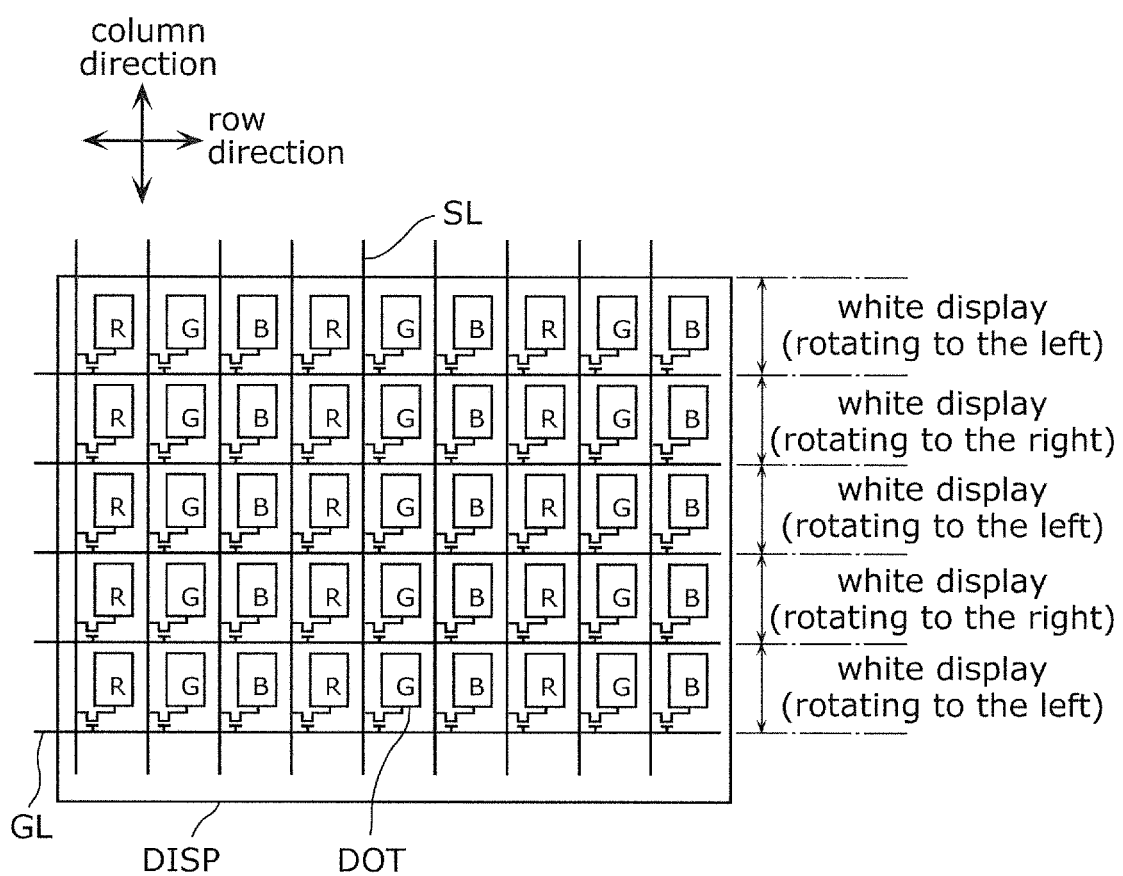
FIG. 42 is a view illustrating an example of image pattern display (solid white display) of the transverse electric field system liquid crystal display device by the each-row multi-domain system.

FIG. 37 is a view illustrating a layout of pixel LDOT2 in second liquid crystal display panel LCD2 according to the second modification of the fourth exemplary embodiment, and illustrating rotation of liquid crystal molecule LCBN in second liquid crystal layer LC2 of second liquid crystal cell OC2 according to the second modification of the fourth exemplary embodiment.

As illustrated in FIG. 37, in second liquid crystal display panel LCD2 according to the second modification, although second pixel electrode PX2 is formed such that the inclination angle is alternately inverted in each row similarly to second pixel electrode PX2 according to the fourth exemplary embodiment, second pixel electrode PX2 according to the second modification is different from second pixel electrode PX2 according to the fourth exemplary embodiment in the inclination angle of each second dot DOT2.

As illustrated in FIG. 37, in second liquid crystal display panel LCD2, liquid crystal molecule LCBN of second liquid crystal layer LC2 is of the negative type.

Also in the second modification, similarly to the fourth exemplary embodiment, when the voltage is applied to second pixel electrode PX2 and second common electrode CT2, the electric field (transverse electric field EL2) substantially parallel to third substrate SUB3 and fourth substrate SUB4 is generated between second pixel electrode PX2 and second common electrode CT2 as illustrated in FIG. 37. In the second modification, because second pixel electrode PX2 is formed such that the inclination angle is alternately inverted in each row, two direction types of transverse electric field EL2 is alternatively generated in each row as illustrated in FIG. 37. When transverse electric field EL2 is generated, liquid crystal molecule LCBN alternately rotates to the right and the left in each row.

Thus, also in liquid crystal display device LCD according to the second modification, when transverse electric fields EL1 and EL2 are generated, liquid crystal molecule LCBP of first dot DOT1 of first liquid crystal layer LC1 alternately rotates to the left and the right in each row while liquid crystal molecule LCBN of second dot DOT2 of second liquid crystal layer LC2 alternately rotates to the left and the right in each row.

Therefore, for laminated first liquid crystal cell OC1 and second liquid crystal cell OC2, the long axis direction of liquid crystal molecule LCBPON rotating to the left or the right by transverse electric field EL1 generated in first liquid crystal cell OC1 is substantially orthogonal to the long axis direction of liquid crystal molecule LCBNON rotating to the left or the right by transverse electric field EL2 generated in second liquid crystal cell OC2 in each corresponding first dot DOT1 and second dot DOT2.

Accordingly, similarly to the fourth exemplary embodiment, rotated liquid crystal molecule LCBP (liquid crystal molecule LCBPON) of first liquid crystal layer LC1 and rotated liquid crystal molecule LCBN (liquid crystal molecule LCBNON) of second liquid crystal layer LC2 can cancel and compensate for the hue change (the coloring) of first liquid crystal cell OC1 or second liquid crystal cell OC2. Therefore, the coloring in a predetermined direction is canceled in the whole display screen of liquid crystal display device LCD, and the color viewing angle characteristic can be improved.

Liquid crystal display device LCD according to the second modification is also configured such that the rotation of liquid crystal molecule LCBP of first liquid crystal layer LC1 and the rotation of liquid crystal molecule LCBN of second liquid crystal layer LC2 cancel and compensate for the hue change of first liquid crystal cell OC1 or second liquid crystal cell OC2.

That is, also in liquid crystal display device LCD according to the second modification, liquid crystal molecule LCBP of one first dot DOT1 of first liquid crystal cell OC1 and liquid crystal molecule LCBN of one second dot DOT2 of second liquid crystal cell OC2 are driven by the single-domain system, and rotate in one direction in the main transmission regions of first dot DOT1 and second dot DOT2. Therefore, the transmittance can be improved compared with the one-pixel multi-domain system. The color viewing angle characteristic for a specific image pattern display is not degraded unlike the each-row multi-domain system.

Accordingly, also in liquid crystal display device LCD according to the second modification, the color viewing angle characteristic can be improved irrespective of the image display pattern without degrading the transmittance.

Also in the second modification, first liquid crystal cell OC1 and second liquid crystal cell OC2 are driven by the each-row multi-domain system. Accordingly, in liquid crystal display device LCD according to the second modification, the color viewing angle characteristic can further be improved compared with liquid crystal display device LCD according to the first to third exemplary embodiments.

Other Modifications

The liquid crystal display device of the present disclosure is described above based on the first to fourth exemplary embodiments and their modifications. However, the present disclosure is not limited to the first to fourth exemplary embodiments and their modifications.

For example, in the first to fourth exemplary embodiments and their modifications, the slit is formed in first pixel electrode PX1 and second pixel electrode PX2, and first pixel electrode PX1 and second pixel electrode PX2 extend. However, the present disclosure is not limited to the first to fourth exemplary embodiments and their modifications. For example, the slit may be formed only in first common electrode CT1 and second common electrode CT2, and only first common electrode CT1 and second common electrode CT2 may extend. In another manner, first pixel electrode PX1, second pixel electrode PX2, first common electrode CT1, and second common electrode CT2 may extend. In this case, first pixel electrode PX1 and first common electrode CT1 may be formed into a comb shape so as to engage each other. Similarly, second pixel electrode PX2 and second common electrode CT2 may be formed into the comb shape so as to engage each other.

In the first to fourth exemplary embodiments and their modifications, one pixel LDOT2 (second dot DOT2) of second image display region DISP2 of second liquid crystal cell OC2 is set so as to correspond to three first dots DOT1 of first image display region DISP1 of first liquid crystal cell OC1. However, the present disclosure is not limited to the first to fourth exemplary embodiments and their modifications. For example, one pixel LDOT2 (second dot DOT2) may be set so as to correspond to one first dot DOT1.

Those skilled in the art will readily appreciate that many modifications are possible in the above exemplary embodiment and variations without materially departing from the novel teachings and advantages of the present disclosure. Accordingly, all such modifications are intended to be included within the scope of the present disclosure.

What is claimed is:

1. A liquid crystal display device comprising:
   a first liquid crystal cell including a first liquid crystal layer provided between a first substrate and a second substrate, a first pixel electrode, and a first common electrode, the first pixel electrode and the first common electrode being provided in each of a plurality of display unit regions;
   a second liquid crystal cell including a second liquid crystal layer provided between a third substrate and a fourth substrate, a second pixel electrode, and a second common electrode, the second pixel electrode and the second common electrode being provided in each of a plurality of display unit regions;
   a first polarizing plate and a second polarizing plate, which are disposed so as to sandwich the first liquid crystal cell; and
   a third polarizing plate and a fourth polarizing plate, which are disposed so as to sandwich the second liquid crystal cell,
   wherein in the first liquid crystal cell, an alignment axis of the first substrate and an alignment axis of the second substrate against a liquid crystal molecule of the first liquid crystal layer are substantially parallel to each other, and the liquid crystal molecule of the first liquid crystal layer rotates by a transverse electric field generated between the first pixel electrode and the first common electrode,
   in the second liquid crystal cell, an alignment axis of the third substrate and an alignment axis of the fourth substrate against a liquid crystal molecule of the second liquid crystal layer are substantially parallel to each other, and the liquid crystal molecule of the second liquid crystal layer rotates by a transverse electric field generated between the second pixel electrode and the second common electrode,
   the first liquid crystal cell and the second liquid crystal cell are laminated such that the second substrate and the third substrate become inside,
   the second polarizing plate and the third polarizing plate are disposed between the first liquid crystal cell and the second liquid crystal cell,
   a polarization axis of the second polarizing plate and a polarization axis of the third polarizing plate are substantially parallel to each other,
   a polarization axis of the first polarizing plate and a polarization axis of the fourth polarizing plate are substantially orthogonal to the polarization axis of the second polarizing plate, and
   the liquid crystal display device is configured such that rotation of the liquid crystal molecule of the first liquid crystal layer and rotation of the liquid crystal molecule of the second liquid crystal layer cancel and compensate for a hue change of the first liquid crystal cell or the second liquid crystal cell when viewed from a predetermined direction.

2. The liquid crystal display device according to claim 1, wherein
   the liquid crystal molecule of the first liquid crystal layer rotates in one direction in a main light transmission region in each of the plurality of display unit regions of the first liquid crystal cell, and
   the liquid crystal molecule of the second liquid crystal layer rotate in one direction in each of the plurality of display unit regions of the second liquid crystal cell.

3. The liquid crystal display device according to claim 1, wherein a rotational direction of the liquid crystal molecule of the first liquid crystal layer is identical to a rotational direction of the liquid crystal molecule of the second liquid crystal layer.

4. The liquid crystal display device according to claim 1, wherein the alignment axis of the first substrate is substantially orthogonal to the alignment axis of the third substrate.

5. The liquid crystal display device according to claim 1, wherein a long axis direction of the liquid crystal molecule of the first liquid crystal layer is substantially matched with a short axis direction of the liquid crystal molecule of the second liquid crystal layer when the transverse electric field is generated in the first liquid crystal cell and the second liquid crystal cell.

6. The liquid crystal display device according to claim 1, wherein a long axis direction of the liquid crystal molecule of the first liquid crystal layer is substantially orthogonal to a short axis direction of the liquid crystal molecule of the second liquid crystal layer when the transverse electric field is not generated in the first liquid crystal cell and the second liquid crystal cell.

7. The liquid crystal display device according to claim 1, wherein a direction of the transverse electric field generated between the first pixel electrode and the first common electrode is along with a direction of the transverse electric field generated between the second pixel electrode and the second common electrode.

8. The liquid crystal display device according to claim 1, wherein one of the liquid crystal molecule of the first liquid crystal layer and the liquid crystal molecule of the second liquid crystal layer is of a positive type, and the other is of a negative type.

9. The liquid crystal display device according to claim 1, wherein
   the first liquid crystal cell includes a first source wiring extending in a first direction,
   the second liquid crystal cell includes a second source wiring extending in the first direction,
   a longitudinal axis of the first pixel electrode is along with the first source wiring,
   a longitudinal axis of the second pixel electrode is along with the second source wiring,
   the liquid crystal molecule of the first liquid crystal layer is of the positive type, and
   the liquid crystal molecule of the second liquid crystal layer is of the negative type.

10. The liquid crystal display device according to claim 9, wherein
the first liquid crystal cell includes a first gate wiring,
the second liquid crystal cell includes a second gate wiring,
a longitudinal axis of the first pixel electrode extends in a direction substantially orthogonal to the first gate wiring, and
a longitudinal axis of the second pixel electrode extends in a direction substantially orthogonal to the second gate wiring.

11. The liquid crystal display device according to claim 1, wherein
the first liquid crystal cell includes a first source wiring extending in a first direction,
the second liquid crystal cell includes a second source wiring extending in the first direction,
a longitudinal axis of the first pixel electrode is along with the first source wiring,
a longitudinal axis of the second pixel electrode extends in a direction substantially orthogonal to the second source wiring, and
both the liquid crystal molecule of the first liquid crystal layer and the liquid crystal molecule of the second liquid crystal layer are of the positive type.

12. The liquid crystal display device according to claim 11, wherein
the first liquid crystal cell includes a first gate wiring,
the second liquid crystal cell includes a second gate wiring,
a longitudinal axis of the first pixel electrode extends in a direction substantially orthogonal to the first gate wiring, and
a longitudinal axis of the second pixel electrode is along with the second gate wiring.

13. The liquid crystal display device according to claim 1, wherein
the first liquid crystal cell includes a first source wiring extending in a first direction,
the second liquid crystal cell includes a second source wiring extending in the first direction,
a longitudinal axis of the first pixel electrode extends in a direction substantially orthogonal to the first source wiring,
a longitudinal axis of the second pixel electrode extends in a direction substantially orthogonal to the second source wiring, and
the liquid crystal molecule of the first liquid crystal layer is of the positive type, and
the liquid crystal molecule of the second liquid crystal layer is of the negative type.

14. The liquid crystal display device according to claim 13, wherein
the first liquid crystal cell includes a first gate wiring,
the second liquid crystal cell includes a second gate wiring,
a longitudinal axis of the first pixel electrode is along with the first gate wiring, and
a longitudinal axis of the second pixel electrode is along with the second gate wiring.

15. The liquid crystal display device according to claim 1, wherein
the first liquid crystal cell includes a first source wiring extending in a first direction,
the second liquid crystal cell includes a second source wiring extending in the first direction,
a longitudinal axis of the first pixel electrode extends in a direction substantially orthogonal to the first source wiring,
a longitudinal axis of the second pixel electrode is along with the second source wiring, and
both the liquid crystal molecule of the first liquid crystal layer and the liquid crystal molecule of the second liquid crystal layer are of the positive type.

16. The liquid crystal display device according to claim 15, wherein
the first liquid crystal cell includes a first gate wiring,
the second liquid crystal cell includes a second gate wiring,
a longitudinal axis of the first pixel electrode is along with the first gate wiring, and
a longitudinal axis of the second pixel electrode extends in a direction substantially orthogonal to the second gate wiring.

17. The liquid crystal display device according to claim 1, wherein
the first liquid crystal cell includes a first source wiring extending in a first direction and a first gate wiring extending in a second direction substantially orthogonal to the first direction,
the second liquid crystal cell includes a second source wiring extending in the first direction and a second gate wiring extending in the second direction,
the first source wiring or the first gate wiring is along with the polarization axis of the first polarizing plate or the polarization axis of the second polarizing plate, and
the second source wiring or the second gate wiring is substantially parallel to the polarization axis of the third polarizing plate or the polarization axis of the fourth polarizing plate.

18. The liquid crystal display device according to claim 17, wherein
the first pixel electrode extends so as to be inclined to the first source wiring, and
the second pixel electrode extends so as to be inclined to the second source wiring.

19. The liquid crystal display device according to claim 17, wherein the alignment axis of the first substrate and the alignment axis of the third substrate are substantially parallel to each other.

20. The liquid crystal display device according to claim 1, wherein the first liquid crystal cell and the second liquid crystal cell are driven by an each-row multi-domain system.

* * * * *